US010618008B2

(12) United States Patent
Yandrasits et al.

(10) Patent No.: US 10,618,008 B2
(45) Date of Patent: Apr. 14, 2020

(54) POLYMERIC IONOMER SEPARATION MEMBRANES AND METHODS OF USE

(71) Applicant: 3M INNOVATIVE PROPERTIES COMPANY, St. Paul, MN (US)

(72) Inventors: Michael A. Yandrasits, Hastings, MN (US); David S. Seitz, Woodbury, MN (US); Eric F. Funkenbusch, Hudson, WI (US); Ryan C. Shirk, Mendota Heights, MN (US); Jinsheng Zhou, Woodbury, MN (US); Eric J. Hanson, Hudson, WI (US); Moses M. David, Woodbury, MN (US); Kazuhiko Mizuno, Tokyo (JP)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 230 days.

(21) Appl. No.: 15/737,955

(22) PCT Filed: Jul. 1, 2016

(86) PCT No.: PCT/US2016/040655
§ 371 (c)(1),
(2) Date: Dec. 19, 2017

(87) PCT Pub. No.: WO2017/004496
PCT Pub. Date: Jan. 5, 2017

(65) Prior Publication Data
US 2018/0229186 A1 Aug. 16, 2018

Related U.S. Application Data

(60) Provisional application No. 62/187,524, filed on Jul. 1, 2015, provisional application No. 62/203,657, filed on Aug. 11, 2015.

(51) Int. Cl.
*B01D 61/36* (2006.01)
*B01D 69/10* (2006.01)
(Continued)

(52) U.S. Cl.
CPC .......... *B01D 61/362* (2013.01); *B01D 63/10* (2013.01); *B01D 67/0088* (2013.01);
(Continued)

(58) Field of Classification Search
None
See application file for complete search history.

(56) References Cited

U.S. PATENT DOCUMENTS 2,930,754 A   3/1960  Stuckey
2,958,656 A   11/1960 Stuckey
(Continued)

FOREIGN PATENT DOCUMENTS

CA   2020696   2/1991
CA   2000281   4/1991
(Continued)

OTHER PUBLICATIONS

Billard, "Diffusion of Organic Compounds Through Chemically Asymmetric Membranes Made of Semi-Interpenetrating Polymer Networks", Separation and Purification Technology, 1998, vol. 14, pp. 221-232.
(Continued)

*Primary Examiner* — Bradley R Spies
(74) *Attorney, Agent, or Firm* — Harold C. Knecht, III

(57) ABSTRACT

A separation membrane for selectively separating (e.g., pervaporating) a first fluid (e.g., a first liquid) from a mixture comprising the first fluid (e.g., first liquid) and a second fluid (e.g., second liquid), wherein the separation membrane includes a polymeric ionomer that has a highly fluorinated backbone and recurring pendant groups according to the
(Continued)

following formula (Formula I): —O—$R_f$—[—$SO_2$—$N^-$(Z+)—$SO_2$—R—]$_m$—[$SO_2$]$_n$-Q wherein: $R_f$ is a perfluorinated organic linking group; R is an organic linking group; $Z^+$ is $H^+$, a monovalent cation, or a multivalent cation; Q is H, F, —$NH_2$, —$NH_2$, —$O^-Y^+$, or —$C_xF_{2x}+1$; $Y^+$ is $H^+$, a monovalent cation, or a multivalent cation; x=1 to 4; m=0 to 6; and n=0 or 1; with the proviso that at least one of morn must be non-zero.

20 Claims, 6 Drawing Sheets

(51) Int. Cl.
  *B01D 69/12* (2006.01)
  *B01D 71/32* (2006.01)
  *F02D 19/06* (2006.01)
  *F02M 37/22* (2019.01)
  *B01D 63/10* (2006.01)
  *B01D 67/00* (2006.01)
  *B01D 71/46* (2006.01)

(52) U.S. Cl.
  CPC ......... *B01D 67/0093* (2013.01); *B01D 69/10* (2013.01); *B01D 69/12* (2013.01); *B01D 71/32* (2013.01); *B01D 71/46* (2013.01); B01D 2323/30 (2013.01); B01D 2323/345 (2013.01); B01D 2323/46 (2013.01); B01D 2325/42 (2013.01); F02D 19/0671 (2013.01); F02M 37/22 (2013.01); Y02T 10/36 (2013.01)

(56) References Cited

U.S. PATENT DOCUMENTS

| | | |
|---|---|---|
| 3,370,102 A | 2/1968 | Carpenter |
| 4,031,864 A | 6/1977 | Crothers |
| 4,115,465 A | 9/1978 | Elfert |
| 4,277,344 A | 7/1981 | Cadotte |
| 4,366,307 A | 12/1982 | Singh |
| 4,464,494 A | 8/1984 | King |
| 4,581,043 A | 4/1986 | Scheer |
| 4,582,726 A | 4/1986 | Shuey |
| 4,778,851 A | 10/1988 | Henton |
| 4,789,480 A | 12/1988 | Bruschke |
| 4,798,764 A | 1/1989 | Tressler |
| 4,802,987 A | 2/1989 | Black |
| 4,828,773 A | 5/1989 | Feimer |
| 4,846,977 A | 7/1989 | DeVellis |
| 4,861,628 A | 8/1989 | Schucker |
| 4,879,044 A | 11/1989 | Feimer |
| 4,885,096 A | 12/1989 | Black |
| 4,914,064 A | 4/1990 | Schucker |
| 4,929,357 A | 5/1990 | Schucker |
| 4,929,358 A | 5/1990 | Koenitzer |
| 4,944,880 A | 7/1990 | Ho |
| 4,946,594 A | 8/1990 | Thaler |
| 4,962,271 A | 10/1990 | Black |
| 4,968,430 A | 11/1990 | Hildenbrand |
| 4,976,868 A | 12/1990 | Sartori |
| 4,990,275 A | 2/1991 | Ho |
| 4,997,906 A | 3/1991 | Thaler |
| 5,012,035 A | 4/1991 | Sartori |
| 5,012,036 A | 4/1991 | Sartori |
| 5,019,666 A | 5/1991 | Sartori |
| 5,028,685 A | 7/1991 | Ho |
| 5,030,355 A | 7/1991 | Schucker |
| 5,039,417 A | 8/1991 | Schucker |
| 5,039,418 A | 8/1991 | Schucker |
| 5,039,422 A | 8/1991 | Schucker |
| 5,045,354 A | 9/1991 | Feimer |
| 5,049,281 A | 9/1991 | Schucker |
| 5,055,631 A | 10/1991 | Sartori |
| 5,055,632 A | 10/1991 | Schucker |
| 5,063,186 A | 11/1991 | Schucker |
| 5,069,793 A | 12/1991 | Kaschemekat |
| 5,075,006 A | 12/1991 | Schucker |
| 5,093,003 A | 3/1992 | Ho |
| 5,095,171 A | 3/1992 | Feimer |
| 5,096,592 A | 3/1992 | Schucker |
| 5,098,570 A | 3/1992 | Schucker |
| 5,108,549 A | 4/1992 | Wenzlaff |
| 5,128,439 A | 7/1992 | Sartori |
| 5,130,017 A | 7/1992 | Schucker |
| 5,138,023 A | 8/1992 | Sartori |
| 5,159,130 A | 10/1992 | Satori |
| 5,180,496 A | 1/1993 | Sartori |
| 5,221,481 A | 6/1993 | Schucker |
| 5,241,039 A | 8/1993 | Ho |
| 5,254,795 A | 10/1993 | Boucher |
| 5,256,503 A | 10/1993 | Cook |
| 5,275,726 A | 1/1994 | Feimer |
| 5,290,452 A | 3/1994 | Schucker |
| 5,350,519 A | 9/1994 | Kaschemekat |
| 5,396,019 A | 3/1995 | Sartori |
| 5,425,865 A | 6/1995 | Singleton |
| 5,468,390 A | 11/1995 | Crivello |
| 5,498,823 A | 3/1996 | Noble |
| 5,547,551 A | 8/1996 | Bahar |
| 5,550,199 A | 8/1996 | Ho |
| 5,559,254 A | 9/1996 | Krug |
| 5,582,735 A | 12/1996 | Mancusi, III |
| 5,611,930 A | 3/1997 | Nguyen |
| 5,643,442 A | 7/1997 | Sweet |
| 5,670,052 A | 9/1997 | Ho |
| 5,700,374 A | 12/1997 | Steinhauser |
| 5,863,610 A * | 1/1999 | Young ............... B01D 67/0088 427/335 |
| 5,905,182 A | 5/1999 | Streicher |
| 5,914,435 A | 6/1999 | Streicher |
| 6,068,771 A | 5/2000 | McDermott |
| 6,156,950 A | 12/2000 | Ragil |
| 6,273,937 B1 | 8/2001 | Schucker |
| 6,423,784 B1 | 7/2002 | Hamrock |
| 6,586,133 B1 | 7/2003 | Teeters |
| 6,620,958 B2 | 9/2003 | Buchanan |
| 6,622,663 B2 | 9/2003 | Weissman |
| 6,702,945 B2 | 3/2004 | Saxton |
| 6,800,371 B2 | 10/2004 | Gross |
| 6,896,717 B2 | 5/2005 | Pinnau |
| 6,972,093 B2 | 12/2005 | Partridge |
| 7,029,574 B2 | 4/2006 | Yang |
| 7,053,256 B2 | 5/2006 | Yang |
| 7,148,389 B2 | 12/2006 | Yang |
| 7,247,370 B2 | 7/2007 | Childs |
| 7,303,675 B2 | 12/2007 | De La Cruz |
| 7,314,565 B2 | 1/2008 | Sabottke |
| 7,320,297 B2 | 1/2008 | Kamio |
| 7,337,754 B2 | 3/2008 | Dearth |
| 7,348,088 B2 | 3/2008 | Hamrock |
| 7,370,609 B2 | 5/2008 | Kamio |
| 7,426,907 B2 | 9/2008 | Dearth |
| 7,604,746 B2 | 10/2009 | Childs |
| 7,638,053 B2 | 12/2009 | Yeager |
| 7,642,393 B2 | 1/2010 | Wang |
| 7,645,840 B2 | 1/2010 | Zook |
| 7,647,899 B2 | 1/2010 | Dearth |
| 7,708,151 B2 | 5/2010 | Peiffer |
| 7,785,471 B2 | 8/2010 | Sabottke |
| 7,803,275 B2 | 9/2010 | Partridge |
| 7,842,124 B2 | 11/2010 | Partridge |
| 7,919,141 B2 | 4/2011 | Tanioka |
| 8,051,828 B2 | 11/2011 | Sengupta |
| 8,056,732 B2 | 11/2011 | Mckeown |
| 8,083,946 B2 | 12/2011 | Sabottke |
| 8,118,009 B2 | 2/2012 | Pursifull |
| 8,119,006 B2 | 2/2012 | Patil |
| 8,231,013 B2 | 7/2012 | Chu |
| 8,258,363 B2 | 9/2012 | Kalakkunnath |
| 8,454,832 B2 | 6/2013 | Hamad |
| 8,550,058 B2 | 10/2013 | Pursifull |
| 8,562,825 B2 | 10/2013 | Partridge |
| 8,580,111 B2 | 11/2013 | Partridge |

(56) References Cited

U.S. PATENT DOCUMENTS

| | | |
|---|---|---|
| 8,597,518 B2 | 12/2013 | Parnas |
| 8,729,197 B2 | 5/2014 | Kropp |
| 8,741,445 B2 | 6/2014 | Bannai |
| 8,765,824 B2 | 7/2014 | Shaffer |
| 8,827,086 B2 | 9/2014 | Ansorge |
| 9,056,283 B2 | 6/2015 | Yahaya |
| 9,303,222 B2 | 4/2016 | Keuken |
| 2002/0139321 A1 | 10/2002 | Weissman |
| 2002/0144944 A1 | 10/2002 | Arcella |
| 2002/0161066 A1 | 10/2002 | Remigy |
| 2003/0134515 A1 | 7/2003 | David |
| 2003/0163013 A1 | 8/2003 | Yang |
| 2004/0000231 A1 | 1/2004 | Bikson |
| 2004/0024123 A1 | 2/2004 | Moya |
| 2004/0026321 A1 | 2/2004 | Minhas |
| 2004/0040891 A1 | 3/2004 | Yang |
| 2004/0044262 A1 | 3/2004 | Yang |
| 2004/0121210 A1 | 6/2004 | Hamrock |
| 2004/0144723 A1 | 7/2004 | Gloeckle |
| 2004/0149644 A1 | 8/2004 | Partridge |
| 2005/0103715 A1 | 5/2005 | Sabottke |
| 2005/0119517 A1 | 6/2005 | Millington |
| 2006/0000778 A1 | 1/2006 | Childs |
| 2006/0289352 A1 | 12/2006 | Yeager |
| 2007/0034192 A1 | 2/2007 | Kamio |
| 2007/0128425 A1 | 6/2007 | Hadj Romdhane |
| 2007/0221163 A1 | 9/2007 | Kamio |
| 2007/0234976 A1 | 10/2007 | Dearth |
| 2007/0272613 A1 | 11/2007 | Minhas |
| 2008/0011680 A1 | 1/2008 | Partridge |
| 2008/0035557 A1 | 2/2008 | Partridge |
| 2008/0035566 A1 | 2/2008 | Sabottke |
| 2008/0035572 A1 | 2/2008 | Sabottke |
| 2008/0035573 A1 | 2/2008 | Peiffer |
| 2008/0035575 A1 | 2/2008 | Partridge |
| 2008/0086021 A1 | 4/2008 | Wang |
| 2008/0149561 A1* | 6/2008 | Chu ............... A61L 15/425 210/500.38 |
| 2008/0200696 A1 | 8/2008 | Miller |
| 2008/0223785 A1 | 9/2008 | Miller |
| 2009/0026130 A1 | 1/2009 | Chikura |
| 2009/0157277 A1 | 6/2009 | Pursifull |
| 2009/0159057 A1 | 6/2009 | Pursifull |
| 2009/0242038 A1 | 10/2009 | Sengupta |
| 2009/0247805 A1 | 10/2009 | Bournay |
| 2009/0277837 A1 | 11/2009 | Liu |
| 2010/0018926 A1 | 1/2010 | Liu |
| 2010/0059441 A1 | 3/2010 | Pattil |
| 2010/0075101 A1 | 3/2010 | Tang |
| 2010/0108605 A1 | 5/2010 | Patil |
| 2010/0226823 A1 | 9/2010 | Rakhman |
| 2010/0325945 A1 | 12/2010 | Keuken |
| 2011/0059385 A1* | 3/2011 | Kim ............... B01D 71/82 429/483 |
| 2011/0091698 A1 | 4/2011 | Zhou |
| 2012/0074043 A1 | 3/2012 | Kalakkunnath |
| 2012/0132576 A1 | 5/2012 | Partridge |
| 2012/0132577 A1 | 5/2012 | Partridge |
| 2012/0132589 A1 | 5/2012 | Hamad |
| 2012/0178834 A1* | 7/2012 | Linder ............ B01D 67/0006 521/27 |
| 2012/0186446 A1 | 7/2012 | Bara |
| 2012/0190091 A1 | 7/2012 | Huang |
| 2012/0270958 A1 | 10/2012 | Shaffer |
| 2013/0000181 A1 | 1/2013 | Janssens |
| 2013/0029249 A1 | 1/2013 | Hamrock |
| 2013/0043186 A1 | 2/2013 | Arakai |
| 2013/0098829 A1 | 4/2013 | Dontula |
| 2013/0101797 A1 | 4/2013 | Dontula |
| 2013/0118983 A1 | 5/2013 | Livingston |
| 2013/0125816 A1 | 5/2013 | David |
| 2013/0134515 A1 | 5/2013 | Zhou |
| 2013/0184503 A1 | 7/2013 | Frania |
| 2013/0228515 A1 | 9/2013 | Yahaya |
| 2014/0142363 A1 | 5/2014 | Partridge |
| 2015/0353853 A1 | 12/2015 | Iwashita |
| 2015/0367292 A1* | 12/2015 | Hashimoto ........... B01D 71/56 210/640 |

FOREIGN PATENT DOCUMENTS

| | | |
|---|---|---|
| CN | 101121101 | 6/2010 |
| CN | 202150515 | 2/2012 |
| CN | 102688708 | 1/2014 |
| CN | 104117290 | 4/2016 |
| CN | 105289340 | 10/2017 |
| DE | 3927787 | 2/1991 |
| DE | 10326354 | 1/2005 |
| DE | 102007049203 | 4/2009 |
| EP | 0312375 | 4/1989 |
| EP | 0312376 | 4/1989 |
| EP | 0254359 | 9/1991 |
| EP | 0326076 | 7/1994 |
| EP | 0649676 | 4/1995 |
| EP | 0526203 | 6/1995 |
| EP | 0760250 | 3/1997 |
| EP | 0760251 | 3/1997 |
| EP | 0760252 | 3/1997 |
| EP | 0811420 | 1/2004 |
| EP | 1372822 | 5/2006 |
| EP | 2041048 | 5/2011 |
| EP | 1637214 | 12/2013 |
| FR | 2937468 | 4/2010 |
| JO | H02-138136 | 5/1990 |
| JP | S59-068535 | 4/1984 |
| JP | S59-206006 | 11/1984 |
| JP | S60-255106 | 12/1985 |
| JP | S61-257205 | 11/1986 |
| JP | H07-088343 | 4/1995 |
| JP | H10-314551 | 12/1998 |
| JP | 2000-157843 | 6/2000 |
| JP | 2001-038156 | 2/2001 |
| JP | 3161562 | 4/2001 |
| JP | 3872605 | 1/2007 |
| JP | 2010-001755 | 1/2010 |
| JP | 2011-026552 | 2/2011 |
| JP | 4900328 | 3/2012 |
| KR | 20120000853 | 1/2012 |
| KR | 2015-0100029 | 9/2015 |
| KR | 10-1568119 | 11/2015 |
| RU | 2129910 | 5/1999 |
| WO | WO 97-017129 | 5/1997 |
| WO | WO 2003-008078 | 1/2003 |
| WO | WO 2005-102503 | 11/2005 |
| WO | WO 2009-006307 | 1/2009 |
| WO | WO 2009-094996 | 8/2009 |
| WO | WO 2010-002501 | 1/2010 |
| WO | WO 2010-101293 | 9/2010 |
| WO | WO 2011-018919 | 2/2011 |
| WO | WO 2012-021258 | 2/2012 |
| WO | WO 2012-038110 | 3/2012 |
| WO | WO 2013-010860 | 1/2013 |
| WO | WO 2013-151835 | 10/2013 |
| WO | WO 2014-113020 | 7/2014 |
| WO | WO 2015-103063 | 7/2015 |
| WO | WO 2017-004495 | 1/2017 |
| WO | WO 2017-004496 | 1/2017 |

OTHER PUBLICATIONS

Brun, "Separation of Hydrocarbon Mixtures by Pervaporation Through Rubbers", Membranes and Membrane Processes, Jan. 1986, pp. 335-341.

Cabasso, "Organic Liquid Mixtures Separation by Permselective Polymer Membranes. 1. Selection and Characteristics of Dense Isotropic Membranes Employed in the Pervaporation Process", Industrial & Engineering Chemistry Product Research and Development, 1983, vol. 22, No. 2, pp. 313-319.

Chang, "Octane-on-Demand as an Enable for Highly Efficient Spark Ignition Engines and Greenhouse Gas Emissions Improvement", SAE Technical Paper 2015-01-1264, Apr. 2015, 17 pages.

(56) References Cited

OTHER PUBLICATIONS

Childs, "Nanofiltration Using Pore-Filled Membranes: Effect of Polyelectrolyte Composition on Performance", Separation and Purification Technology, Mar. 2001, vol. 22-23, pp. 507-517.
Chishima, "Study of Ethanol-Gasoline Onboard Separation System for Knocking Suppression", Japan Society of Automotive Engineers (JASE) Technical Paper 20159380, Sep. 2015, 8 pages.
Chu, "Preparation of Thermo-Responsive Core-Shell Microcapsules with a Porous Membrane and Poly(N-Isopropylacrylamide) Gates", Journal of Membrane Science, Oct. 2001, vol. 192, No. 1-2, pp. 27-39.
Cunha, "Removal of Aromatics from Multicomponent Organic Mixtures by Pervaporation Using Polyurethane Membranes: Experimental and Modelling", Journal of Membrane Science, 2002, vol. 206, pp. 277-290.
Dutta, "Separation of Azeotropic Organic Liquid Mixtures by Pervaporation", American Institute of Chemical Engineers (AIChE) Journal, Apr. 1991, vol. 37, No. 4, pp. 581-588.
Fang, "Pervaporation Properties of Ethynyl-Containing Copolyimide Membranes to Aromatic/Non-Aromatic Hydrocarbon Mixtures", Polymer, 1999, vol. 40, pp. 3051-3059.
Frahn, "Generation of a Selective Layer on Polyacrylonitrile Membrane Supports for Separation of Aromatic/Non-Aromatic Hydrocarbon Mixtures by Pervaporation", Macromolecular Symposia, Feb. 2001, vol. 164, No. 1, pp. 269-276.
Frahn, "Photo-Initiated Generation of a Selective Layer on Polyacrylontrile (PAN) Composite Membranes", Journal of Materials Processing Technology, Dec. 2003, vol. 143-144, pp. 277-280.
Frahn, "Separation of Aromatic/Aliphatic Hydrocarbons by Photo-Modified Poly(Acrylonitrile) Membranes", Journal of Membrane Science, May 2004, vol. 234, Nos. 1-2, pp. 55-65.
Garcia-Aleman, "Experimental Analysis, Modeling, and Theoretical Design of McMaster Pore-Filled Nanofiltration Membranes", Journal of Membrane Science, Sep. 2004, vol. 240, Nos. 1-2, pp. 237-255.
Girnus, "Synthesis of $AlPO_4$-5 Aluminum Phosphate Molecular Sieve Crystals for Membrane Applications by Microwave Heating", Advanced Materials, 1995, vol. 7, No. 8, pp. 711-714.
Hao, "The Pervaporation Properties of Sulfonyl-Containing Polyimide Membranes to Aromatic-Aliphatic Hydrocarbon Mixtures", Journal of Membrane Science, 1997, vol. 132, pp. 97-108.
Heitmann, "Influencing the Pervaporative Recovery of N-Butanol by Using Ionic Liquids", Procedia Engineering, Jan. 2012, vol. 44, pp. 1343-1344.
Heywood, "High Compression Ratio Turbo Gasoline Engine Operation Using Alcohol Enhancement", Final Report on US DOE Funded Project DE-EE0005444, Massachusetts Institute of Technology Sloan Automotive Laboratory, Cambridge, MA., Jan. 2016, 168 pages.
Hiemenz, Polymer Chemistry—The Basic Concepts (1984), 7 pages.
Hofmann, "Molecular Modelling of Pervaporation Separation of Binary Mixtures with Polymeric Membranes", Journal of Membrane Science, 1998, vol. 144, pp. 145-159.
Hoshi, "Separation of Organic Solvent from Dilute Aqueous Solutions and from Organic Solvent Mixtures Through Crosslinked Acrylate Copolymer Membranes by Pervaporation", Journal of Applied Polymer Science, 1998, vol. 69, pp. 1483-1494.
"Hydranautics: Spiral Wound Reverse Osmosis Elements" A 3.23-minute video available on YouTube, published on Dec. 11, 2007, [Last Accessed on Mar. 9, 2018], URL <https://www.youtube.com/watch?v=YIMGZWmh_Mw>, 2 pages.
Katarzynski, "Permeation Properties of Different Aromatic Substances in Multicomponent Aromatic/Aliphatic Pervaporation Experiments", Desalination, 2006, vol. 200, pp. 23-25.
Katarzynski, "Separation of Multi Component Aromatic-Aliphatic Mixtures by Pervaporation with Copolyimide Membranes", Desalination, 2006, vol. 189, pp. 81-86.
Kim, "Quantitative Microscopic Study of Surface Characteristics of Ultrafiltration Membranes", Journal of Membrane Science, Nov. 1990, vol. 54, Nos. 1-2, pp. 89-102.
Kim, "Selective Permeation of $CO_2$ Through Pore-Filled Polyacrylonitrile Membrane with Poly(Ethylene Glycol)", Journal of Membrane Science, May 2001, vol. 186, pp. 97-107.
Koelsch, "Zeolite-in-Metal Membranes: Preparation and Testing", Journal of the Chemical Society, Chemical Communications, 1994, vol. 21, pp. 2491-2492.
Kudo, "Research on Engine System making Effective Use of Bio-ethanol-blended Fuels", Japan Society of Automotive Engineers Technical Paper 20135048, JSAE Annual Congress (Spring), May 2013, 4 pages.
Larchet, "Separation of Benzene-n-Heptane Mixtures by Pervaporation with Elastomeric Membranes. I. Performance of Membranes", Journal of Membrane Science, 1983, vol. 15, pp. 81-96.
Larchet, "Separation of Benzene-n-Heptane Mixtures by Pervaporation with Elastomeric Membranes. II. Contribution of Sorption to the Separation Mechanism", Journal of Membrane Science, 1984, vol. 17, pp. 263-274.
Larchet, "Study of the Pervaporation of Aromatic and Aliphatic Hydrocarbon Mixtures Through Different Elastomer Membranes", *Chimiques*, 1979, vol. 287, pp. 31-34.
Li, "A Novel Atmospheric Dielectric Barrier Discharge (DBD) Plasma Graft-Filling Technique to Fabricate the Composite Membranes for Pervaporation of Aromatic-Aliphatic Hydrocarbons", Journal of Membrane Science, Apr. 2011, vol. 371, pp. 163-170.
Lopergolo, "Direct UV Photocrosslinking of Poly(N-Vinyl-2-Pyrrolidone) (PVP) to Produce Hydrogels", Polymer, Sep. 2003, vol. 44, No. 20, pp. 6217-6222.
Martinez De Yuso, "A Study of Chemical Modifications of a Nafion Membrane by incorporation of Different Room Temperature Ionic Liquids", Fuel Cells, Aug. 2012, vol. 12, No. 4, pp. 606-613.
Matsui, "A Simple Model for Pervaporative Transport of Binary Mixtures Through Rubbery Polymeric Membranes", Journal of Membrane Science, 2004, vol. 235, pp. 25-30.
Matsui, "Pervaporation Separation of Aromatic-Aliphatic Hydrocarbons by Crosslinked Poly(Methyl Acrylate-Co-Acrylic Acid) Membranes", Journal of Membrane Science, 2002, vol. 195, pp. 229-245.
Matsui, "Pervaporation Separation of Aromatic-Aliphatic Hydrocarbons by a Series of Ionically Crosslinked Poly(N-Alkyl Acrylate) Membranes", Journal of Membrane Science, 2003, vol. 213, pp. 67-83.
Miendersma, "Economical Feasibility of Zeolite Membranes for Industrial Scale Separations of Aromatic Hydrocarbons", Desalination, 2002, vol. 149, pp. 29-34.
Mika, "Ultra-Low-Pressure Water Softening with Pore-Filled Membranes", Desalination, Nov. 2001, vol. 140, No. 3, pp. 265-275.
Navarro, "Pore-Filling Electrolyte Membranes Based on Microporous Polyethylene Matrices Activated with Plasma and Sulfonated Hydrogenated Styrene Butadiene Block Copolymer. Synthesis, Microstructural and Electrical Characterization", Journal of Polymer Science, Part B: Polymer Physics, Aug. 2008, vol. 46, No. 16, pp. 1684-1695.
Ohst, "Polymer Structure-Properties Correlation of Polyurethane PV-Membranes for Aromatic/Aliphatic Separation", Proceedings of 5th International Conference on Pervaporation Processes in the Chemical Industry, Heidelberg, Germany, Mar. 1991, pp. 7-21.
Okada, "Predictability of Transport Equations for Pervaporation on the Basis of Pore-Flow Mechanism", Journal of Membrane Science, 1992, vol. 70, pp. 163-175.
Okamoto "Pervaporation of Aromatic/Non-Aromatic Hydrocarbon Mixtures Through Crosslinked Membranes of Polyimide with Pendant Phosphonate Ester Groups", Journal of Membrane Science, 1999, vol. 157, pp. 97-105.
Pandey, "Formation and Characterization of Highly Crosslinked Anion-Exchange Membranes", Journal of Membrane Science, Jun. 2003, vol. 217, pp. 117-130.
Partridge, "Onboard Gasoline Separation for Improved Vehicle Efficiency", SAE International Journal of Fuels and Lubricants, Jun. 2014, vol. 7, No. 2, pp. 366-378.
Peeva, "Factors Affecting the Sieving Behavior of Anti-Fouling Thin-Layer Cross-Linked Hydrogel Polyethersulfone Composite Ultrafiltration Membranes", Journal of Membrane Science, Feb. 2012, vol. 390-391, pp. 99-112.

(56) References Cited

OTHER PUBLICATIONS

Pithan, "Polymeric Membranes for Aromatic/Aliphatic Separation Processes", ChemPhysChem, 2002, vol. 3, pp. 856-862.
Qiu, "Nanofiltration Membrane Prepared from Cardo Polyetherketone Ultrafiltration Membrane by UV-Induced Grafting Method", Journal of Membrane Science, Jun. 2005, vol. 255, pp. 107-115.
Ray, "Development of New Synthetic Membranes for Separation of Benzene-Cyclohexane Mixtures by Pervaporation: A Solubility Parameter Approach", Industrial & Engineering Chemistry Research, 1997, vol. 36, pp. 5265-5276.
Ren, "Separation of Aromatics/Aliphatics with Crosslinked 6FDA-Based Copolyimides", Separation and Purification Technology, 2001, vol. 22-23, pp. 31-43.
Robeson, "Poly(Trimethylsilylpropyne) Utility as a Polymeric Absorbent for Removal of Trace Organics from Air and Water Sources", Separation Science and Technology, 1992, vol. 27, No. 10, pp. 1245-1258.
Roizard, "Preparation and Study of Crosslinked Polyurethane Films to Fractionate Toluene-N-Heptane Mixtures by Pervaporation", Separation and Purification Technology, 2001, vol. 22-23, pp. 45-52.
Schauer, "Polyurethane pervaporation membranes", Die Angewandte Makromolekulare Chemie, 1999, vol. 268, pp. 41-45.
Schepers, "Molecular Simulation Study on Sorption and Diffusion Processes in Polymeric Pervaporation Membrane Materials", Molecular Simulation, Feb. 2006, vol. 32, No. 2, pp. 73-83.
Schwarz, "Polyelectrolyte membranes for Aromatic-Aliphatic Hydrocarbon Separation by Pervaporation", Journal of Membrane Science, 2005, vol. 247, pp. 143-152.
Scindia, "Coupled-Diffusion Transport of Cr(VI) Across Anion-Exchange Membranes Prepared by Physical and Chemical Immobilization Methods", Journal of Membrane Science, Mar. 2005, vol. 249, pp. 143-152.
"Scotch-Weld Brand DP-760 Part A", 3M Material Safety Data Sheet, Aug. 2008, 8 pages.
"Scotch-Weld Brand DP-760 Part B", 3M Material Safety Data Sheet, Feb. 2007, 7 pages.
Semenova, "Polymer Membranes for Hydrocarbon Separation and Removal", Journal of Membrane Science, Mar. 2004, vol. 231, pp. 189-207.
Smitha, "Separation of Organic-Organic Mixtures by Pervaporation—A Review", Journal of Membrane Science, Sep. 2004, vol. 241, No. 1, pp. 1-21.
Stephan "Separation of Aliphatic/Aromatic Mixtures by Pervaporation Using Polyurethane Membranes. Model Calculations and Comparison with Experimental Results", Proceedings of Sixth International Conference on Pervaporation Processes in the Chemical Industry: Ottawa, Canada, Sep. 1992, pp. 292-304.
Stewart, "Membrane Separations Using Functionalized Polyphosphazene Materials", ACS Symposium Series, 2004, vol. 876, pp. 177-189.
Thompson, "Theoretical Transport Model of Diffusive Membrane Pervaporation and Comparison of Model Predictions with Experimental Results", American Institute of Chemical Engineers National Meeting, Houston, Texas, Apr. 1987, 12 pages.
Ueda, "Membrane Separation of Ethanol from Mixtures of Gasoline and Bioethanol with Heat-Treated PVA Membranes", Industrial & Engineering Chemistry Research, 2011, vol. 50, No. 2, pp. 1023-1027.
Ulbricht, "Novel High-Performance Photo-Graft Composite Membranes for Separation of Organic Liquids by Pervaporation," Journal of Membrane Sciences, Dec. 1997, vol. 136, pp. 25-33.
Van Ackern, "Ultrathin Membranes for Gas Separation and Pervaporation Prepared Upon Electrostatic Self-Assembly of Polyelectrolytes", Thin Solid Films, 1998, vol. 327-329, pp. 762-766.
Villaluenga, "A Review on the Separation of Benzene-Cyclohexane Mixtures by Pervaporation Processes", Journal of Membrane Sciences, May 2000, vol. 169, No. 2, pp. 159-174.
Wang, "Crosslinking of Polyvinyl Chloride by Electron Beam Irradiation in the Presence of Ethylene-Vinyl Acetate Copolymer", Journal of Applied Polymer Science, 2004, vol. 91, pp. 1571-1575.
Wang, "Pervaporation of Aromatic-Non-Aromatic Hydrocarbon Mixtures Through Plasma-Grafted Membranes", Journal of Membrane Science, Mar. 1999, vol. 154, No. 2, pp. 221-228.
Wang, "Pervaporation Properties of Aromatic-Nonaromatic Hydrocarbons of Crosslinked Membranes of Copolymers Based on Diethyl Vinylbenzylphosphonate", Journal of Applied Polymer Science, 2003, vol. 87, pp. 2177-2185.
Wang, "Pervaporation Properties to Aromatic-Non-Aromatic Hydrocarbon Mixtures of Cross-Linked Membranes of Copoly(Methacrylates) With Pendant Phosphate and Carbamoylphosphonate Groups", Journal of Membrane Science, Apr. 2002, vol. 199, No. 1-2, pp. 13-27.
Wang, "Preparation and Properties of Pore-Filling Membranes Based on Sulfonated Copolyimides and Porous Polymide Matrix," Polymer, Jul. 2012, vol. 53, No. 15, pp. 3154-3162.
Wang, "Self-initiated Photopolymerization and Photografting of Acrylic Monomers," Macromolecular Rapid Communications, May 2004, vol. 25, No. 11, pp. 1095-1099.
Wang, "Sorption and Pervaporation Properties of Crosslinked Membranes of Poly(Ethylene Oxide Imide) Segmented Copolymer to Aromatic/Nonaromatic Hydrocarbon Mixtures", Journal of Polymer Science: Part B, Polymer Physics, Jul. 2000, vol. 38, No. 13, pp. 1800-1811.
White, "Development of Large-Scale Applications in Organic Solvent Nanofiltration and Pervaporation for Chemical and Refining Processes", Journal of Membrane Science, Dec. 2006, vol. 286, No. 1-2, pp. 26-35.
White, "New Applications of Organic Solvent Nanofiltration and Pervaporation in Chemical and Refining Processes", AIChE Paper, AIChE Annual Meeting 2005, 2 pages.
Wight, "Oxygen Inhibition of Acrylic Photopolymerization," Journal of Polymer Science Part C, Polymer Letters Edition, Mar. 1978, vol. 16, No. 3, pp. 121-127.
Xu, "Carboxylic Acid Containing Polyimides for Pervaporation Separations of Toluene-iso-Octane Mixtures", Journal of Membrane Science, Jul. 2003, vol. 219, No. 1-2, pp. 89-102.
Yamaguchi, "A Pore-Filling Electrolyte Membrane-Electrode Integrated System for a Direct Methanol Fuel Cell Application", Journal of Electrochemical Society, 2002, vol. 149, No. 11, pp. A1448-A1453.
Yamaguchi, "An Extremely Low Methanol Crossover and Highly Durable Aromatic Pore-Filling Electrolyte Membrane for Direct Methanol Fuel Cells", Advanced Materials, Feb. 2007, vol. 19, No. 4, pp. 592-596.
Yamaguchi, "Plasma-Graft Filling Polymerization: Preparation of a New Type of Pervaporation Membrane for Organic Liquid Mixtures", Macromolecules, 1991, vol. 24, pp. 5522-5527.
Yamaguchi, "Solubility and Pervaporation Properties of the Filling-Polymerized Membrane Prepared by Plasma-Graft Polymerization for Pervaporation of Organic-Liquid Mixtures", Industrial & Engineering Chemistry Research, 1992, vol. 31, pp. 1914-1919.
Yang, "Advances in Pervaporation Membranes for Separating Mixtures of Aromatic and Aliphatic Hydrocarbons", Progress in Chemistry, Jul. 2001, vol. 13, No. 4, pp. 303-309.
Yeom, "A New Method for Determining the Diffusion Coefficients of Penetrants Through Polymeric Membranes from Steady-State Pervaporation Experiments", Journal of Membrane Science, 1992, vol. 68, pp. 11-20.
Yildrim "Separation of Benzene-Cyclohexane Mixtures by Pervaporation using PEBA Membranes", Desalination, Jan. 2008, vol. 219, No. 1-3, pp. 14-25.
Yoo, "$CO_2$ Separation Membranes Using Ionic Liquids in a Nafion Matrix", Journal of Membrane Science, Nov. 2010, vol. 363, pp. 72-79.
Yuan Xu, "Synthesized Polyimide Membranes for Pervaporation Separations of Toluene-ISO-Octane Mixtures", The University of Texas Thesis, Dec. 2005, 187 pages.
Zeng, "A New Group-Contribution Model of Mass Transport Through Dense Polymeric Membrane and Its Application I: A Universal Model Format for Dense Polymeric Membrane", ACS Paper, 232nd National Meeting, Sep. 2006, 1 page.

(56) References Cited

OTHER PUBLICATIONS

Zhao, "Functionalized Metal-Organic Polyhedra Hybrid Membranes for Aromatic Hydrocarbons Recovery", The American Institute of Chemical Engineers(AIChE) Journal, Oct. 2016, vol. 62, No. 10, pp. 3706-3716.
Zhao, "Sorption and Transport of Methanol and Ethanol in $H^+$-Nafion", Polymer, Mar. 2012, vol. 53, No. 6, pp. 1267-1276.
International Search Report for PCT International Application No. PCT/US2016/040655, dated Sep. 20, 2016, 6 pages.

\* cited by examiner

POLYMERIC IONOMER SEPARATION MEMBRANES AND METHODS OF USE

CROSS REFERENCE TO RELATED APPLICATIONS

This application is a national stage filing under 35 U.S.C. 371 of PCT/US2016/040655, filed Jul. 1, 2016, which claims the benefit of U.S. Provisional Application No. 62/187,524, filed Jul. 1, 2015 and U.S. Provisional Application No. 62/203,657, filed Aug. 11, 2015, the disclosures of which are incorporated by reference in their entireties herein.

BACKGROUND

Separation membranes are known; however, there is a continual need for effective composite membranes.

SUMMARY OF THE INVENTION

The present disclosure provides separation membranes (e.g., composite membranes) and methods of use of such membranes in separation techniques. Generally, the separation membranes include a polymeric ionomer, wherein the polymeric ionomer has a highly fluorinated backbone and recurring pendant groups according to the following formula:

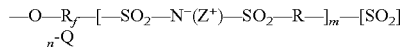

wherein:
  $R_f$ is a perfluorinated organic linking group;
  R is an organic linking group;
  $Z^+$ is $H^+$, a monovalent cation, or a multivalent cation;
  Q is H, F, $-NH_2$, $-O^-Y^+$, or $-C_xF_{2x+1}$;
  $Y^+$ is $H^+$, a monovalent cation, or a multivalent cation;
  x=1 to 4;
  m=0 to 6; and
  n=0 or 1;
  with the proviso that at least one of m or n must be non-zero.

In certain embodiments, the separation membranes may be composite membranes that include a porous substrate (i.e., a support substrate that may include one or more layers) that includes opposite first and second major surfaces, and a plurality of pores; and a polymeric ionomer that forms a layer having a thickness in and/or on the porous substrate.

In certain embodiments the layer is a continuous layer. In certain embodiments the composite membrane is an asymmetric composite membrane. For composite membranes that are asymmetric, the amount of the polymeric ionomer at, or adjacent to, the first major surface is greater than the amount of the polymeric ionomer at, or adjacent to, the second major surface.

Such membranes are particularly useful for selectively pervaporating a first liquid from a mixture that includes the first liquid and a second liquid, generally because the polymeric ionomer is more permeable to the first liquid than the second liquid.

Separation membranes of the present disclosure may be included in a cartridge, which may be part of a system such as a flex-fuel engine.

The present disclosure also provides methods. For example, the present disclosure provides a method of separating by pervaporating a first liquid (e.g., ethanol) from a mixture of the first liquid (e.g., ethanol) and a second liquid (e.g., gasoline), the method comprising contacting the mixture with a separation membrane (e.g., a composite membrane, and preferably, an asymmetric composite membrane) as described herein.

The terms "polymer" and "polymeric material" include, but are not limited to, organic homopolymers, copolymers, such as for example, block, graft, random and alternating copolymers, terpolymers, etc., and blends and modifications thereof. Furthermore, unless otherwise specifically limited, the term "polymer" shall include all possible geometrical configurations of the material. These configurations include, but are not limited to, isotactic, syndiotactic, and atactic symmetries.

Herein, the term "comprises" and variations thereof do not have a limiting meaning where these terms appear in the description and claims. Such terms will be understood to imply the inclusion of a stated step or element or group of steps or elements but not the exclusion of any other step or element or group of steps or elements. By "consisting of" is meant including, and limited to, whatever follows the phrase "consisting of." Thus, the phrase "consisting of" indicates that the listed elements are required or mandatory, and that no other elements may be present. By "consisting essentially of" is meant including any elements listed after the phrase, and limited to other elements that do not interfere with or contribute to the activity or action specified in the disclosure for the listed elements. Thus, the phrase "consisting essentially of" indicates that the listed elements are required or mandatory, but that other elements are optional and may or may not be present depending upon whether or not they materially affect the activity or action of the listed elements.

The words "preferred" and "preferably" refer to claims of the disclosure that may afford certain benefits, under certain circumstances. However, other claims may also be preferred, under the same or other circumstances. Furthermore, the recitation of one or more preferred claims does not imply that other claims are not useful, and is not intended to exclude other claims from the scope of the disclosure.

In this application, terms such as "a," "an," and "the" are not intended to refer to only a singular entity, but include the general class of which a specific example may be used for illustration. The terms "a," "an," and "the" are used interchangeably with the term "at least one." The phrases "at least one of" and "comprises at least one of" followed by a list refers to any one of the items in the list and any combination of two or more items in the list.

As used herein, the term "or" is generally employed in its usual sense including "and/or" unless the content clearly dictates otherwise.

The term "and/or" means one or all of the listed elements or a combination of any two or more of the listed elements.

Also herein, all numbers are assumed to be modified by the term "about" and in certain embodiments, preferably, by the term "exactly." As used herein in connection with a measured quantity, the term "about" refers to that variation in the measured quantity as would be expected by the skilled artisan making the measurement and exercising a level of care commensurate with the objective of the measurement and the precision of the measuring equipment used. Herein, "up to" a number (e.g., up to 50) includes the number (e.g., 50).

Also herein, the recitations of numerical ranges by endpoints include all numbers subsumed within that range as well as the endpoints (e.g., 1 to 5 includes 1, 1.5, 2, 2.75, 3, 3.80, 4, 5, etc.).

As used herein, the term "room temperature" refers to a temperature of 20° C. to 25° C. or 22° C. to 25° C.

The above summary of the present disclosure is not intended to describe each disclosed embodiment or every implementation of the present disclosure. The description that follows more particularly exemplifies illustrative embodiments. In several places throughout the application, guidance is provided through lists of examples, which examples may be used in various combinations. In each instance, the recited list serves only as a representative group and should not be interpreted as an exclusive list.

DETAILED DESCRIPTION OF ILLUSTRATIVE EMBODIMENTS

The present disclosure provides separation membranes that include a polymeric ionomer.

In certain embodiments, the polymeric ionomer can be a free-standing separation membrane.

In certain embodiments, the separation membranes are composite membranes (preferably, asymmetric composite membranes) that include a porous substrate and a polymeric ionomer. The porous substrate has opposite first and second major surfaces, and a plurality of pores. The polymeric ionomer may be disposed only in at least a portion of the plurality of pores (forming a pore-filling polymer layer), or the polymeric ionomer may be disposed on the surface (forming a top coating polymer layer), or the polymeric ionomer may be disposed both in and on the surface.

In certain embodiments in which the composite membranes are asymmetric composite membranes, the amount of the polymeric ionomer at, or adjacent to, the first major surface is greater than the amount of the polymeric ionomer at, or adjacent to, the second major surface. Hence, a composite membrane is asymmetric with respect to the amount of polymeric ionomer (pore-filling polymer) throughout the thickness of the porous substrate.

Such separation membranes may be used in various separation methods, including pervaporation, gas separation, vapor permeation, nanofiltration, organic solvent nanofiltration, and combinations thereof (e.g., a combination of pervaporation and vapor permeation). Such separation methods may be used to separate a first fluid (i.e., liquid and/or vapor) from a feed mixture of a first fluid (i.e., liquid and/or vapor) and a second fluid (i.e., liquid and/or vapor). The preferred separation membranes of the present disclosure are particularly useful in pervaporation methods to separate a first liquid from a feed mixture of a first liquid and a second liquid.

In certain embodiments, separation membranes of the present disclosure are composite membranes and include a porous substrate (i.e., a support substrate which may be in the form of one or more porous layers) that includes opposite first and second major surfaces, and a plurality of pores; and a polymeric ionomer that forms a layer having a thickness in and/or on the porous substrate. In certain embodiments, the polymeric ionomer layer is preferably a continuous layer. The amount of the polymeric ionomer at, or adjacent to, the first major surface is greater than the amount of the polymeric ionomer at, or adjacent to, the second major surface in an asymmetric composite membrane.

Figure 1:
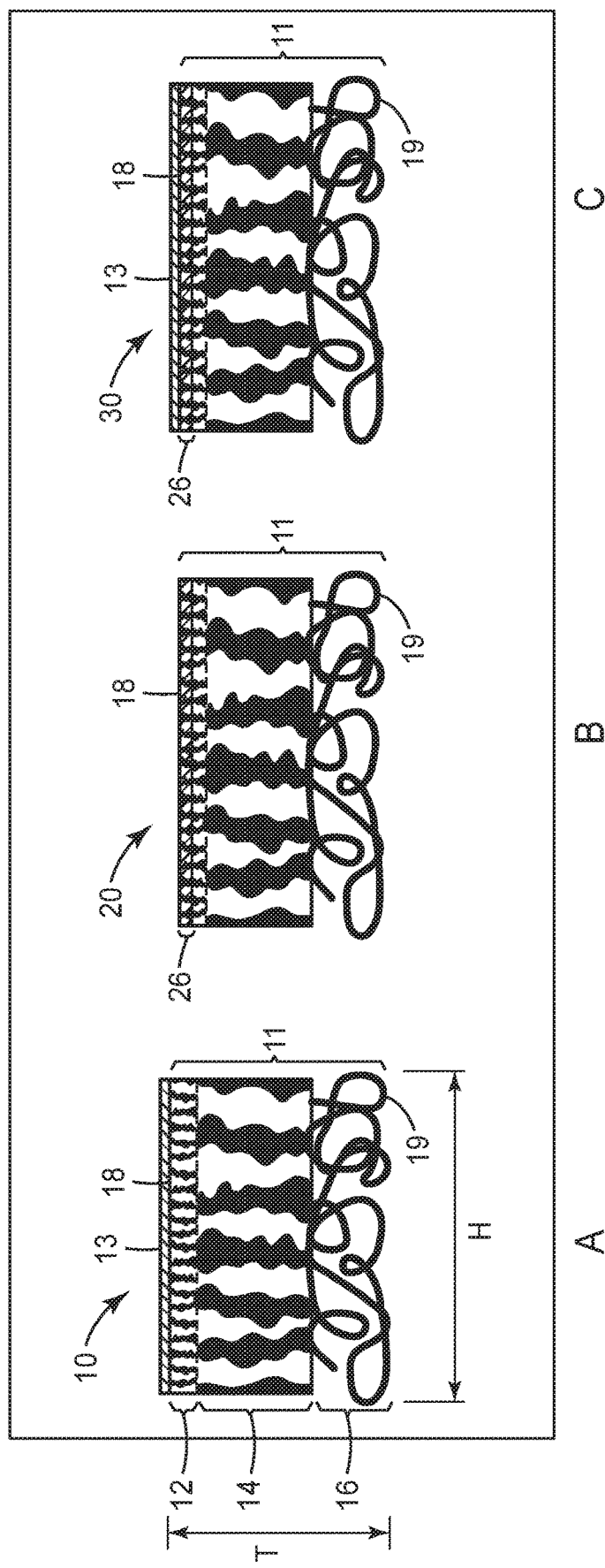
FIGS. 1A, 1B, and 1C are cross-sectional schematic views of exemplary porous substrates and an asymmetric composite membranes of the present disclosure. The porous structure of the porous substrate is not to scale and not representative of the actual structure.

FIG. 1 provides illustrations of: a first exemplary asymmetric composite membrane 10 that includes a porous substrate 11 with polymeric ionomer coated only in a layer 13 on first major surface 18 of the porous substrate (FIG. 1A); a second exemplary asymmetric composite membrane 20 that includes porous substrate 11 with polymeric ionomer coated only in a portion of the pores of the porous substrate forming a pore-filling polymer layer 26 adjacent to major surface 18 (FIG. 1B); and an exemplary asymmetric composite membrane 30 with polymeric ionomer coated both in a layer 13 on first major surface 18 and in a portion of the pores of the porous substrate forming a pore-filling polymer layer 26 adjacent to major surface 18 (FIG. 1C), all shown in vertical cross-section.

The exemplary porous substrate 11 shown in FIG. 1 includes three layers that include a nanoporous layer 12, a microporous layer 14, and a macroporous layer 16 (FIG. 1A) having a first major surface 18 and a second major surface 19. It should be understood that a porous substrate suitable for use in the composite membranes of the present disclosure does not require either a nanoporous layer 12 or a macroporous layer 16.

In a porous substrate 11, the pores are interconnected vertically (i.e., throughout the thickness "T" of the porous substrate 11, see FIG. 1A). In certain preferred embodiments, the pores of the porous substrate 11 are interconnected horizontally (e.g., as in a microfiltration membrane) along dimension "H" (see FIG. 1A). In such embodiments, the pore-filling polymer layer 26 (FIGS. 1B and 1C) formed by the pore-filling polymeric ionomer is preferably a continuous layer. If the pores of the porous substrate 11 are not all interconnected horizontally (along dimension "H"), the layer 26 is discontinuous (i.e., the pore-filling polymer forms a plurality of discreet regions within the porous substrate). It will be understood that dimension "H" generally refers to the plane of the porous substrate and is exemplary of all the various horizontal dimensions within a horizontal slice of the substrate (shown in vertical cross-section). Whether layer 26 is continuous or discontinuous, for the asymmetric composite membrane, the amount of the pore-filling polymeric ionomer at, or adjacent to, the first major surface 18 is greater than the amount of the polymer at, or adjacent to, the second major surface 19.

Referring to FIG. 1A, the polymeric ionomer forms a coating 13 on (i.e., covers) the top surface 18 of the substrate 11. Referring to FIG. 1C, the polymeric ionomer forms a coating 13 on (i.e., covers) the top surface 18 of the substrate 11 in addition to being within the pores of the substrate forming layer 26. This coating layer 13 may be continuous or discontinuous.

Thus, in certain embodiments, the polymeric ionomer is in the form of a pore-filling polymer layer 26 (FIG. 1C) that forms at least a portion of the first major surface 18 of the porous substrate. In certain embodiments, the polymeric ionomer is in the form of a pore-filling polymer layer having an exposed major surface, which coats the first major surface of the porous substrate, and an opposite major surface disposed between the opposite first and second major surfaces of the porous substrate. In certain embodiments, the exposed major surface of the polymeric ionomer layer coats all the first major surface of the porous substrate.

As used herein, a continuous layer refers to a substantially continuous layer as well as a layer that is completely continuous. That is, as used herein, any reference to the polymeric ionomer layer coating or covering the first major surface of the porous substrate includes the polymeric ionomer layer coating all, substantially all, or only a portion of the first major surface of the porous substrate. The polymeric ionomer layer is considered to coat substantially all of the first major surface of the porous substrate (i.e., be substantially continuous), when enough of the first major surface of the porous substrate is coated such that the composite membrane is able to selectively separate (e.g., pervaporate) a desired amount of a first fluid (e.g., first liquid such as alcohol) from a mixture of the first fluid (e.g., first liquid) with a second fluid (e.g., second liquid such as gasoline). In particular, the flux and the selectivity of the separation membrane (with a "continuous layer" of polymeric ionomer) is sufficient for the particular system in which the membrane is used.

In certain embodiments, the polymeric ionomer layer (both layer 13 and/or pore-filling layer 26) has a thickness in the range of from 10 nm up to and including 50,000 nm (50 microns), or up to and including 20,000 nm. More specifically, the thickness of the polymeric ionomer layer may include, in increments of 1 nm, any range between 10 nm and 20,000 nm. For example, the thickness of the polymeric ionomer layer may be in the range of from 11 nm to 5999 nm, or 20 nm to 6000 nm, or 50 nm to 5000 nm, etc.

Separation membranes of the present disclosure may further include a (meth)acryl-containing polymer and/or an epoxy polymer. Such additional polymers provide improved durability and/or performance over the same separation membranes without either the (meth)acryl-containing polymer or epoxy polymer.

Separation membranes of the present disclosure may further include at least one of: (a) an ionic liquid mixed with the polymeric ionomer; or (b) an amorphous fluorochemical film disposed on the separation membrane, typically, on the side of the membrane the feed mixture enters. Such separation membranes demonstrate improved performance (e.g., flux) and/or durability over the same separation membranes without either the ionic liquid the amorphous fluorochemical film.

Pervaporation

Pervaporation is a process that involves a membrane in contact with a liquid on the feed or upstream side and a vapor on the "permeate" or downstream side. Usually, a vacuum and/or an inert gas is applied on the vapor side of the membrane to provide a driving force for the process. Typically, the downstream pressure is lower than the saturation pressure of the permeate.

Vapor permeation is quite similar to pervaporation, except that a vapor is contacted on the feed side of the membrane instead of a liquid. As membranes suitable for pervaporation separations are typically also suitable for vapor permeation separations, use of the term "pervaporation" may encompass both "pervaporation" and "vapor permeation."

Pervaporation may be used for desulfurization of gasoline, dehydration of organic solvents, isolation of aroma compounds or components, and removal of volatile organic compounds from aqueous solutions. In certain embodiments of the present disclosure, the asymmetric composite membranes are used for pervaporating alcohol from an alcohol and gasoline mixture.

Separation membranes described herein are particularly useful for selectively pervaporating a first liquid from a mixture that includes the first liquid and a second liquid, generally because the polymeric ionomer is more permeable to the first liquid than the second liquid.

In certain embodiments, the first liquid is a more polar liquid than the second liquid. The second liquid may be a nonpolar liquid.

In certain embodiments, the first liquid may be water, an alcohol (such as ethanol, methanol, 1-propanol, 2-propanol, 1-methoxy-2-propanol, or butanol), or an organic sulfur-containing compound (such as thiophene, tetrahydrothiophene, benzothiophene, 2-methylthiophene, or 2,5-dimethylthiophene).

In certain embodiments, the second liquid may be gasoline, an aliphatic or aromatic hydrocarbon (e.g., benzene, hexane, or cyclohexane), or an ether (such as methyl-tert-butylether, ethyl-tert-butylether).

In certain embodiments, the first liquid is an alcohol, and the second liquid is gasoline. Thus, in one embodiment of the present disclosure, an asymmetric composite membrane for selectively pervaporating alcohol from an alcohol and gasoline mixture is provided. This asymmetric composite membrane includes: a porous substrate having opposite first and second major surfaces, and a plurality of pores; and a pore-filling polymer disposed in at least some of the pores so as to form a continuous layer having a thickness, with the amount of the polymer at, or adjacent to, the first major surface being greater than the amount of the pore-filling polymer at, or adjacent to, the second major surface, wherein the polymer is more permeable to alcohol than gasoline.

Polymeric Ionomer

The polymeric ionomer has a highly fluorinated backbone and recurring pendant groups according to the following formula (Formula I):

$$-O-R_f-[-SO_2-N^-(Z^+)-SO_2-R-]_m-[SO_2]_n-Q$$

wherein:
R$_f$ is a perfluorinated organic linking group;
R is an organic linking group;
$Z^+$ is $H^+$, a monovalent cation, or a multivalent cation;
Q is H, F, $-NH_2$, $-O^-Y^+$, or $-C_xF_{2x+1}$;
$Y^+$ is $H^+$, a monovalent cation, or a multivalent cation;
x=1 to 4;
m=0 to 6; and
n=0 or 1;
with the proviso that at least one of m or n must be non-zero.

The polymeric ionomer is more permeable to the first liquid than the second liquid.

In certain embodiments, when m=0 and Q is $-O^-Y^+$, the first liquid is alcohol and the second liquid is gasoline.

Herein, a "highly fluorinated" backbone (i.e., the longest continuous chain) is one that contains at least 40 weight percent (wt-%) fluorine, based on the total weight of the backbone.

The number of pendant groups can be determined by the equivalent weight of the polymeric ionomer. Equivalent weight (EW) is a measure of the total acid content of the ionomer and is defined as the grams of polymer per mole of acid or acid salt (g/mol). Lower equivalent weight polymers will have a higher total acid or acid salt content. Typically, in Formula I, the acid or salt groups are sulfonic acid ($-SO_3^-X^+$), sulfonimide ($-SO_2N^-(Z^+)SO_2-$), or sulfonamide ($-SO_2NH_2$).

In certain embodiments, the equivalent weight is at least 400 grams per mole (g/mol), or at least 600 g/mol, or at least 700 g/mol. In certain embodiments, the equivalent weight is up to and including 1600 g/mol, or up to and including 1200 g/mol, or up to and including 1000 g/mol.

In Formula I, R$_f$ is a perfluorinated organic linking group. In certain embodiments, R$_f$ is $-(CF_2)_t-$ wherein t is 1 to 6, or 2 to 4. In certain embodiments, R$_f$ is $-CF_2-[C(CF_3)F-O-CF_2-CF_2]-$.

In Formula I, R is an organic linking group. R may be fluorinated (partially or fully) or nonfluorinated. R may be aromatic, aliphatic, or a combination thereof. In certain embodiments, R is a nonfluorinated aromatic group (e.g., phenyl). In certain embodiments R is an aliphatic group that is fluorinated, and optionally perfluorinated (e.g., $-(CF_2)_r-$ wherein r is 1 to 6, or 2 to 4).

In Formula I, $Z^+$ is $H^+$, a monovalent cation, or a multivalent cation. Examples of suitable monovalent cations include $Li^+$, $Na^+$, $K^+$, $Rb^+$, $Cs^+$, and $NR_4^+$ (wherein R is H or C1-4 alkyl groups). Examples of suitable multivalent cations include $Be^{2+}$, $Mg^{2+}$, $Ca^{2+}$, $Mn^{2+}$, $Fe^{2+}$, $Zn^{2+}$, $Co^{2+}$, $Ni^{2+}$, $Cu^{2+}$, $Fe^{3+}$, and $Al^{3+}$.

In Formula I, Q is H, F, $-NH_2$, $-O^-Y^+$, or $-C_xF_{2x+1}$. When Q is $-O^-Y^+$, $Y^+$ is $H^+$, or a monovalent cation, or multivalent cation. Exemplary cations are as described above for Z. When Q is $-C_xF_{2x+1}$, x=1 to 4.

In Formula I, m=0 to 6, or 2 to 4.

In certain embodiments, the polymeric ionomer has a highly fluorinated backbone and recurring pendant groups according to the following formula (Formula II):

$$-O-R_f-[SO_2]-Q$$

wherein:
R$_f$ is a perfluorinated organic linking group (as described above for Formula I);
Q is $-NH_2$ or $-O^-Y^+$; and
$Y^+$ is $H^+$, a monovalent cation, or a multivalent cation (as described above for Formula I);
with the proviso that when Q is $-O^-Y^+$, the first liquid is alcohol and the second liquid is gasoline.

Examples of polymeric ionomers of Formula II include those described in U.S. Pat. No. 7,348,088, or commercially available from DuPont under the trade name NAFION.

In certain embodiments, the polymeric ionomer has a highly fluorinated backbone and recurring pendant groups according to the following formula (Formula III):

$$-O-R_f-[-SO_2-N^-(Z^+)-SO_2-R-]_m-Q$$

wherein:
R$_f$ is a perfluorinated organic linking group (as described above for Formula I);
R is an organic linking group (as described above for Formula I);
$Z^+$ is $H^+$, a monovalent cation, or a multivalent cation (as described above for Formula I);
Q is H, F, $-NH_2$, $-O^-Y^+$, or $-C_xF_{2x+1}$;
$Y^+$ is $H^+$, or a monovalent cation, or multivalent cation (as described above for Formula I);
x=1 to 4; and
m=1 to 6.

Examples of polymeric ionomers of Formula III include those described in U.S. Pat. Pub. No. 2013/0029249.

In certain embodiments, the polymeric ionomer is more permeable to a first liquid than a second liquid.

The polymeric ionomer may be crosslinked. For example, it may be grafted to the porous (substrate) membrane (e.g., which may be in the form of a nanoporous layer). Or, it may be crosslinked and grafted to the porous substrate (e.g., nanoporous layer).

Optional Substrate

In certain embodiments, the polymeric ionomer is a free-standing film. That is, the separation membrane is the polymeric ionomer with no supporting substrate. Thus, the polymeric ionomer is a free-standing membrane.

In certain embodiments, the polymeric ionomer forms a layer on the surface of a substrate, which may or may not be porous. Suitable substrates typically provide mechanical support for the polymeric ionomer. They may be in the form of films, membranes, fibers, foams, webs (e.g., knitted, woven, or nonwoven), etc.

The substrate may include one layer or multiple layers. For example, there may be two, three, four, or more layers.

In some embodiments, the substrate is hydrophobic. In other embodiments, the substrate is hydrophilic.

The materials that may be used in supporting substrates may be organic in nature (such as the organic polymers listed below), inorganic in nature (such as aluminum, steels, and sintered metals and/or ceramics and glasses), or a combination thereof. For example, the substrate may be formed from polymeric materials, ceramic and glass materials, metal, and the like, or combinations (i.e., mixtures and copolymers) thereof.

In separation membranes (e.g., composite membranes) of the present disclosure, materials that withstand hot gasoline environment and provide sufficient mechanical strength to the separation membranes are preferred. Materials having good adhesion to each other are particularly desirable.

In certain embodiments, the substrate is a porous substrate. In certain embodiments, it is preferably a polymeric porous substrate. In certain embodiments, it is preferably a ceramic porous substrate.

A porous substrate itself may be asymmetric or symmetric. If the porous substrate is asymmetric (before being combined with the polymeric ionomer), the first and second major surfaces have porous structures with different pore morphologies. For example, the porous substrate may have pores of differing sizes throughout its thickness. Analogously, if the porous substrate is symmetric (before being combined with the polymeric ionomer), the major surfaces have porous structures wherein their pore morphologies are the same. For example, the porous substrate may have pores of the same size throughout its thickness.

If the substrate is a porous substrate comprising opposite first and second major surfaces, and a plurality of pores, the polymeric ionomer forms a polymer layer having a thickness in and/or on the porous substrate. In certain embodiments, the polymer layer has a thickness in the range of from 10 nm up to and including 50 microns (50,000 nm).

In certain embodiments, the polymeric ionomer forms a layer on the surface of a porous substrate. In certain embodiments, the polymeric ionomer fills at least a portion of the pores of a porous substrate (i.e., the polymeric ionomer is a pore-filling polymer). In certain embodiments, the polymeric ionomer both fills at least a portion of the pores of a porous substrate and forms a layer on the surface of the porous substrate. Thus, the polymeric ionomer is not restricted within pores of a porous substrate in separation membranes of the present disclosure.

Referring to FIG. 1A, an asymmetric substrate is shown with different pore morphologies at the first major surface 18 and the second major surface 19. More specifically, there are three layers each of different pore size such that the overall substrate has pores of differing sizes throughout its thickness "T." In certain embodiments, nanoporous layer 12 alone could function as the porous substrate. In such embodiments, the porous substrate would be symmetric.

Suitable porous substrates include, for example, films, porous membranes, woven webs, nonwoven webs, hollow fibers, and the like. For example, the porous substrates may be made of one or more layers that include films, porous films, micro-filtration membranes, ultrafiltration membranes, nanofiltration membranes, woven materials, and nonwoven materials.

Suitable polymeric materials for use in the supporting substrate of a separation membrane of the present disclosure include, for example, polystyrene, polyolefins, polyisoprenes, polybutadienes, fluorinated polymers (e.g., polyvinylidene fluoride (PVDF), ethylene-co-chlorotrifluoroethylene copolymer (ECTFE), polytetrafluoroethylene (PTFE)), polyvinyl chlorides, polyesters (PET), polyamides (e.g., various nylons), polyimides, polyethers, poly(ether sulfone)s, poly(sulfone)s, poly(phenylene sulfone)s, polyphenylene oxides, polyphenylene sulfides (PPS), poly(vinyl acetate)s, copolymers of vinyl acetate, poly(phosphazene)s, poly(vinyl ester)s, poly(vinyl ether)s, poly(vinyl alcohol)s, polycarbonates, polyacrylonitrile, polyethylene terephthalate, cellulose and its derivatives (such as cellulose acetate and cellulose nitrate), and the like, or combinations (i.e., mixtures or copolymers) thereof.

Suitable polyolefins include, for example, poly(ethylene), poly (propylene), poly(1-butene), copolymers of ethylene and propylene, alpha olefin copolymers (such as copolymers of 1-butene, 1-hexene, 1-octene, and 1-decene), poly(ethylene-co-1-butene), poly(ethylene-co-1-butene-co-1-hexene), and the like, or combinations (i.e., mixtures or copolymers) thereof.

Suitable fluorinated polymers include, for example, polyvinylidene fluoride (PVDF), polyvinyl fluoride, copolymers of vinylidene fluoride (such as poly(vinylidene fluoride-co-hexafluoropropylene)), copolymers of chlorotrifluoroethylene (such as ethylene-co-chlorotrifluoroethylene copolymer), polytetrafluoroethylene, and the like, or combinations (i.e., mixtures or copolymers) thereof.

Suitable polyamides include, for example, poly(imino(1-oxohexamethylene)), poly(iminoadipoylimino hexamethylene), poly(iminoadipoyliminodecamethylene), polycaprolactam, and the like, or combinations thereof.

Suitable polyimides include, for example, poly(pyromellitimide), polyetherimide, and the like.

Suitable poly(ether sulfone)s include, for example, poly (diphenylether sulfone), poly(diphenylsulfone-co-diphenylene oxide sulfone), and the like, or combinations thereof.

Suitable polyethers include, for example, polyetherether ketone (PEEK).

In certain embodiments, particularly for the optional (meth)acryl-containing materials described herein, substrate materials may be photosensitive or non-photosensitive. Photosensitive porous substrate materials may act as a photoinitiator and generate radicals which initiate polymerization under radiation sources, such as UV radiation, so that the optional (meth)acryl-containing polymerizable material could covalently bond to the porous substrate. Suitable photosensitive materials include, for example, polysulfone, polyethersulfone, polyphenylenesulfone, PEEK, polyimide, PPS, PET, and polycarbonate. Photosensitive materials are preferably used for nanoporous layers.

Suitable porous substrates may have pores of a wide variety of sizes. For example, suitable porous substrates may include nanoporous membranes, microporous membranes, microporous nonwoven/woven webs, microporous woven webs, microporous fibers, nanofiber webs and the like. In some embodiments, the porous substrate may have a combination of different pore sizes (e.g., micropores, nanopores, and the like). In one embodiment, the porous substrate is microporous.

In some embodiments, the porous substrate includes pores that may have an average pore size less than 10 micrometers (pm). In other embodiments, the average pore size of the porous substrate may be less than 5 μm, or less than 2 μm, or less than 1 μm.

In other embodiments, the average pore size of the porous substrate may be greater than 10 nm (nanometer). In some embodiments, the average pore size of the porous substrate is greater than 50 nm, or greater than 100 nm, or greater than 200 nm.

In certain embodiments, the porous substrate includes pores having an average size in the range of from 0.5 nm up to and including 1000 μm. In some embodiments, the porous substrate may have an average pore size in a range of 10 nm to 10 μm, or in a range of 50 nm to 5 μm, or in a range of 100 nm to 2 μm, or in a range of 200 nm to 1 μm.

In certain embodiments, the porous substrate includes a nanoporous layer. In certain embodiments, the nanoporous layer is adjacent to or defines the first major surface of the porous substrate. In certain embodiments, the nanoporous layer includes pores having a size in the range of from 0.5 nanometer (nm) up to and including 100 nm. In accordance with the present disclosure, the size of the pores in the nanoporous layer may include, in increments of 1 nm, any range between 0.5 nm and 100 nm. For example, the size of the pores in the nanoporous layer may be in the range of from 0.5 nm to 50 nm, or 1 nm to 25 nm, or 2 nm to 10 nm, etc. Molecular Weight Cut-Off (MWCO) is typically used to correlate to the pore size. That is, for nanopores, the molecular weight of a polymer standard (retain over 90%) such as dextran, polyethylene glycol, polyvinyl alcohol, proteins, polystyrene, poly(methylmethacrylate) may be used to characterize the pore size. For example, one supplier of the porous substrates evaluates the pore sizes using a standard test, such as ASTM E1343-90-2001 using polyvinyl alcohol.

In certain embodiments, the porous substrate includes a microporous layer. In certain embodiments, the microporous layer is adjacent to or defines the first major surface of the porous substrate. In certain embodiments, the microporous layer includes pores having a size in the range of from 0.01 µm up to and including 20 µm. In accordance with the present disclosure, the size of the pores in the microporous layer may include, in increments of 0.05 µm, any range between 0.01 µm up and 20 µm. For example, the size of the pores in the microporous layer may be in the range of from 0.05 µm to 10 µm, or 0.1 µm to 5 µm, or 0.2 µm to 1 µm, etc. Typically, the pores in the microporous layer may be measured by mercury porosimetry for average or largest pore size, bubble point pore size measurement for the largest pores, Scanning Electron Microscopy (SEM) and/or Atom Force Microscopy (AFM) for the average/largest pore size.

In certain embodiments, the porous substrate includes a macroporous layer. In certain embodiments, the macroporous layer is adjacent to or defines the first major surface of the porous substrate. In certain embodiments, the macroporous layer is embedded between two microporous layers, for example a BLA020 membrane obtained from 3M Purification Inc.

In certain embodiments, the macroporous layer comprises pores having a size in the range of from 1 µm and 1000 µm. In accordance with the present disclosure, the size of the pores in the macroporous layer may include, in increments of 1 µm, any range between 1 µm up to and including 1000 µm. For example, the size of the pores in the macroporous substrate may be in the range of from 1 µm to 500 µm, or 5 µm to 300 µm, or 10 µm to 100 µm, etc. Typically, the size of the pores in the macroporous layer may be measured by Scanning Electron Microscopy, or Optical Microscopy, or using a Pore Size Meter for Nonwovens.

The macroporous layer is typically preferred at least because the macropores not only provide less vapor transport resistance, compared to microporous or nanoporous structures, but the macroporous layer can also provide additional rigidity and mechanical strength.

The thickness of the porous substrate selected may depend on the intended application of the membrane. Generally, the thickness of the porous substrate ("T" in FIG. 1A) may be greater than 10 micrometers (µm). In some embodiments, the thickness of the porous substrate may be greater than 1,000 µm, or greater than 5,000 µm. The maximum thickness depends on the intended use, but may often be less than or equal to 10,000 µm.

In certain embodiments, the porous substrate has first and second opposite major surfaces, and a thickness measured from one to the other of the opposite major surfaces in the range of from 5 µm up to and including 500 µm. In accordance with the present disclosure, the thickness of the porous substrate may include, in increments of 25 µm, any range between 5 µm and 500 µm. For example, the thickness of the porous substrate may be in the range of from 50 µm to 400 µm, or 100 µm to 300 µm, or 150 µm to 250 µm, etc.

In certain embodiments, the nanoporous layer has a thickness in the range of from 0.01 µm up to and including 10 µm. In accordance with the present disclosure, the thickness of the nanoporous layer may include, in increments of 50 nm, any range between 0.01 µm and 10 µm. For example, the thickness of the nanoporous layer may be in the range of from 50 nm to 5000 nm, or 100 nm to 3000 nm, or 500 nm to 2000 nm, etc.

In certain embodiments, the microporous layer has a thickness in the range of from 5 µm up to and including 300 µm. In accordance with the present disclosure, the thickness of the microporous layer may include, in increments of 5 µm, any range between 5 µm and 300 µm. For example, the thickness of the microporous layer may be in the range of from 5 µm to 200 µm, or 10 µm to 200 µm, or 20 µm to 100 µm, etc.

In certain embodiments, the macroporous layer has a thickness in the range of from 25 µm up to and including 500 µm. In accordance with the present disclosure, the thickness of the macroporous layer may include, in increments of 25 µm, any range between 25 µm up and 500 µm. For example, the thickness of the macroporous substrate may be in the range of from 25 µm to 300 µm, or 25 µm to 200 µm, or 50 µm to 150 µm, etc.

In certain embodiments, there may be anywhere from one to four layers in any combination within a porous substrate. The individual thickness of each layer may range from 5 nm to 1500 µm in thickness.

In certain embodiments, each layer may have a porosity that ranges from 0.5% up to and including 95%.

Optional (Meth)Acryl-Containing and/or Epoxy Additives

Separation membranes of the present disclosure may further include a (meth)acryl-containing polymer and/or an epoxy polymer. In certain embodiments, such separation membranes demonstrate improved durability over the same separation membranes without the (meth)acryl-containing polymer or epoxy polymer. Improved durability may be demonstrated by reduced mechanical damage (e.g., abrasions, scratches, or erosion, or crack generation upon membrane folding)), reduced fouling, and/or reduced chemical attack.

In certain embodiments, the (meth)acryl-containing polymer and/or epoxy polymer may be mixed with the polymeric ionomer. They may form an interpenetrating network within the polymeric ionomer.

In certain embodiments, the (meth)acryl-containing polymer and/or epoxy polymer form separate layers from that of the polymeric ionomer. For example, the (meth)acryl-containing polymer may be a pore-filling polymer in the porous substrate and the polymeric ionomer may be coated on top of the porous substrate. Similarly, the epoxy polymer may be a pore-filling polymer in the porous substrate and the polymeric ionomer may be coated on top of the porous substrate. Membranes made using such multi-layered coatings are referred to herein as hybrid membranes.

In certain embodiments, the starting materials for the (meth)acryl-containing polymer (which refers to acrylate and methacrylate polymers) include (meth)acryl-containing monomers and/or oligomers. Suitable (meth)acryl-containing monomers and/or oligomers may be selected from the group of a polyethylene glycol (meth)acrylate, a polyethylene glycol di(meth)acrylate, a silicone diacrylate, a silicone hexa-acrylate, a polypropylene glycol di(meth)acrylate, an ethoxylated trimethylolpropane triacrylate, a hydroxylmethacrylate, 1H,1H,6H,6H-perfluorohydroxyldiacrylate, a urethane diacrylate, a urethane hexa-acrylate, a urethane triacrylate, a polymeric tetrafunctional acrylate, a polyester penta-acrylate, an epoxy diacrylate, a polyester triacrylate, a polyester tetra-acrylate, an amine-modified polyester triacrylate, an alkoxylated aliphatic diacrylate, an ethoxylated bisphenol di(meth)acrylate, a propoxylated triacrylate, and 2-acrylamido-2-methylpropanesulfonic acid (AMPS). Various combinations of such monomers and/or oligomers may be used to form the pore-filling polymer.

In certain embodiments, the (meth)acryl-containing monomers and/or oligomers may be selected from the group of a polyethylene glycol (meth)acrylate, a polyethylene glycol di(meth)acrylate, a silicone diacrylate, a silicone hexa-acrylate, a polypropylene glycol di(meth)acrylate, an ethoxylated trimethylolpropane triacrylate, a hydroxylmethacrylate, 1H,1H,6H,6H-perfluorohydroxyldiacrylate, and a polyester tetra-acrylate. Various combinations of such monomers and/or oligomers may be used to form the pore-filling polymer.

In certain embodiments, the starting monomers and/or oligomers include one or more of the following:
(a) di(meth)acryl-containing compounds such as dipropylene glycol diacrylate, ethoxylated (10) bisphenol A diacrylate, ethoxylated (3) bisphenol A diacrylate, ethoxylated (30) bisphenol A diacrylate, ethoxylated (4) bisphenol A diacrylate, hydroxypivalaldehyde modified trimethylolpropane diacrylate, neopentyl glycol diacrylate, polyethylene glycol (200) diacrylate, polyethylene glycol (400) diacrylate, polyethylene glycol (600) diacrylate, propoxylated neopentyl glycol diacrylate, tetraethylene glycol diacrylate, tricyclodecanedimethanol diacrylate, triethylene glycol diacrylate, and tripropylene glycol diacrylate;
(b) tri(meth)acryl-containing compounds such as trimethylolpropane triacrylate, ethoxylated triacrylates (e.g., ethoxylated (3) trimethylolpropane triacrylate, ethoxylated (6) trimethylolpropane triacrylate, ethoxylated (9) trimethylolpropane triacrylate, ethoxylated (20) trimethylolpropane triacrylate), pentaerythritol triacrylate, propoxylated triacrylates (e.g., propoxylated (3) glyceryl triacrylate, propoxylated (5.5) glyceryl triacrylate, propoxylated (3) trimethylolpropane triacrylate, propoxylated (6) trimethylolpropane triacrylate), and trimethylolpropane triacrylate;
(c) higher functionality (meth)acryl-containing compounds (i.e., higher than tri-functional) such as ditrimethylolpropane tetraacrylate, dipentaerythritol pentaacrylate, ethoxylated (4) pentaerythritol tetraacrylate, pentaerythritol tetraacrylate, and caprolactone modified dipentaerythritol hexaacrylate;
(d) oligomeric (meth)acryl compounds such as, for example, urethane acrylates, polyester acrylates, epoxy acrylates, silicone acrylates, polyacrylamide analogues of the foregoing, and combinations thereof (such compounds are widely available from vendors such as, for example, Sartomer Company, Exton, Pa., UCB Chemicals Corporation, Smyrna, Ga., and Aldrich Chemical Company, Milwaukee, Wis.);
(e) perfluoroalkyl meth(acryl)-containing compounds such as 1H,1H,6H,6H-perfluorohydroxyldiacrylate, 1H,1H-2,2,3,3,4,4,4-heptafluorobutyl acrylate, and perfluorocyclohexyl)methyl acrylate;
(f) charged meth(acryl)-containing compounds such as acrylic acid, 2-acrylamido-2-methylpropanefulfonic acid (AMPS), and [3-(Methacryloylamino)propyl] trimethylammonium chloride solution; and
(g) polar (meth)acrylate compounds such as 2-hydroxyethyl (meth)acrylate (HEMA) and glycerol methacrylate.

In certain embodiments, the epoxy polymers include those formed from one or more epoxy resin(s) and one or more curing agents. The epoxy has the general Formula IV:

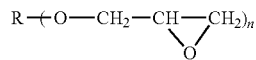

wherein: R includes one or more aliphatic groups, cycloaliphatic groups, and/or aromatic hydrocarbon groups, optionally wherein R further includes at least one ether linkage between adjacent hydrocarbon groups; and n is an integer greater than 1. Generally, n is the number of glycidyl ether groups and must be greater than 1 for at least one of the first epoxy resins of Formula I present in the adhesive. In some embodiments, n is 2 to 4.

Curing agents are compounds which are capable of crosslinking the epoxy resin. Typically, these agents are primary and/or secondary amines. The amines may be aliphatic, cycloaliphatic, or aromatic. In some embodiments, useful amine curing agents include those having the general Formula V:

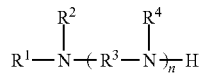

wherein: $R^1$, $R^2$, and $R^4$ are independently selected from hydrogen, a hydrocarbon containing 1 to 15 carbon atoms, and a polyether containing up to 15 carbon atoms; $R^3$ represents a hydrocarbon containing 1 to 15 carbon atoms or a polyether containing up to 15 carbon atoms; and n is from 2 to 10.

Exemplary epoxy resins include glycidyl ethers of bisphenol A, bisphenol F, and novolac resins as well as glycidyl ethers of aliphatic or cycloaliphatic diols. Examples of commercially available glycidyl ethers include polyglycerol polyglycidyl ether from Nagase Chemtex, Tokyo, Japan under the trade name of EX-512, EX521, sorbitol polyglycidyl ether from Nagase Chemtex Corp. Tokyo, Japan under the trade name of EX614B, diglycidylethers of bisphenol A (e.g., those available under the trade names EPON 828, EPON 1001, EPON 1310 and EPON 1510 from Hexion Specialty Chemicals GmbH, Rosbach, Germany, those available under the trade name D.E.R. from Dow Chemical Co. (e.g., D.E.R. 331, 332, and 334)

Examples of amine curing agents include ethylene amine, ethylene diamine, diethylene diamine, propylene diamine, hexamethylene diamine, 2-methyl-1,5-pentamethylene-diamine, triethylene tetramine ("TETA"), tetraethylene pentamine ("TEPA"), hexaethylene heptamine, and the like. Commercially available amine curing agents include those available from Air Products and Chemicals, Inc. under the trade name ANC AMINE. At least one of the amine curing agents is a polyether amine having one or more amine moieties, including those polyether amines that can be derived from polypropylene oxide or polyethylene oxide. Suitable polyether amines that can be used include those available from Huntsman under the trade name JEFFAMINE, and from Air Products and Chemicals, Inc. under the trade name ANCAMINE. Suitable commercially available polyetheramines include those sold by Huntsman under the JEFFAMINE trade name. Suitable polyether diamines include JEFFAMINEs in the D, ED, and DR series. These include JEFFAMINE D-230, D-400, D-2000, D-400, HK-511, ED- 600, ED-900, ED-2003, EDR-148, and EDR-176. Suitable polyether triamines include JEFFAMINEs in the T series. These include JEFFAMINE T-403, T-3000, and T-5000.

Optional Ionic Liquids

In certain embodiments, separation membranes of the present disclosure further include one or more ionic liquids mixed with one or more the polymeric ionomers.

Such composite membranes demonstrate improved performance (e.g., flux) over the same separation membranes without the ionic liquids. Improved performance may be demonstrated by increased flux while maintaining good ethanol selectivity.

An ionic liquid (i.e., liquid ionic compound) is a compound that is a liquid under separation conditions. It may or may not be a liquid during mixing with the polymeric ionomer, application to a substrate, storage, or shipping. In certain embodiments, the desired liquid ionic compound is liquid at a temperature of less than 100° C., and in certain embodiments, at room temperature.

Ionic liquids are salts in which the cation(s) and anion(s) are poorly coordinated. At least one of the ions is organic and at least one of the ions has a delocalized charge. This prevents the formation of a stable crystal lattice, and results in such materials existing as liquids at the desired temperature, often at room temperature, and at least, by definition, at less than 100° C.

In certain embodiments, the ionic liquid includes one or more cations selected from quaternary ammonium, imidazolium, pyrazolium, oxazolium, thiazolium, triazolium, pyridinium, piperidinium, pyridazinium, pyrimidinium, pyrazinium, pyrrolidinium, phosphonium, trialkylsulphonium, pyrrole, and guanidium.

In certain embodiments, the ionic liquid includes one or more anions selected from $Cl^-$, $Br^-$, $I^-$, $HSO_4^-$, $NO_3^-$, $SO_4^{2-}$, $CF_3SO_3^-$, $N(SO_2CF_3)_2^-$, $CH_3SO_3^-$, $B(CN)_4^-$, $C_4F_9SO_3^-$, $PF_6^-$, $N(CN)_4^-$, $C(CN)_4^-$, $BF_4^-$, $Ac^-$, $SCN^-$, $HSO_4^-$, $CH_3SO_4^-$, $C_2H_5SO_4^-$, and $C_4H_9SO_4^-$.

In certain embodiments, the ionic liquid is selected from 1-ethyl-3-methyl imidazolium tetrafluoroborate (Emim-$BF_4$), 1-ethyl-3-methyl imidazolium trifluoromethane sulfonate (Emim-TFSA), 3-methyl-N-butyl-pyridinium tetrafluoroborate, 3-methyl-N-butyl-pyridinium trifluoromethanesulfonate, N-butyl-pyridinium tetrafluoroborate, 1-butyl-2,3-dimethylimidazolium tetrafluoroborate, 1-butyl-2,3-dimethylimidazolium trifluoromethanesulfonate, 1-ethyl-3-methylimidazolium chloride, 1-butyl-3-ethylimidazolium chloride, 1-butyl-3-methylimidazolium chloride, 1-butyl-3-methylimidazolium bromide, 1-methyl-3-propylimidazolium chloride, 1-methyl-3-hexylimidazolium chloride, 1-methyl-3-octylimidazolium chloride, 1-methyl-3-decylimidazolium chloride, 1-methyl-3-dodecylimidazolium chloride, 1-methyl-3-hexadecylimidazolium chloride, 1-methyl-3-octadecylimidazolium chloride, 1-ethylpyridinium bromide, 1-ethylpyridinium chloride, 1-butylpyridinium chloride, and 1-benzylpyridinium bromide, 1-butyl-3-methylimidazolium iodide, 1-butyl-3-methylimidazolium nitrate, 1-ethyl-3-methylimidazolium bromide, 1-ethyl-3-methylimidazolium iodide, 1-ethyl-3-methylimidazolium nitrate, 1-butylpyridinium bromide, 1-butylpyridinium iodide, 1-butylpyridinium nitrate, 1-butyl-3-methylimidazolium hexafluorophosphate, 1-octyl-3-methylimidazolium hexafluorophosphate, 1-octyl-3-methylimidazolium tetrafluoroborate, 1-ethyl-3-methylimidazolium ethylsulfate, 1-butyl-3-methylimidazolium acetate, 1-butyl-3-methylimidazolium trifluoroacetate, 1-butyl-3-methyl imidazolium bis(trifluormethylsulfonyl)imide (Bmim-$Tf_2N$), and combinations thereof.

Optional Fluorochemical Films

In certain embodiments, composite membranes of the present disclosure further include an amorphous fluorochemical film disposed on the separation membrane. Typically, the film is disposed on the side of the separation membrane the feed mixture enters. It is possible, however, to include an amorphous fluorochemical film on both major surfaces of the separation membrane to further protect the polymeric ionomer.

In certain embodiments, such separation membranes demonstrate improved durability over the same separation membranes without the amorphous fluorochemical film. Improved durability may be demonstrated by reduced mechanical damage (e.g., abrasions, scratches, or erosion, or crack generation upon membrane folding), reduced fouling, reduced chemical attack, and/or reduced performance decline after exposure to gasoline or ethanol/gasoline mixture under separation conditions.

In certain embodiments, such separation membranes demonstrate improved performance over the same separation membranes without the amorphous fluorochemical film. Improved performance may be demonstrated by increased flux.

In certain embodiments, such amorphous fluorochemical film typically has a thickness of at least 0.001 µm, or at least 0.03 µm. In certain embodiments, such amorphous fluorochemical film typically has a thickness of up to and including 5 µm, or up to and including 0.1 µm.

In certain embodiments, the amorphous fluorochemical film is a plasma-deposited fluorochemical film, as described in U.S. Pat. Pub. 2003/0134515.

In certain embodiments, the plasma-deposited fluorochemical film is derived from one or more fluorinated compounds selected from: linear, branched, or cyclic saturated perfluorocarbons; linear, branched, or cyclic unsaturated perfluorocarbons; linear, branched, or cyclic saturated partially fluorinated hydrocarbons; linear, branched, or cyclic unsaturated partially fluorinated hydrocarbons; carbonylfluorides; perfluorohypofluorides; perfluoroether compounds; oxygen-containing fluorides; halogen fluorides; sulfur-containing fluorides; nitrogen-containing fluorides; silicon-containing fluorides; inorganic fluorides (such as aluminum fluoride and copper fluoride); and rare gas-containing fluorides (such as xenon difluoride, xenon tetrafluoride, and krypton hexafluoride).

In certain embodiments, the plasma-deposited fluorochemical film is derived from one or more fluorinated compounds selected from $CF_4$, $SF_6$, $C_2F_6$, $C_3F_8$, $C_4F_{10}$, $C_5F_{12}$, $C_6F_{14}$, $C_7F_{16}$, $C_8F_{18}$, $C_2F_4$, $C_3F_6$, $C_4F_8$, $C_5F_{10}$, $C_6F_{12}$, $C_4F_6$, $C_7F_{14}$, $C_8F_{16}$, $CF_3COF$, $CF_2(COF)_2$, $C_3F_7COF$, $CF_3OF$, $C_2F_5OF$, $CF_3COOF$, $CF_3OCF_3$, $C_2F_5OC_2F_5$, $C_2F_4OC_2F_4$, $OF_2$, $SOF_2$, $SOF_4$, $NOF$, $ClF_3$, $IF_5$, $BrF_5$, $BrF_3$, $CF_3I$, $C_2F_5I$, $N_2F_4$, $NF_3$, $NOF_3$, $SiF_4$, $SiF_4$, $Si_2F_6$, $XeF2$, $XeF_4$, $KrF_2$, $SF_4$, $SF_6$, monofluorobenzene, 1,2-difluorobenzene, 1,2,4-trifluorobenzene, pentafluorobenzene, pentafluoropyridine, and pentafluorotolenene.

In certain embodiments, the plasma-deposited fluorochemical film is derived from one or more hydrocarbon compounds in combination with one or more fluorinated compounds. Examples of suitable hydrocarbon compounds include acetylene, methane, butadiene, benzene, methylcyclopentadiene, pentadiene, styrene, naphthalene, and azulene.

Typically, fluorocarbon film plasma deposition occurs at rates ranging from 1 nanometer per second (nm/sec) to 100 nm/sec depending on processing conditions such as pressure, power, gas concentrations, types of gases, and the relative size of the electrodes. In general, deposition rates increase with increasing power, pressure, and gas concentration. Plasma is typically generated with RF electric power levels of at least 500 watts and often up to and including 8000 watts, with a typical moving web speed or at least 1 foot per minute (fpm) (0.3 meters per minute (m/min)) and often up to and including 300 fpm (90 m/min). The gas flow rates, e.g., of the fluorinated compound and the optional hydrocarbon compound, is typically at least 10 (standard cubic centimeters per minutes) sccm and often up to and including 5000 sccm. In some embodiment, the fluorinated compound is carried by an inert gas such as argon, nitrogen, helium, etc.

In certain embodiments, the amorphous fluorochemical film includes an amorphous glassy perfluoropolymer having a Tg (glass transition temperature) of at least 100° C.

Examples of suitable amorphous glassy perfluoropolymers include a copolymer of perfluoro-2,2-dimethyl-1,3-dioxole (PDD) and polytetrafluoroethylene (TFE) (such as those copolymers available under the trade names TEFLON AF2400 and TEFLON AF1600 from DuPont Company), a copolymer of 2,2,4-trifluoro-5-trifluoromethoxy-1,3-dioxole (TTD) and TFE (such as those copolymers available under the trade names HYFLON AD60 and HYFLON AD80 from Solvay Company), and a copolymer of TFE and cyclic perfluoro-butenylvinyl ether (such as the copolymer available under the trade name CYTOP from Asahi Glass, Japan).

In certain embodiments, such amorphous glassy perfluoropolymer is a perfluoro-dioxole homopolymer or copolymer such as a copolymer of perfluoro-2,2-dimethyl-1,3-dioxole (PDD) and polytetrafluoroethylene (TFE), and a copolymer of 2,2,4-trifluoro-5-trifluoromethoxy-1,3-dioxole (TTD) and TFE.

In certain embodiments, such amorphous glassy perfluoropolymer is deposited out of solution. Exemplary solvents for use in deposition of the amorphous glassy perfluoropolymer include those available from 3M Company under the trade names FLUORINERT FC-87, FC-72, FC-84, and FC-770, as well as NOVEC HFE-7000, HFE-7100, HFE-7200, HFE-7300, and HFE-7500.

Methods of Making Separation Membranes

The polymeric ionomer and optional additives described herein are typically applied out of a solution or dispersion in a suitable amount of a liquid (e.g., deionized water or organic solvents). If an organic solvent is used, it may include methanol, ethanol, propanol, isopropanol, dibutyl sebecate, glycerol triacetate, acetone, methyl ethyl ketone, and 1-methoxy-2-propanol, etc.

By careful selection of the concentration of the coating solution or dispersion, the particle size and/or molecular weight of the polymeric ionomer, and the substrate pore structure so that the polymeric ionomer remains substantially on the surface, or penetrates substrate pores, or a combination of both, can be controlled. Subsequent drying, curing (e.g., by UV or e-beam irradiation), crosslinking, or grafting all the applied material is preferred so that only an insignificant amount is washed out and wasted.

If a curable pore-filling polymer composition (i.e., "pore-filling polymer coating solution" or simply "pore-filling coating solution") is used for optional material (e.g., using curable (meth)acrylates), such coating composition may be prepared using one or more monomers and/or oligomers with optional additives in a suitable amount of a liquid (e.g., deionized water or organic solvents). If an organic solvent is used may include methanol, ethanol, propanol, isopropanol, dibutyl sebecate, glycerol triacetate, acetone, methyl ethyl ketone, 1-methoxy-2-propanol, etc.). Preferably, it is a volatile organic solvent for easy solution saturation or diffusion into the pores.

The pore-filling coating solution may be applied to a selected porous substrate by a variety of techniques such as dip coating, gravure coating, die coating, slot coating, etc. Monomer and/or oligomer concentration may range from 0.5% to 100%. For example, a porous substrate may be saturated in a pore-filling coating solution of monomers and/or oligomers of a pore-filling polymer in deionized water. Typically, the substrate may be separated from the liquid (e.g., volatile organic solvent) before or after irradiation. Preferably, upon removal from the solution, the substrate may be exposed to irradiation, such as UV irradiation. This can be done for example, on a moving belt. Any uncured pore-filling coating solution may be washed away, and then the composite membrane dried.

Either an ionic liquid can be mixed in the coating composition and applied to the porous support at one pass, or an ionic liquid dissolved in a solvent can be over-coated onto the polymeric ionomer coated membrane. The ionic liquid may diffuse into the polymeric ionomer layer.

An amorphous fluorocarbon film may be applied after the polymeric ionomer composition is coated in or on a substrate. The fluorocarbon film can be formed out of a solution or deposited by plasma fluorination.

Commercially available porous substrates may be supplied with a humectant, such as glycerol, that fills and/or coats the pores of the substrate. Typically, this is done to prevent small pores from collapsing during drying process and storage, for example. This humectant may or may not be washed out before using. Typically, however, the humectant is washed out by the process of filling the pores with the pore-filling coating solution. Preferably, a substrate is obtained and used without a humectant. Commercially available porous substrates also may be supplied as wet with water and/or preservative(s). Preferably, a dry substrate is used.

Uses

Separation membranes of the present disclosure, which may be composite membranes, particularly asymmetric composite membranes, may be used in various separation methods. Such separation methods include pervaporation, vapor permeation, gas separation, nanofiltration, organic solvent nanofiltration, and combinations thereof (e.g., a combination of pervaporation and vapor permeation). The separation membranes of the present disclosure are particularly useful in pervaporation methods. Pervaporation may be used for desulfurization of gasoline, dehydration of organic solvents, isolation of aroma components, and removal of volatile organic compounds from aqueous solutions.

Preferred methods of the present disclosure involve use of the separation membranes, which may be composite membranes, particularly asymmetric composite membranes, in pervaporation, particularly pervaporating alcohol from an alcohol and gasoline mixture.

Well-known separation techniques may be used with the composite membranes of the present disclosure. For example, nanofiltration techniques are described in U.S. Pat. Pub. No. 2013/0118983 (Linvingston et al.), U.S. Pat. No. 7,247,370 (Childs et al.), and U.S. Pat. Pub. No. 2002/0161066 (Remigy et al.). Pervaporation techniques are described in U.S. Pat. No. 7,604,746 (Childs et al.) and EP 0811420 (Apostel et al.). Gas separation techniques are described in Journal of Membrane Sciences, vol. 186, pages 97-107 (2001).

Pervaporation separation rate is typically not constant during a depletion separation. The pervaporation rate is higher when the feed concentration of the selected material (in this case ethanol) is higher than near then end of the separation when the feed concentration of the selected material is lower and this rate is typically not linear with concentration. At high feed concentration the separation rate is high and the feed concentration of the selected material and flux falls rapidly, but this concentration and flux changes very slowly as the limit of depletion is reached.

Typical conditions used in separation methods of the present disclosure include fuel temperatures of from −20° C. (or from 20° C. or room temperature) up to and including 120° C. (or up to and including 95° C.), fuel pressures of from 10 pounds per square inch (psi) (69 kPa) up to and including 400 psi (2.76 MPa) (or up to and including 100 psi (690 kPa)), fuel flow rates of 0.1 liter per minute (L/min) up to and including 20 L/min, and vacuum pressures of from 20 Torr (2.67 kPa) up to and including ambient pressure (i.e., 760 Ton (101 kPa)).

The performance of a separation membrane is mainly determined by the properties of the polymeric ionomer.

The efficiency of a pervaporation membrane may be expressed as a function of its selectivity and of its specific flux. The selectivity is normally given as the ratio of the concentration of the better permeating component to the concentration of the poorer permeating component in the permeate, divided by the corresponding concentration ratio in the feed mixture to be separated:

$$\alpha = (y_w/y_i)/(x_w/x_i)$$

wherein $y_w$ and $y_i$ are the content of each component in the permeate, and $x_w$ and $x_i$ are the content of each component in the feed, respectively. Sometimes, the permeate concentration is defined as the separation efficiency if the feed component is relatively consistent.

The trans-membrane flux is a function of the composition of the feed. It is usually given as permeate amount per membrane area and per unit time, e.g., kilogram per meter squared per hour ($kg/m^2/hr$).

In certain embodiments of the present disclosure, the polymeric ionomer exhibits an alcohol selectivity in the range of from at least 30% up to and including 100%. In this context, "alcohol selectivity" means the amount of alcohol in the gasoline/alcohol mixture that diffuses through to the output side of the separation membrane. In accordance with the present disclosure, the alcohol selectivity of the polymeric ionomer may include, in increments of 1%, any range between 30% and 100%. For example, the alcohol selectivity may be in the range of from 31% up to 99%, or 40% to 100%, or 50% to 95%, etc.

In certain embodiments, the polymeric ionomer in the separation membrane exhibits an average alcohol permeate flux (e.g., from an alcohol/gasoline mixture) in the range of from at least 0.3 $kg/m^2/hr$, and in increments of 10 $g/m^2/hr$, up to and including 30 $kg/m^2/hr$. The average ethanol flux from E 10 (10% ethanol) to E2 (2% ethanol) standard include in the range of from 0.2 $kg/m^2/hr$ to 20 $kg/m^2/hr$. Preferred processing conditions used for such flux measurement include: a feed temperature of from −20° C. (or from 20° C.) up to and including 120° C. (or up to and including 95° C.), a permeate vacuum pressure of from 20 Torr (2.67 kPa) up to and including 760 Torr (101 kPa), a feed pressure of from 10 psi (69 kPa) up to and including 400 psi (2.76 MPa) (or up to and including 100 psi (690 kPa)), and an ethanol concentration in feed gasoline of from 2% up to and including 20%.

In certain embodiments of the present disclosure, the polymeric ionomer in the separation membrane can exhibit an average ethanol permeate flux, in increments of 10 $g/m^2/hour$, between the below-listed upper and lower limits (according to Method 1 and/or Method 2 in the Examples Section). In certain embodiments, the average ethanol permeate flux may be at least 310 $g/m^2/hour$, or at least 350 $g/m^2/hour$, or at least 500 $g/m^2/hour$. In certain embodiments, the average ethanol permeate flux may be up to 30 $kg/m^2/hour$, or up to 20 $kg/m^2/hour$, or up to 10 $kg/m^2/hour$. For example, the average ethanol permeate flux may be in the range of from 310 $g/m^2/hour$ up to 20 $kg/m^2/hour$, or 350 $g/m^2/hour$ up to 30 $kg/m^2/hour$, or 500 $g/m^2/hour$ up to 10 $kg/m^2/hour$, etc. It may be desirable for the polymeric membrane to exhibit an average permeate flux of 320 $g/m^2/hour$, when the separation membrane is assembled into 5 liter volume cartridge such that the cartridge will produce the desired amount of flux to meet the system requirements. The system requirements are defined by internal combustion engines that require ethanol flux. One example is a Japan Society of Automotive Engineers technical paper JSAE 20135048 titled "Research Engine System Making Effective Use of Bio-ethanol-blended Fuels."

Preferred processing conditions used for such flux measurement include: a feed temperature of from −20° C. (or from 20° C.) up to and including 120° C. (or up to and including 95° C.), a permeate vacuum pressure of from 20 Torr (2.67 kPa) to 760 Torr (101 kPa), a feed pressure of from 10 psi (69 kPa) to 400 psi (2.76 MPa) (or up to and including 100 psi (690 kPa)), and an ethanol concentration in feed gasoline of from 2% to 20%.

Separation membranes of the present disclosure may be incorporated into cartridges (i.e., modules), in particular cartridges for separating alcohol from an alcohol and gasoline mixture. Suitable cartridges include, for example, spiral-wound modules, plate and frame modules, tubular modules, hollow fiber modules, pleated cartridge, and the like.

Figure 2:
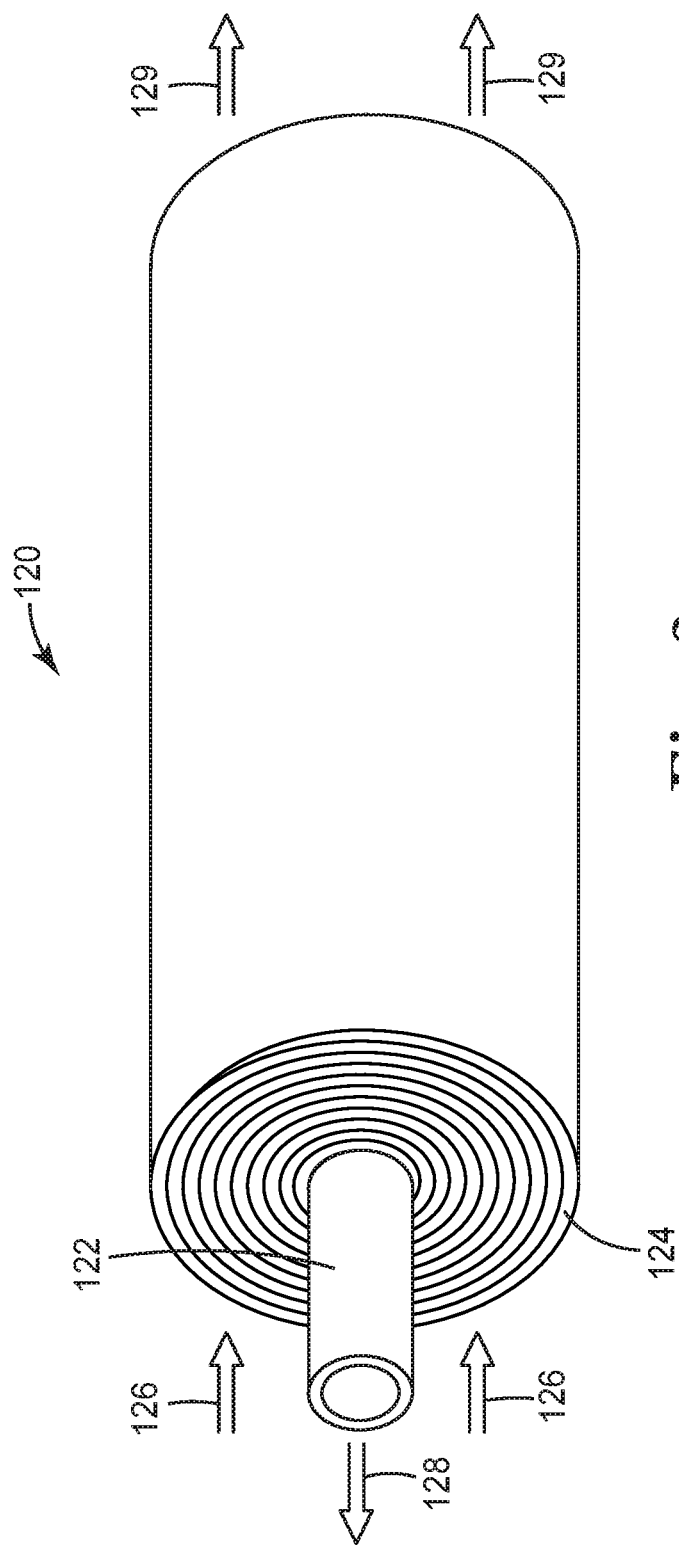
FIG. 2 is a perspective side view of a module that includes an exemplary composite membrane of the present disclosure.

FIG. 2 is an illustration of an exemplary module 120 (specifically, a spiral-wound module) that includes a support tube 122, an exemplary composite membrane 124 of the present disclosure wound onto the support tube 122. During use, a mixture of liquids to be separated (e.g., alcohol and gasoline mixture) enters the module 120 and flows along the direction of arrows 126 into the composite membrane 124. As the mixture flows past the composite membrane layers, the liquid that is less permeable in the polymeric ionomer (e.g., gasoline) is not absorbed by the polymeric ionomer, while the more permeable liquid (e.g., alcohol) is absorbed in and passes through the polymeric ionomer and then flows out of the center of the support tube 122 along the direction of arrow 128. For example, a high concentration of alcohol (typically with a small amount of gasoline), which is separated from an alcohol/gasoline mixture, flows out of the center of the support tube 122 as vapor and/or liquid along the direction of arrow 128, and the resultant mixture with a lower concentration of alcohol than present in the mixture that enters the composite membrane flows out of the composite membrane along the direction of arrows 129.

In certain embodiments, an exemplary cartridge has a volume in the range of from 200 milliliters (mL), or 500 mL, up to and including 5.000 liters (L). In accordance with the present disclosure, the volume of the cartridge may include, in increments of 10 mL, any range between 200 mL, or 500 mL, and 5.000 L. For example, the cartridge volume may be in the range of from 210 mL up to 4.990 L, or 510 mL up to 4.990 L, or 300 mL up to 5.000 L, or 600 mL up to 5.000 L, or 1.000 L up to 3.000 L, etc. In certain embodiments, the cartridge has a volume of 1.000 L. In certain embodiments, the cartridge has a volume of 0.800 L.

Figure 3:
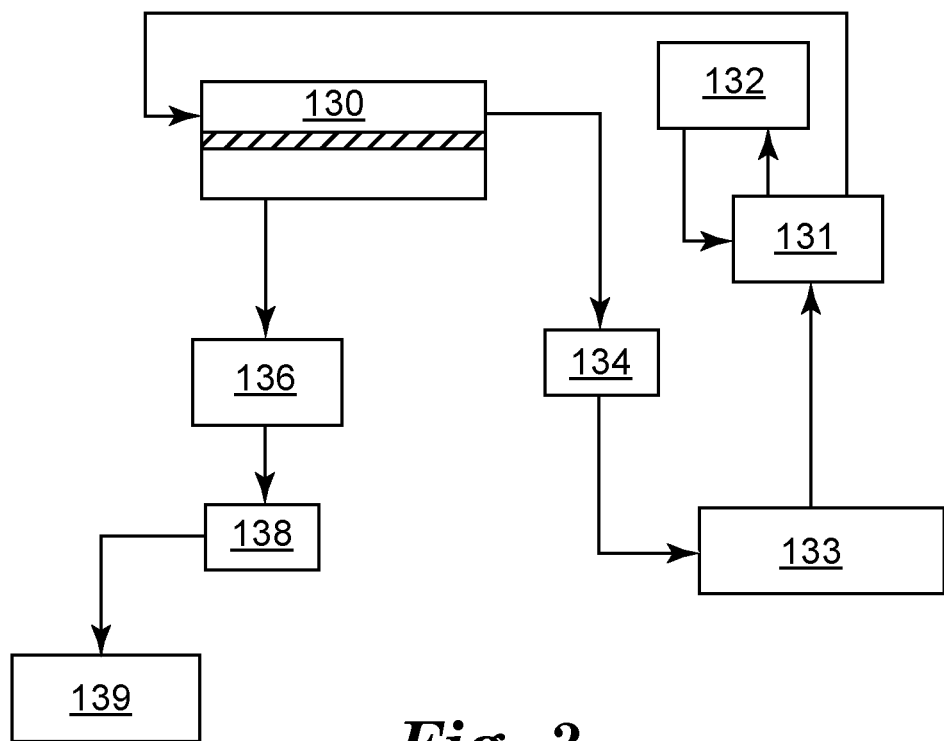
FIG. 3 is an illustration of an exemplary fuel separation system that includes an exemplary composite membrane of the present disclosure.

Cartridges that include separation membranes of the present disclosure may be incorporated into fuel separation systems, which may be used in, or in conjunction with, engines such as flex-fuel engines. An exemplary fuel separation system is shown in FIG. 3, which employs a membrane pervaporation method (PV method) to separate high ethanol fraction gasoline from gasoline containing ethanol. Typically, gasoline is introduced into an inlet of a membrane separation unit 130 after being passed through a heat exchanger 131 (which is connected to engine coolant 132) from a main fuel storage tank 133. A low-ethanol fraction fuel from the membrane separation unit 130 is returned to the main fuel storage tank 133 after being cooled as it passes through a radiator 134. The ethanol rich vapor which came out of membrane separation unit 130 is typically passed through a condenser 136 where it is condensed under negative pressure produced by vacuum pump 138 and then collected in an ethanol tank 139.

In certain embodiments, a fuel separation system includes one or more cartridges, which may be in series or parallel, which include separation membranes of the present disclosure.

Exemplary Embodiments

Embodiment 1 is a method of selectively separating (e.g., pervaporating) a first fluid (e.g., first liquid) from a feed mixture comprising the first fluid (e.g., first liquid) and a second fluid (e.g., second liquid), the method comprising contacting the feed mixture with a separation membrane comprising a polymeric ionomer, wherein the polymeric ionomer has a highly fluorinated backbone and recurring pendant groups according to the following formula (Formula I):

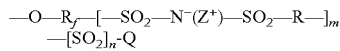

wherein:
  $R_f$ is a perfluorinated organic linking group;
  R is an organic linking group;
  $Z^+$ is $H^+$, a monovalent cation, or a multivalent cation;
  Q is H, F, $-NH_2$, $-O^-Y^+$, or $-C_xF_{2x+1}$;
  $Y^+$ is $H^+$, a monovalent cation, or a multivalent cation;
  x=1 to 4;
  m=0 to 6; and
  n=0 or 1;
  with the proviso that at least one of m or n must be non-zero;
wherein the polymeric ionomer is more permeable to the first fluid (e.g., first liquid) than the second fluid (e.g., second liquid);
with the proviso that when m=0 and Q is $-O^-Y^+$, the first fluid (e.g., first liquid) is alcohol and the second fluid (e.g., second liquid) is gasoline.

Embodiment 2 is a cartridge comprising a separation membrane for selectively separating (e.g., pervaporating) a first fluid (e.g., first liquid) from a feed mixture comprising the first fluid (e.g., first liquid) and a second fluid (e.g., second liquid), the separation membrane comprising a polymeric ionomer, wherein the polymeric ionomer has a highly fluorinated backbone and recurring pendant groups according to the following formula (Formula I):

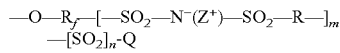

wherein:
  $R_f$ is a perfluorinated organic linking group;
  R is an organic linking group;
  $Z^+$ is $H^+$, a monovalent cation, or a multivalent cation;
  Q is H, F, $-NH_2$, $-O^-Y^+$, or $-C_xF_{2x+1}$;
  $Y^+$ is $H^+$, a monovalent cation, or a multivalent cation;
  x=1 to 4;
  m=0 to 6; and
  n=0 or 1;
  with the proviso that at least one of m or n must be non-zero;
wherein the polymeric ionomer is more permeable to the first fluid (e.g., first liquid) than the second fluid (e.g., second liquid);
with the proviso that when m=0 and Q is $-O^-Y^+$, the first fluid (e.g., first liquid) is alcohol and the second fluid (e.g., second liquid) is gasoline.

Embodiment 3 is the method or cartridge according to embodiment 1 or 2 wherein the separation membrane is a free-standing membrane.

Embodiment 4 is the method or cartridge according to embodiment 1 or 2 wherein the separation membrane further comprises a substrate on which the polymeric ionomer is disposed.

Embodiment 5 is the method or cartridge according to embodiment 4 wherein:
  the substrate is a porous substrate comprising opposite first and second major surfaces, and a plurality of pores; and
  the polymeric ionomer forms a polymer layer having a thickness in and/or on the porous substrate.

Embodiment 6 is a separation membrane for selectively separating (e.g., pervaporating) a first fluid (e.g., first liquid) from a feed mixture comprising a first fluid (e.g., first liquid) and a second fluid (e.g., second liquid), the composite membrane comprising:
  a porous substrate comprising opposite first and second major surfaces, and a plurality of pores; and
  a polymeric ionomer that forms a layer having a thickness in and/or on the porous substrate;
  wherein the polymeric ionomer has a highly fluorinated backbone and recurring pendant groups according to the following formula (Formula I):

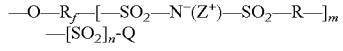

wherein:
  $R_f$ is a perfluorinated organic linking group;
  R is an organic linking group;
  $Z^+$ is $H^+$, a monovalent cation, or a multivalent cation;
  Q is H, F, $-NH_2$, $-O^-Y^+$, or $-C_xF_{2x+1}$;
  $Y^+$ is $H^+$, a monovalent cation, or a multivalent cation;
  x=1 to 4;
  m=0 to 6; and
  n=0 or 1;
  with the proviso that at least one of m or n must be non-zero;
wherein the polymeric ionomer is more permeable to the first fluid (e.g., first liquid) than the second fluid (e.g., second liquid);
with the proviso that when m=0 and Q is $-O^-Y^+$, the first fluid (e.g., first liquid) is alcohol and the second fluid (e.g., second liquid) is gasoline.

Embodiment 7 is the membrane, cartridge, or method according to embodiment 5 or 6 wherein the porous substrate is a polymeric porous substrate.

Embodiment 8 is the membrane, cartridge, or method according to embodiment 5 or 6 wherein the porous substrate is a ceramic porous substrate.

Embodiment 9 is the membrane, cartridge, or method according to any one of embodiments 5 through 8 wherein the porous substrate is asymmetric or symmetric.

Embodiment 10 is the membrane, cartridge, or method according to any one of embodiments 5 through 9 wherein the porous substrate comprises a nanoporous layer.

Embodiment 11 is the membrane, cartridge, or method according to embodiment 10 wherein the nanoporous layer is adjacent to or defines the first major surface of the porous substrate.

Embodiment 12 is the membrane, cartridge, or method according to any one of embodiments 5 through 11 wherein the porous substrate comprises a microporous layer.

Embodiment 13 is the membrane, cartridge, or method according to embodiment 12 wherein the microporous layer is adjacent to or defines the second major surface of the porous substrate.

Embodiment 14 is the membrane, cartridge, or method according to any one of embodiments 5 through 13 wherein the porous substrate comprises a macroporous layer.

Embodiment 15 is the membrane, cartridge, or method according to embodiment 14 wherein the macroporous layer is adjacent to or defines the second major surface of the porous substrate.

Embodiment 16 is the membrane, cartridge, or method according to any one of embodiments 5 through 15 wherein the porous substrate has a thickness measured from one to the other of the opposite major surfaces in the range of from 5 µm up to and including 500 µm.

Embodiment 17 is the membrane, cartridge, or method according to embodiment 10 or 11 wherein the nanoporous layer has a thickness in the range of from 0.01 µm up to and including 10 µm.

Embodiment 18 is the membrane, cartridge, or method according to embodiment 12 or 13 wherein the microporous layer has a thickness in the range of from 5 µm up to and including 300 µm.

Embodiment 19 is the membrane, cartridge, or method according to embodiment 14 or 15 wherein the macroporous layer has a thickness in the range of from 25 µm up to and including 500 µm.

Embodiment 20 is the membrane, cartridge, or method according to any one of embodiments 5 through 19 wherein the porous substrate comprises pores having an average size in the range of from 0.5 nanometer (nm) up to and including 1000 µm.

Embodiment 21 is the membrane, cartridge, or method according to any one of embodiments 10, 11, and 17 wherein the nanoporous layer comprises pores having a size in the range of from 0.5 nanometer (nm) up to and including 100 nm.

Embodiment 22 is the membrane, cartridge, or method according to any one of embodiments 12, 13, and 18 wherein the microporous layer comprises pores having a size in the range of from 0.01 µm up to and including 20 µm.

Embodiment 23 is the membrane, cartridge, or method according to any one of embodiments 14, 15, and 19 wherein the macroporous layer comprises pores having a size in the range of from 1 µm up to and including 1000 µm.

Embodiment 24 is the membrane, cartridge, or method according to any one of embodiments 5 through 23 wherein the porous substrate is a polymeric porous substrate.

Embodiment 25 is the membrane, cartridge, or method according to any one of embodiments 5 through 23 wherein the porous substrate is a ceramic porous substrate.

Embodiment 26 is the membrane, cartridge, or method according to any one of embodiments 5 through 25 wherein the porous substrate is asymmetric or symmetric.

Embodiment 27 is the membrane, cartridge, or method according to any one of embodiments 5 through 26 wherein the polymeric ionomer forms a polymer layer on the first major surface of the porous substrate wherein a majority of the polymer composition is on the surface of the porous substrate.

Embodiment 28 is the membrane, cartridge, or method according to embodiments 5 through 27 wherein the polymeric ionomer is disposed in at least some of the pores so as to form a layer having a thickness within the porous substrate.

Embodiment 29 is the membrane, cartridge, or method according to embodiment 28 wherein the polymeric ionomer is in the form of a pore-filling polymer layer that forms at least a portion of the first major surface of the porous substrate.

Embodiment 30 is the membrane, cartridge, or method according to any one of embodiments 5 through 29 which is asymmetric or symmetric with respect to the amount of polymeric ionomer.

Embodiment 31 is the membrane, cartridge, or method according to embodiment 30 wherein the amount of the polymeric ionomer at, on, or adjacent to the first major surface of the porous substrate is greater than the amount of the polymeric ionomer at, on, or adjacent to the second major surface of the porous substrate.

Embodiment 32 is the membrane, cartridge, or method according to any one of embodiments 29 through 31 wherein the polymeric ionomer is in the form of a pore-filling polymer layer having an exposed major surface, which coats the first major surface of the porous substrate, and an opposite major surface disposed between the opposite first and second major surfaces of the porous substrate.

Embodiment 33 is the membrane, cartridge, or method according to embodiment 32 wherein the exposed major surface of the pore-filling polymer layer coats all the first major surface of the porous substrate.

Embodiment 34 is the membrane, cartridge, or method according to any one of embodiments 5 through 33 wherein the polymer layer has a thickness in the range of from 10 nm up to and including 50 microns (50,000 nm).

Embodiment 35 is the membrane, cartridge, or method according to any one of embodiments 1 through 34 wherein the first fluid (e.g., first liquid) is an alcohol.

Embodiment 36 is the membrane, cartridge, or method according to any one of embodiments 1 through 35 wherein the second fluid (e.g., second liquid) is gasoline, an aliphatic or aromatic hydrocarbon, or an ether.

Embodiment 37 is the membrane, cartridge, or method according to embodiment 36 wherein the first fluid (e.g., first liquid) is an alcohol, and the second fluid (e.g., second liquid) is gasoline.

Embodiment 38 is the membrane, cartridge, or method according to any one of embodiments 5 through 37 wherein the polymer layer forms a continuous layer.

Embodiment 39 is the membrane, cartridge, or method according to any one of embodiments 1 through 38 wherein the polymeric ionomer has a highly fluorinated backbone and recurring pendant groups according to the following formula (Formula II):

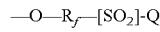

wherein:
R$_f$ is a perfluorinated organic linking group;
Q is —NH$_2$ or —O$^-$Y$^+$; and
Y$^+$ is H$^+$, a monovalent cation, or a multivalent cation;
with the proviso that when Q is —O$^-$Y$^+$, the first fluid (e.g., first liquid) is alcohol and the second fluid (e.g., second liquid) is gasoline.

Embodiment 40 is the membrane, cartridge, or method according to any one of embodiments 1 through 38 wherein the polymeric ionomer has a highly fluorinated backbone and recurring pendant groups according to the following formula (Formula III):

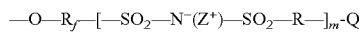
—O—R$_f$—[—SO$_2$—N$^-$(Z$^+$)—SO$_2$—R—]$_m$-Q wherein:
R$_f$ is a perfluorinated organic linking group;
R is an organic linking group;
Z$^+$ is H$^+$, a monovalent cation, or a multivalent cation;
Q is H, F, —NH$_2$, —O$^-$Y$^+$, or —C$_x$F$_{2x+1}$;
Y$^+$ is H$^+$, a monovalent cation, or a multivalent cation;
x=1 to 4; and
m=1 to 6.

Embodiment 41 is the membrane, cartridge, or method according to any one of embodiments 1 through 40 wherein the polymeric ionomer exhibits an alcohol selectivity in the range of from at least 30% up to and including 100%.

Embodiment 42 is the membrane, cartridge, or method according to any one of embodiments 1 through 41 wherein the polymeric ionomer exhibits an average alcohol permeate (e.g., alcohol from an alcohol/gasoline mixture) flux in the range of from at least 310 g/m$^2$/hour up to and including 30 kg/m$^2$/hour, using a feed temperature in the range of from at least −20° C. up to and including 120° C., a permeate vacuum pressure in the range of at least 20 Torr (2.67 kPa) up to and including 760 Torr (101 kPa), a feed pressure in the range of at least 10 psi (69 kPa) up to and including 400 psi (2.76 MPa), and an alcohol concentration in feed gasoline/alcohol mixture in the range of from at least 2% up to and including 20%.

Embodiment 43 is the method, cartridge, or membrane according to any one of embodiments 1 through 42 further comprising a (meth)acryl-containing polymer.

Embodiment 44 is the method, cartridge, or membrane according to embodiment 43 wherein the (meth)acryl-containing polymer is derived from one or more (meth)acryl-containing monomers and/or oligomers selected from the group of a polyethylene glycol (meth)acrylate, a polyethylene glycol di(meth)acrylate, a silicone diacrylate, a silicone hexa-acrylate, a polypropylene glycol di(meth)acrylate, an ethoxylated trimethylolpropane triacrylate, a hydroxylmethacrylate, 1H,1H,6H,6H-perfluorohydroxyldiacrylate, a urethane diacrylate, a urethane hexa-acrylate, a urethane triacrylate, a polymeric tetrafunctional acrylate, a polyester penta-acrylate, an epoxy diacrylate, a polyester triacrylate, a polyester tetra-acrylate, an amine-modified polyester triacrylate, an alkoxylated aliphatic diacrylate, an ethoxylated bisphenol di(meth)acrylate, a propoxylated triacrylate, 2-acrylamido-2-methylpropanefulfonic acid (AMPS), and combinations of such monomers and/or oligomers.

Embodiment 45 is the method, cartridge, or membrane according to embodiment 43 or 44 wherein the (meth) acrylate polymer is mixed with the polymeric ionomer.

Embodiment 46 is the method, cartridge, or membrane according to embodiment 43 or 44 wherein the (meth) acrylate polymer and polymeric ionomer are in separate layers.

Embodiment 47 is the method, cartridge, or membrane according to any one of embodiments 1 through 46 further comprising an epoxy polymer.

Embodiment 48 is the method, cartridge, or membrane according to embodiment 47 wherein the epoxy polymer is mixed with the polymeric ionomer or wherein the epoxy polymer and polymeric ionomer are in separate layers.

Embodiment 49 is the method, cartridge, or membrane according to any one of embodiments 1 through 48 further comprising at least one of:
(a) an ionic liquid mixed with the polymeric ionomer; or
(b) an amorphous fluorochemical film disposed on the separation membrane.

Embodiment 50 is the method, cartridge, or membrane according to claim 49 wherein the amorphous fluorochemical film is a plasma-deposited fluorochemical film.

Embodiment 51 is the method, cartridge, or membrane according to claim 49 wherein the amorphous fluorochemical film comprises an amorphous glassy perfluoropolymer having a Tg of at least 100° C.

EXAMPLES

Objects and advantages of this invention are further illustrated by the following examples, but the particular materials and amounts thereof recited in these examples, as well as other conditions and details, should not be construed to unduly limit this invention. These examples are merely for illustrative purposes only and are not meant to be limiting on the scope of the appended claims.

For all polymeric ionomer coated on a porous substrate in the following examples, the polymeric ionomer is applied to the nanoporous side of the substrate.

Materials

Ethanol, DLI Inc., King of Prussia, Pa.
Hexane, EMD Chemicals, Inc.
E10 gasoline, blend gasoline with 10% ethanol
3M PFSA 825EW, prepared according to the example described in U.S. Pat. No. 7,348,088, where the ratio of tetrafluoroethylene (TFE) and F—SO$_2$—CF$_2$CF$_2$CF$_2$CF$_2$—O—CF=CF$_2$ (Comonomer A) was chosen to result in an equivalent weight of 825 g/mol. 3M PFSA 725EW, prepared according to the example described in U.S. Pat. No. 7,348, 088, where the ratio of tetrafluoroethylene (TFE) and F—SO$_2$—CF$_2$CF$_2$CF$_2$CF$_2$—O—CF=CF$_2$ (Comonomer A) was chosen to result in an equivalent weight of 725 g/mol. 3M PFSA 1000 EW, prepared according to the example described in U.S. Pat. No. 7,348,088, where the ratio of tetrafluoroethylene (TFE) and F—SO$_2$—CF$_2$CF$_2$CF$_2$—O—CF=CF$_2$ (Comonomer A) was chosen to result in an equivalent weight of 1000 g/mol. 3M PFIA, prepared according to U.S. Pat. Pub. No. 2013/0029249A1, Example 3

KAPTON polyimide film, DuPont, Wilmington, Del.
Lithium chloride, Alfa Aesar, Ward Hill, Mass.
PA350, polyacrylonitrile substrate, Nanostone Water, formerly known as Sepro Membranes Inc., Oceanside, Calif., used as received
PE2, polyethersulfone substrate, obtained from Nanostone Water, formerly known as Sepro Membranes Inc., Oceanside, Calif., used as received
PE5, polyethersulfone substrate, obtained from Nanostone Water, formerly known as Sepro Membranes Inc., Oceanside, Calif., used as received
NaCl, EM Science, Gibbstown, N.J.
KCl, Aldrich, Milwaukee, Wis.
CH$_3$CO$_2$Cs, Cesium acetate, Aldrich, Milwaukee, Wis., ZnCl$_2$, Alfa Aesar, Ward Hill, Mass.
FeSO$_4$H$_2$O, JT Baker, Phillipsburg, N.J.
AlCl$_3$, EM Science, Gibbstown, N.J.
NAFION 2020, Sigma Aldrich, Milwaukee, Wis.
SR344, polyethyleneglycol 400 diacrylate, Sartomer Company, Exton, Pa.
SR610, polyethyleneglycol 600 diacrylate, Sartomer Company, Exton, Pa.
SR603, polyethyleneglycol 400 dimethacrylate, Sartomer Company, Exton, Pa.
EX512, polyglycerol polyglycidyl ether, Nagase Chemtex Corporation, Japan
EX521, polyglycerol polyglycidyl ether, Nagase Chemtex Corporation, Japan
JEFFAMINE D400, Huntsman Corporation, The Woodlands, Tex.
TEFLON AF2400, DuPont Company, Wilmington, Del.
HFE-7200, NOVEC solvent, 3M Company, St Paul, Minn.
DP760, epoxy adhesive, 3M Company, St Paul Minn.
HMIM-B(CN)4, 1-Hexyl-3-methylimidazolium tetracyanoborate, Merck KGaA, Damstadt, Germany
EMIM-TFSA, 1-ethyl-3-methylimidazolium trifluoromethanesulfonate, Sigma Aldrich, Milwaukee, Wis.
EMIM-B F4, 1-ethyl-3-methylimidazolium tetrafluoroborate, Sigma Aldrich, Milwaukee, Wis.
EMIM-Tf$_2$N, 1-ethyl-3-methylimidazolium bis(trifluoromethylsulfonyl)imide, Sigma Aldrich, Milwaukee, Wis.
C$_6$F$_{14}$, PF-5060, perfluorohexane, 3M Company, St Paul, Minn.
C$_3$F$_8$, PFG-3218, perfluoropropane, 3M Company, St Paul, Minn.
O$_2$, Ultrahigh purity oxygen (99.999%), Oxygen Service Company, St Paul, Minn.
Polyacrylic acid, 50% aqueous solution, MW 5000, Alfa Aesar, Ward Hill, Mass.
Photo1173, 2-hydroxy-2-methylpropiophenone, TCI-EP, Tokyo Kogyo Co. Ltd, Tokyo, Japan Methods Method 1

Figure 4:
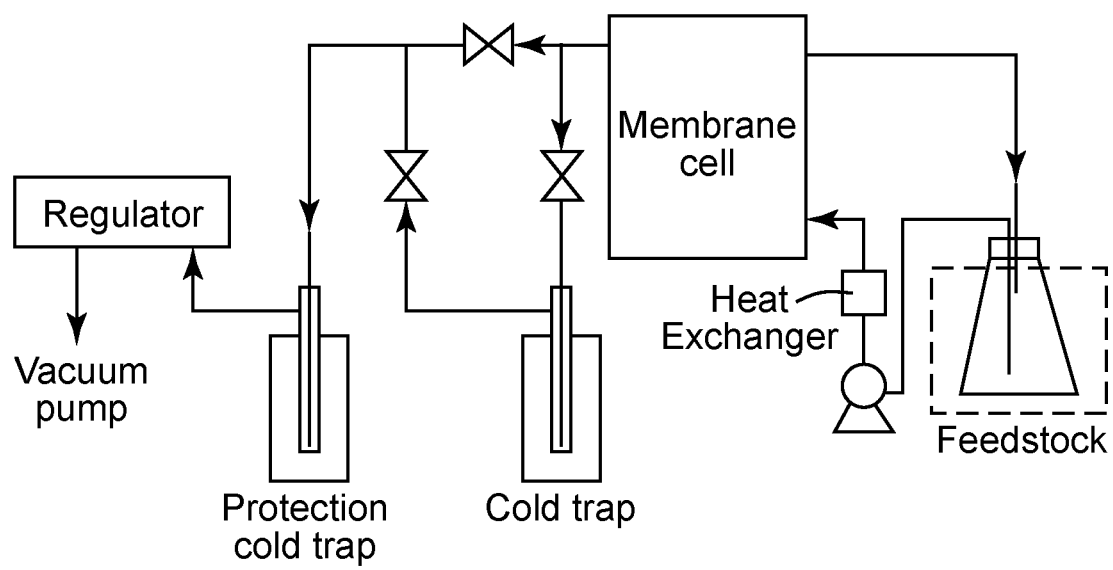
FIG. 4 is an illustration of a vacuum pervaporation testing apparatus.
Figure 5:
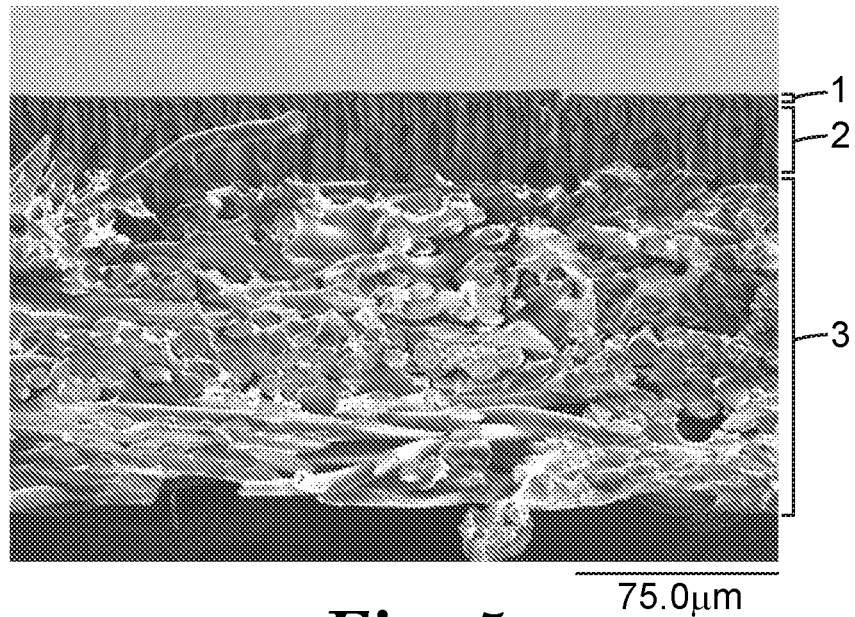
FIG. 5 is an SEM cross-section image (400× magnification) of PE2 (polyether sulfone substrate from Nanostone Water, formerly known as Sepro Membranes Inc., Oceanside, Calif.) substrate used in Examples 38-39. Layer 1 is the nanoporous layer, layer 2 is the microporous layer, and layer 3 is macroporous layer. Sample was freeze fractured in liquid nitrogen and imaged using Hitachi S4500 FESEM scanning electron microscope (SEM).
Figure 6:
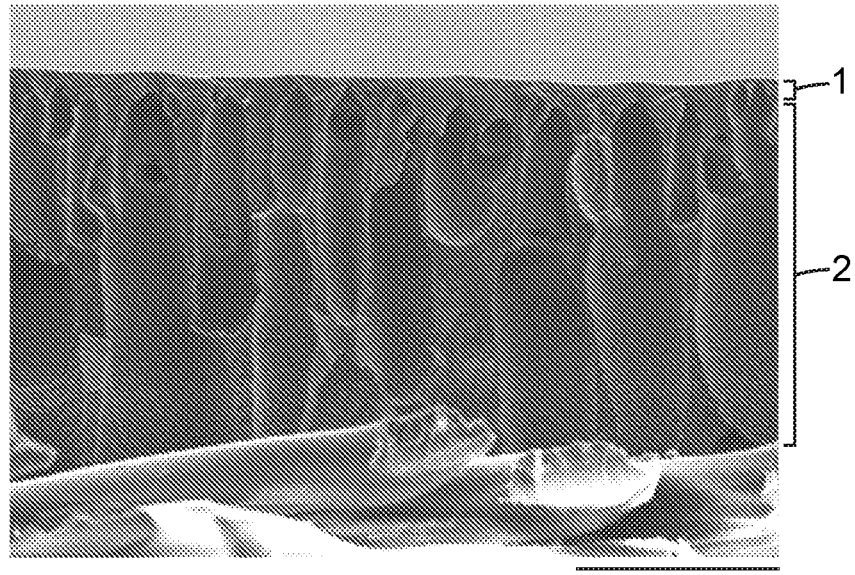
FIG. 6 is an SEM cross-section image of layers 1 and 2 of the substrate shown in FIG. 5 at 2000× magnification. Sample was freeze fractured in liquid nitrogen and imaged using Hitachi S4500 FESEM scanning electron microscope (SEM).
Figure 7:
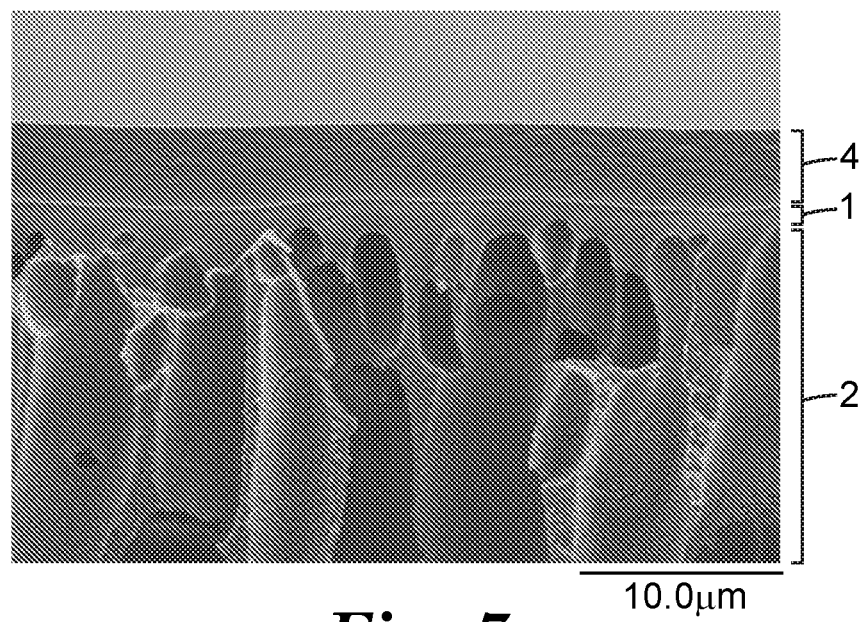
FIG. 7 is an SEM cross-section image of the PE2 substrate coated with polymeric ionomer (layer 4) at 3 microns thick as described in Sample 38. Sample was freeze fractured in liquid nitrogen and imaged using Hitachi S4500 FESEM scanning electron microscope (SEM).

The ability of the membranes to separate ethanol and gasoline from an ethanol/gasoline mixture was determined using the test apparatus depicted in FIG. 4 and the following technique. The membrane sample was mounted onto a stainless steel cell (Sepa CF II, obtained from General Electric Co., Fairfield, Conn.). The effective membrane surface area was 140 cm$^2$. A feedstock of E10 gasoline (10% ethanol) was heated by a heat exchanger and pumped through the membrane cell at a flow rate of 500 ml/min. The input and output temperatures of the feedstock at the inlet and outlet of the membrane cell was monitored by thermocouples. The permeate was collected in a cold trap cooled with liquid nitrogen. The membrane cell vacuum was controlled by a regulator connected to a vacuum pump. Testing was performed under conditions: 70° C. feedstock temperature and 200 Torr vacuum. The total permeate mass flux was calculated as:

$$\text{Flux} = \frac{m}{A \times t}$$

where m is the mass of the permeate in kilograms (kg); A is the effective membrane area in square meters (m$^2$); and t is the permeate collection duration time in hours (h). The ethanol content of the permeate and the feedstock were measured by gas chromatography (GC) using an Agilent Model 7890C gas chromatograph. The alcohol content was determined by using a calibration line, obtained by running known concentrations of ethanol through the GC and measuring the GC response area. Then the response area measurements of the permeate and feedstock from the GC were obtained and then using the calibration line the % ethanol was determined. Ethanol mass flux was calculated as membrane mass flux multiplied by the ethanol concentration in the permeate.

The permeate was collected each 10 min for one measurement and five measurements were taken for each membrane testing. The average data of the last three measurements were used to represent the membrane performance.

Method 2

The ability of the membranes to separate ethanol from an ethanol/gasoline mixture was determined as Method 1 above except the test apparatus was run in a continuous mode after charging the initial test vessel with about 1.1 liters of gasoline. Testing was conducted for 120min.The flow rate of the feed stream was maintained at 500 mL/min.

Vacuum in the membrane permeate side was set at 200 Torr (26.7 kPa) and the average gasoline temperature at the inlet and outlet of the membrane cell was maintained at 70° C. Permeate samples were collected every 10 minutes and the feed ethanol contents were monitored every 10 min. The fuel ethanol depletion curve was drawn as a function of the testing time. The time to reach 2 wt-% was obtained by extending the trend line of the ethanol depletion curve. The average ethanol flux was calculated as follows $$\text{flux} = m(c_0 - 2\%)/t/A$$

Where m, the initial charged mass of feed gasoline, co is the initial ethanol content; t is the time for feed ethanol reaching 2wt-%, and A is the active membrane area of the testing cell. The average permeate ethanol was calculated from all of the permeate collected and their ethanol contents.

Method 3

One 76 mm disk of a membrane sample was cut and mounted in a solvent resistant stirred cell (obtained from EMD-Millipore Company). About 100gram a solvent mixture containing approximately 10 weight percent mixture of ethanol (DLI Inc., King of Prussia, Pa.) in hexane (EMD Chemicals, Inc) was charged into the cell. The ethanol and hexane mixture was kept at room temperature and pressure and a vacuum of about 15 millimeters of mercury (2.0 kPa) was applied to the permeate side. The permeate vapor was condensed using a liquid nitrogen trap. Samples were run for 60 minutes and the ethanol content in the starting mixture, final mixture, and permeate was measured using a GC as in Method 1.

Method 4

An ethanol separation in a stirred cell was conducted in a stirred cell as in Method 3 except the feedstock was heated up to up to 70° C. by one infrared lamp. The cell was pressured to 300 kPa by nitrogen to avoid gasoline boiling. 216 Torr vacuum was applied in the permeate side by a diaphragm vacuum pump. Each membrane sample was tested for 45 minutes. Ethanol flux was calculated from the ethanol contents in the starting feedstock mixture, the final mixture, and the collected permeate was measured using a GC in Method 3.

Method 5

The membrane sample was soaked into a chamber of an autoclave with the temperature setting of 80° C. After 140 hours exposure time, the pressure was released and the sample was removed and dried out at ambient conditions. The performance of the hot gas exposed membrane was evaluated as in Method 1.

EXAMPLES

Examples 1-6

Ionomer Only, No Support

Films of 3M PFSA 825EW ionomer were fabricated by casting a 20 weight percent solids dispersion in ethanol (75 weight percent) and water (25 weight percent) onto a DuPONT KAPTON polyimide film on a Hirano coating line using a slot die. The solvent was evaporated in four temperature controlled ovens set to 80°, 100°, 140° and 140° C. with the line moving at 2 meters per minute. The dry film was then further annealed at 200° C. by contacting with a heated roll for 3 minutes. The resulting films were then removed from the KAPTON liner and placed in a 1 molar solution of lithium chloride for ion exchange. The film was triple rinsed in deionized water and allowed to dry at room temperature. These films were evaluated for flux and selectivity using a stirred cell in Method 3 and the results are shown in Table 1.

TABLE 1

| Ex | Repeats | Ionomer | Ionomer thickness (μm) | Counter Ion | Support | Selectivity (%) | Ethanol Flux (Kg/m$^2$/hr) | Final Conc. (%) |
|---|---|---|---|---|---|---|---|---|
| 1 | 3 | 825 EW | 5 | Li+ | None | 91% | 2.14 | 3.1% |
| 2 | 2 | 825 EW | 10 | Li+ | None | 96% | 1.87 | 3.7% |
| 3 | 2 | 825 EW | 15 | Li+ | None | 100% | 1.61 | 4.4% |
| 4 | 4 | 825 EW | 20 | Li+ | None | 98% | 1.30 | 5.1% |
| 5 | 2 | 825 EW | 30 | Li+ | None | 99% | 0.93 | 5.8% |
| 6 | 1 | 825 EW | 50 | Li+ | None | 99% | 0.75 | 2.6% |

Example 7

725 EW Ionomer on Nanoporous Substrate H+ Form

A 2 micron layer of 3M PFSA 725 EW ionomer was coated onto a PA350 (polyacrylonitrile) nanoporous substrate by coating a 12.5 weight percent solids dispersion in ethanol (75 weight percent) and water (25 weight percent) in a Hirano coating line using a slot die. The solvent was evaporated in four temperature controlled ovens set to 40° C., 40° C., 60° C., and 70° C. with the line moving at 2 meters per minute. The sample was tested in Method 1 in Method 1 for selectivity and flux (Table 2).

Example 8

725 EW Ionomer on Nanoporous Substrate Li+ Fform

The membrane described in Example 7 was ion exchanged by soaking in 1M LiCl for 30 minutes followed by rinsing in deionized water and then allowed to try at room temperature overnight. The sample was tested in Method 1 in Method 1 for selectivity and flux (Table 2).

Example 9

725 EW Ionomer on Nanoporous Substrate Na+ Form

The membrane described in Example 7 was ion exchanged by soaking in 1M NaCl for 30 minutes followed by rinsing in deionized water and then allowed to try at room temperature overnight. The sample was tested in Method 1 in Method 1for selectivity and flux (Table 2).

Example 10

725 EW Ionomer on Nanoporous Substrate K+ Form

The membrane described in Example 7 was ion exchanged by soaking in 1M KCl for 30 minutes followed by rinsing in deionized water and then allowed to try at room temperature overnight. The sample was tested in Method 1 in Method 1for selectivity and flux (Table 2).

Example 11

725 EW Ionomer on Nanoporous Substrate Cs+ Form

The membrane described in Example 7 was ion exchanged by soaking in 0.25M CsCH$_3$CO$_2$ for 30 minutes followed by rinsing in deionized water and then allowed to try at room temperature overnight. The sample was tested in Method 1 in Method 1for selectivity and flux (Table 2).

TABLE 2

| Example | Ionomer | Ionomer thickness (μm) | Counter Ion | Support | Selectivity (%) | Ethanol Flux (Kg/m²/hr) |
|---|---|---|---|---|---|---|
| 7 | 725EW | 2 | H+ | PA350 | 85.1% | 2.43 |
| 8 | 725 EW | 2 | Li+ | PA350 | 74.5% | 2.65 |
| 9 | 725 EW | 2 | Na+ | PA350 | 93.9% | 1.41 |
| 10 | 725 EW | 2 | K+ | PA350 | 42.9% | 0.41 |
| 11 | 725 EW | 2 | Cs+ | PA350 | 61.2% | 0.46 |

Example 12

825 EW Ionomer on Nanoporous Substrate H+ Form

A 2 micron layer of 3M PFSA 825 EW ionomer was coated onto a PA350 nanoporous substrate by coating a 12.5 weight percent solids dispersion in ethanol (75 weight percent) and water (25 weight percent) using a Hirano coating line using a slot die. The solvent was evaporated in four temperature controlled ovens set to 40° C., 40° C., 60° C., and 70° C. with the line moving at 2 meters per minute. The sample was tested in Method 1 for selectivity and flux (Table 3).

Example 13

825 EW Ionomer on Nanoporous Substrate Li+ Form

The membrane described in Example 12 was ion exchanged by soaking in 1M LiCl for 30 minutes followed by rinsing in deionized water and then allowed to try at room temperature overnight. The sample was tested in Method 1 for selectivity and flux (Table 3).

Example 14

825 EW Ionomer on Nanoporous Substrate Na+ Form

The membrane described in Example 12 was ion exchanged by soaking in 1M NaCl for 30 minutes followed by rinsing in deionized water and then allowed to try at room temperature overnight. The sample was tested in Method 1 for selectivity and flux (Table 3).

Example 15

825 EW Ionomer on Nanoporous Substrate K+ Form

The membrane described in Example 12 was ion exchanged by soaking in 1M KCl for 30 minutes followed by rinsing in deionized water and then allowed to try at room temperature overnight. The sample was tested in Method 1 for selectivity and flux (Table 3).

Example 16

825 EW Ionomer on Nanoporous Substrate Cs+ Form

The membrane described in Example 12 was ion exchanged by soaking in 0.25M $CH_3CO_2Cs$ for 30 minutes followed by rinsing in deionized water and then allowed to try at room temperature overnight. The sample was tested in Method 1 for selectivity and flux (Table 3).

Example 17

825 EW Ionomer on Nanoporous Substrate Zn+2 Form

The membrane described in Example 12 was ion exchanged by soaking in 0.5M $ZnCl_2$ for 30 minutes followed by rinsing in deionized water and then allowed to try at room temperature overnight. The sample was tested in Method 1 for selectivity and flux (Table 3).

Example 18

825 EW Ionomer on Nanoporous Substrate Fe+2 Form

The membrane described in Example 12 was ion exchanged by soaking in 0.25M $FeSO_4H_2O$ for 30 minutes followed by rinsing in deionized water and then allowed to try at room temperature overnight. The sample was tested in Method 1 for selectivity and flux (Table 3).

Example 19

825 EW Ionomer on Nanoporous Substrate Al+3 Form

The membrane described in Example 12 was ion exchanged by soaking in 0.25M $AlCl_3$ for 30 minutes followed by rinsing in deionized water and then allowed to try at room temperature overnight. The sample was tested in Method 1 for selectivity and flux (Table 3).

TABLE 3

| Example | Ionomer | Ionomer thickness (μm) | Counter Ion | Support | Selectivity (%) | Ethanol Flux (Kg/m²/hr) |
|---|---|---|---|---|---|---|
| 12 | 825 EW | 2 | $H^+$ | PA350 | 92.2% | 1.84 |
| 13 | 825 EW | 2 | $Li^+$ | PA350 | 69.1% | 3.25 |
| 14 | 825 EW | 2 | $Na^+$ | PA350 | 96.8% | 1.56 |
| 15 | 825 EW | 2 | $K^+$ | PA350 | 91.6% | 0.59 |
| 16 | 825 EW | 2 | $Cs^+$ | PA350 | 66.6% | 0.57 |
| 17 | 825 EW | 2 | $Zn^{+2}$ | PA350 | 93.6% | 2.68 |
| 18 | 825 EW | 2 | $Fe^{+2}$ | PA350 | 91.4% | 1.96 |
| 19 | 825 EW | 2 | $Al^{+3}$ | PA350 | 97.5% | 2.09 |

Example 20

1000 EW Ionomer on Nanoporous Substrate $H^+$ Form

A 2 micron layer of 3M PFSA1000 EW ionomer was coated onto a PA350 nanoporous substrate by casting a 12.5 weight percent solids dispersion in ethanol (75 weight percent) and water (25 weight percent) using a Hirano coating line using a slot die. The solvent was evaporated in four temperature controlled ovens set to 40° C., 40° C., 60° C., and 70° C. with the line moving at 2 meters per minute. The sample was tested in Method 1 for selectivity and flux (Table 4).

Example 21

1000 EW Ionomer on Nanoporous Substrate $Li^+$ Form

The membrane described in Example 12 was ion exchanged by soaking in 1M LiCl for 30 minutes followed by rinsing in deionized water and then allowed to try at room temperature overnight. The sample was tested in Method 1 for selectivity and flux (Table 4).

Example 22

1000 EW Ionomer on Nanoporous Substrate Na+ Form

The membrane described in Example 12 was ion exchanged by soaking in 1M NaCl for 30 minutes followed by rinsing in deionized water and then allowed to try at room temperature overnight. The sample was tested in Method 1 for selectivity and flux (Table 4).

Example 23

1000 EW Ionomer on Nanoporous Substrate K+ Form

The membrane described in Example 12 was ion exchanged by soaking in 1M KCl for 30 minutes followed by rinsing in deionized water and then allowed to try at room temperature overnight. The sample was tested in Method 1 for selectivity and flux (Table 4).

Example 24

1000 EW Ionomer on Nanoporous Substrate Cs+ Form

The membrane described in Example 12 was ion exchanged by soaking in 0.25M $CH_3CO_2Cs$ for 30 minutes followed by rinsing in deionized water and then allowed to try at room temperature overnight. The sample was tested in Method 1 for selectivity and flux (Table 4).

Example 25

PFIA Ionomer on Nanoporous Substrate H+ Form

A 2 micron layer of 3M PFIA ionomer was coated onto a PA350 nanoporous substrate by casting a 12.5 weight percent solids dispersion in ethanol (75 weight percent) and water (25 weight percent) using a Hirano coating line using a slot die. The solvent was evaporated in four temperature controlled ovens set to 40° C., 40° C., 60° C., and 70° C. with the line moving at 2 meters per minute. The sample was tested in Method 1 for selectivity and flux (Table 5).

Example 26

PFIA Ionomer on Nanoporous Substrate Li+ Form

The membrane described in Example 12 was ion exchanged by soaking in 1M LiCl for 30 minutes followed by rinsing in deionized water and then allowed to try at room temperature overnight. The sample was tested in Method 1 for selectivity and flux (Table 5).

Example 27

PFIA Ionomer on Nanoporous Substrate Na+ Form

The membrane described in Example 12 was ion exchanged by soaking in 1M NaCl for 30 minutes followed by rinsing in deionized water and then allowed to try at room temperature overnight. The sample was tested in Method 1 for selectivity and flux (Table 5).

Example 28

PFIA Ionomer on Nanoporous Substrate $K^+$ Form

The membrane described in Example 12 was ion exchanged by soaking in 1M KCl for 30 minutes followed by rinsing in deionized water and then allowed to try at room temperature overnight. The sample was tested in Method 1 for selectivity and flux (Table 5).

Example 29

PFIA EW Ionomer on Nanoporous Substrate Cs+ Form

The membrane described in Example 12 was ion exchanged by soaking in 0.25M $CH_3CO_2Cs$ for 30 minutes followed by rinsing in deionized water and then allowed to

TABLE 4

| Example | Ionomer | Ionomer thickness (μm) | Counter Ion | Support | Selectivity (%) | Ethanol Flux (Kg/m$^2$/hr) |
| --- | --- | --- | --- | --- | --- | --- |
| 20 | 1000 EW | 2 | $H^+$ | PA350 | 73.2% | 1.88 |
| 21 | 1000 EW | 2 | $Li^+$ | PA350 | 71.1% | 3.25 |
| 22 | 1000 EW | 2 | $Na^+$ | PA350 | 96.3% | 1.45 |
| 23 | 1000 EW | 2 | $K^+$ | PA350 | 19.8% | 0.61 |
| 24 | 1000 EW | 2 | $Cs^+$ | PA350 | 53.9% | 0.69 | try at room temperature overnight. The sample was tested in Method 1 for selectivity and flux (Table 5).

TABLE 5

| Example | Ionomer | Ionomer thickness (μm) | Counter Ion | Support | Selectivity (%) | Ethanol Flux (Kg/m²/hr) |
|---|---|---|---|---|---|---|
| 25 | 620 EW PFIA | 2 | H⁺ | PA350 | 70.4% | 3.41 |
| 26 | 620 EW PFIA | 2 | Li⁺ | PA350 | 46.7% | 3.40 |
| 27 | 620 EW PFIA | 2 | Na⁺ | PA350 | 93.7% | 2.01 |
| 28 | 620 EW PFIA | 2 | K⁺ | PA350 | 30.2% | 0.93 |
| 29 | 620 EW PFIA | 2 | Cs⁺ | PA350 | 14.8% | 0.85 |

Example 30

Perfluoro Amide (PFA) Ionomer on Nanoporous Substrate H⁺ Form

A 2 micron layer of 3M perfluoro-sulfonamide ionomer (Formula II, where $R_f$=$C_4F_8$ and Q=$NH_2$, prepared according to U.S. Pat. Pub. No. 2013/0029249A1, Example 1) was coated onto a PA350 nanoporous substrate by casting a 10 weight percent solids dispersion in ethanol (75 weight percent) and water (25 weight percent) using a Hirano coating line using a slot die. The solvent was evaporated in four temperature controlled ovens set to 40° C., 40° C., 60° C., and 70° C. with the line moving at 2 meters per minute. The sample was tested in Method 1 for selectivity and flux (Table 6).

Example 31

Perfluoro Phenyl Imide (PFPI) Ionomer on Nanoporous Substrate H+ Form

A 2 micron layer of Perfluoro phenyl imide ionomer ionomer (Formula III, where $R_f$=$C_4F_8$, R=benzyl, and Q=H, prepared according to U.S. Pat. Pub. No. 2013/0029249A1 synthesized following Example 2 by substituting benzylsulfonyl chloride for 4-bromobenzylsulfonyl chloride) was coated onto a PA350 nanoporous substrate by casting a 10 weight percent solids dispersion in ethanol (75 weight percent) and water (25 weight percent) using a Hirano coating line using a slot die. The solvent was evaporated in four temperature controlled ovens set to 40° C., 40° C., 60° C., and 70° C. with the line moving at 2 meters per minute. The sample was tested in Method 1 for selectivity and flux (Table 6).

TABLE 6

| Example | Ionomer | Ionomer thickness (μm) | Counter Ion | Support | Selectivity (%) | Ethanol Flux (Kg/m²/hr) |
|---|---|---|---|---|---|---|
| 30 | PFA | 2 | H⁺ | PA350 | 71.4% | 2.55 |
| 31 | PFPI | 2 | H⁺ | PA350 | 66.0% | 2.82 |

Example 32

825 EW Ionomer on Nanoporous Substrate 0.5 Microns

A 0.5 micron layer of 3M PFSA 825 EW ionomer was coated onto a PA350 nanoporous substrate by casting a 10 weight percent solids dispersion in ethanol (75 weight percent) and water (25 weight percent) using a Hirano coating line using a slot die. The solvent was evaporated in four temperature controlled ovens set to 40° C., 40° C., 60° C., and 70° C. with the line moving at 2 meters per minute. The membrane was ion exchanged by soaking in 1M LiCl for 30 minutes followed by rinsing in deionized water and then allowed to try at room temperature overnight. The sample was tested in Method 1 for selectivity and flux (Table 7).

Example 33

825 EW Ionomer on Nanoporous Substrate 1.0 Microns

A 1.0 micron layer of 3M PFSA 825EW was coated and ion exchanged as described in Example 32. The sample was tested in Method 1 for selectivity and flux (Table 7).

Example 34

825 EW Ionomer on Nanoporous Substrate 1.5 Microns

A 1.5 micron layer of 3M PFSA 825EW was coated and ion exchanged as described in Example 32. The sample was tested in Method 1 for selectivity and flux (Table 7).

Example 35

825 EW Ionomer on Nanoporous Substrate 2.0 Microns

A 2.0 micron layer of 3M PFSA 825EW was coated and ion exchanged as described in Example 32. The sample was tested in Method 1 for selectivity and flux (Table 7).

Example 36

825 EW Ionomer on Nanoporous Substrate 3.0 Microns

A 3.0 micron layer of 3M PFSA 825EW was coated and ion exchanged as described in Example 32. The sample was tested in Method 1 for selectivity and flux (Table 7).

Example 37

825 EW Ionomer on Nanoporous Substrate 4.5 Microns

A 4.5 micron layer of 3M PFSA 825EW was coated and ion exchanged as described in Example 32. The sample was tested in Method 1 for selectivity and flux (Table 7).

TABLE 7

| Example | Ionomer | Ionomer thickness (μm) | Counter Ion | Support | Selectivity (%) | Ethanol Flux (Kg/m²/hr) |
|---|---|---|---|---|---|---|
| 32 | 825 EW | 0.5 | Li+ | PA350 | 86.70% | 3.72 |
| 33 | 825 EW | 1 | Li+ | PA350 | 80.60% | 3.8 |
| 34 | 825 EW | 1.5 | Li+ | PA350 | 84.30% | 3.61 |
| 35 | 825 EW | 2 | Li+ | PA350 | 86.80% | 3.47 |
| 36 | 825 EW | 3 | Li+ | PA350 | 90.00% | 3.08 |
| 37 | 825 EW | 4.5 | Li+ | PA350 | 92.60% | 2.51 |

Example 38

825 EW Ionomer on Nanoporous Substrate H+ Form

A 3 micron layer of 3M PFSA 825 EW ionomer was coated onto a PE2 (polyether sulfone) nanoporous substrate by casting a 10 weight percent solids dispersion in ethanol (75 weight percent) and water (25 weight percent) using a Hirano coating line using a slot die. The solvent was evaporated in four temperature controlled ovens set to 40° C., 40° C., 60° C., and 70° C. with the line moving at 2 meters per minute. The sample was tested in Method 1 for selectivity and flux (Table 8).

Example 39

825 EW Ionomer on Nanoporous Substrate Li+ Form

The membrane described in Example 38 was ion exchanged by soaking in 1M LiCl for 30 minutes followed by rinsing in deionized water and then allowed to try at room temperature overnight. The sample was tested in Method 1 for selectivity and flux (Table 8).

TABLE 8

| Example | Ionomer | Ionomer thickness (μm) | Counter Ion | Support | Selectivity (%) | Ethanol Flux (Kg/m²/hr) |
|---|---|---|---|---|---|---|
| 38 | 825 EW | 3 | H+ | PE2 | 86.69% | 2.02 |
| 39 | 825 EW | 3 | Li+ | PE2 | 94.07% | 1.25 |

Examples 40-46 illustrate membrane having a thin ionomer coating with various ionomers Example 40

One weight percent (1 wt-%) 3M PFSA 725EW was dispersed into a solvent mixture (75 wt-% EtOH and 25 wt-% deionized water). A polyacrylonitrile nanoporous substrate PA350 was coated with the solution above using a Mayer rod #6 and the solvent was allowed to evaporate at room temperature for at least 2 hours. Isooctane was dropped onto the dried, coated membrane surface and was found to wick through instantly. The penetration of isooctane is believed to indicate that there was not enough PFSA 725 EW applied to this substrate to form a continuous selective coated membrane. No other testing was conducted with this membrane.

Example 41

Figure 8:
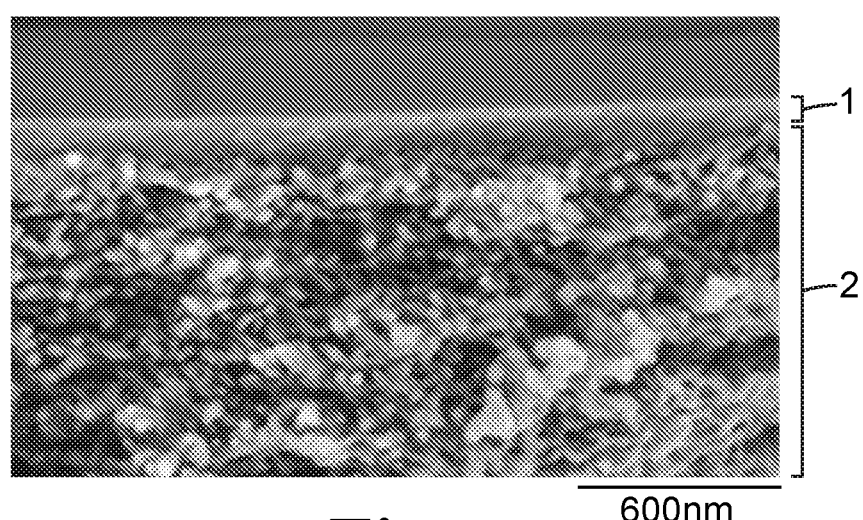
FIG. 8 is an SEM cross-section image of a composite membrane prepared according to Example 41. Sample was freeze fractured in liquid nitrogen and imaged using Hitachi S4500 FESEM scanning electron microscope (SEM).

A membrane was prepared as in Example 40 except the coating solution was 1 wt-% 3M PFSA 1000EW. No isooctane wicking through the membrane was observed. The SEM cross-section image (in FIG. 8) shows a continuous layer (1) (about 0.18 μm thick) deposited onto porous support (2). The membrane was tested by pervaporation in Method 1 above with the results shown in Table 9.

Example 42

Figure 9:
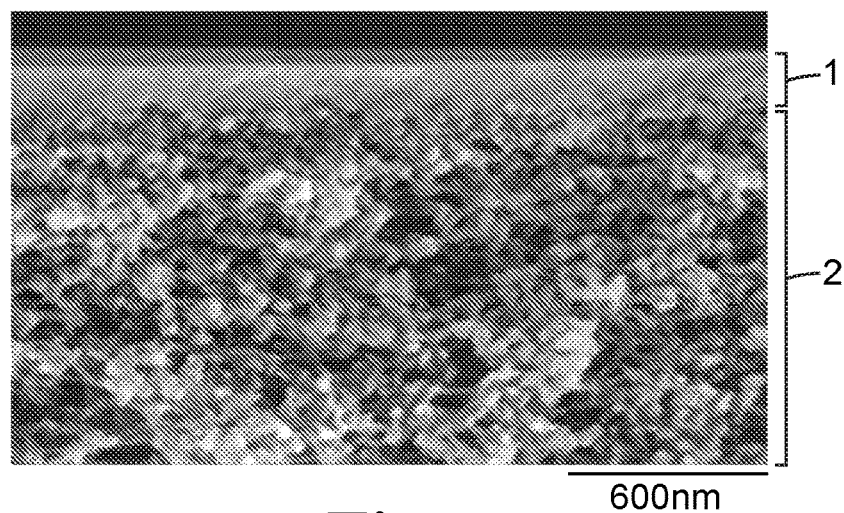
FIG. 9 is an SEM cross-section image of a composite membrane prepared according to Example 42. Sample was freeze fractured in liquid nitrogen and imaged using Hitachi S4500 FESEM scanning electron microscope (SEM).

A composite membrane was prepared as in Example 40 above except the coating solution was 1 wt-% NAFION 2020. No isooctane wicking through the membrane was observed. The SEM cross-section image (in FIG. 9) shows a continuous layer (1) (about 0.2 μm thick) deposited onto a porous substrate (2). The membrane was tested by pervaporation in Method 1 above with the results shown in Table 9.

Example 43

A composite membrane was prepared as in Example 42 above except PE5 was used as received for the substrate. The membrane was tested by pervaporation in Method 1 above with the results shown in Table 9.

Example 44

A composite membrane was prepared as in Example 42 above except the coating solution was 5.0 wt-% NAFION 2020. The membrane was tested by pervaporation in Method 1 above with the results shown in Table 9.

Example 45

A coating solution was prepared by mixing 4 wt-% 3M PFSA 1000EW and 96 wt % a solvent mixture (75 wt-% EtOH and 25 wt-% deionized water). The coating solution was applied on top of a PA350 substrate at the nanoporous side using a slot die in a pilot line. The line speed was set at 4.0 meter/min and the coating conditions targeted at 0.2 μm thickness of dry thin film coating. The coated membrane was dried by passing through an oven 7.62 meters long with the temperature 25-40° C. in different zones. The composite membrane was tested by pervaporation in Method 1 above with the results shown in Table 9.

Figure 10:
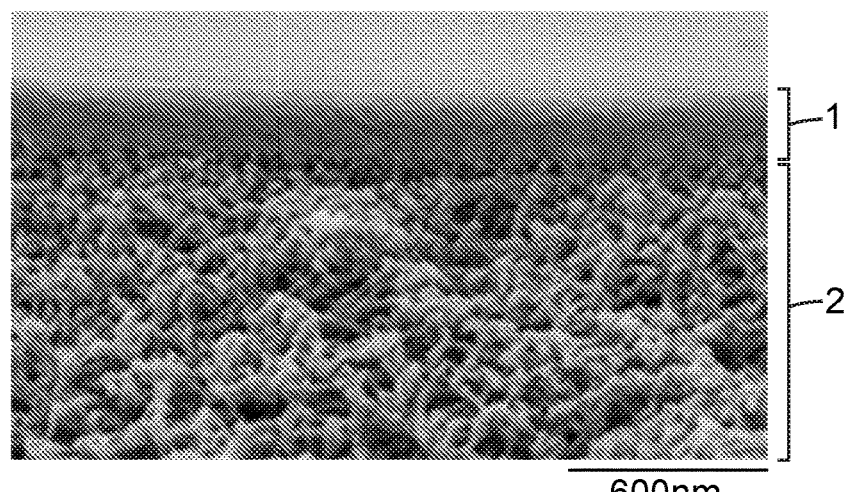
FIG. 10 is an SEM cross-section image of a composite membrane prepared according to Example 45. Sample was freeze fractured in liquid nitrogen and imaged using Hitachi S4500 FESEM scanning electron microscope (SEM).

No isooctane wicking through the composite membrane produced in the pilot line was observed. SEM cross-section image of the membrane (FIG. 10) shows a continuous layer (1) (having a thickness close to that targeted) deposited on a porous substrate (2).

Example 46

A composite membrane was prepared as in Example 45 above except the coating solution contained 1 wt-% 3M PFSA 1000EW and 99 wt-% a solvent mixture (75 wt-% EtOH and 25 wt-% deionized water). The line speed was set at 6.0 meters/minute (m/min) and the solution feed rate was set at 11.68 grams/minute (g/min). The coating conditions targeted a 0.05 μm dry film thickness. The dried composite membrane was tested by pervaporation in Method 1 above with the results shown in Table 1.

Examples 47-55 Illustrates Hybrid Membranes Prepared From Ionomers and Acrylates Example 47

A coating solution contained 0.83 wt-% 3M PFSA-1000EW, 15.5 wt-% SR344 (polyethyleneglycol 400 diacrylate), and photoinitiator Photo 1173 was added at 1.1 wt-% relative to the SR344 in a solvent mixture (75 wt-% EtOH and 25 wt-% deionized water).

The mixed solution was applied to PA350 at the nanoporous side using a Mayer rod #6. After 5 minutes solvent evaporation at room temperature, the coated membrane was cured in 600 watts Fusion UV system equipped with H bulb and aluminum reflector under a nitrogen purge. The line speed was set at 6.1 m/min. The membrane was tested by pervaporation with gasoline as in Method 1 with the results shown in Table 9.

Example 48

A hybrid composite membrane was prepared as in Example 47 except that the UV curing speed was set at 18.2 m/min. The membrane was tested by pervaporation with gasoline as in Method 1 with the results shown in Table 9.

In contrast to the ionomer membrane in Example #45, which coating was easily damaged by a wiping test using a water wetted clean wiper, both hybrid composite membranes in Example 47 and 48 survived the wiping test.

Example 49

A hybrid composite membrane was prepared as in Example 47 except that the coating solution contained 1.0 wt-% 3M PFSA-1000EW, 5.0 wt-% SR344, and 0.03 wt-% Photo1173 relative to SR344, and the UV curing speed was set at 18.2 m/min. The membrane was tested by pervaporation with gasoline as in Method 1 with the results shown in Table 9.

Example 50

A hybrid composite membrane was prepared as in Example 47 except that the coating solution contained 1.0 wt-% 3M PFSA-1000EW, 10.3 wt-% SR344, and 0.04 wt-% Photo1173 relative to SR344, and the UV curing speed was set at 18.2 m/min. The membrane was tested by pervaporation with gasoline as in Method 1 with the results shown in Table 9.

Example 51

Figure 11:
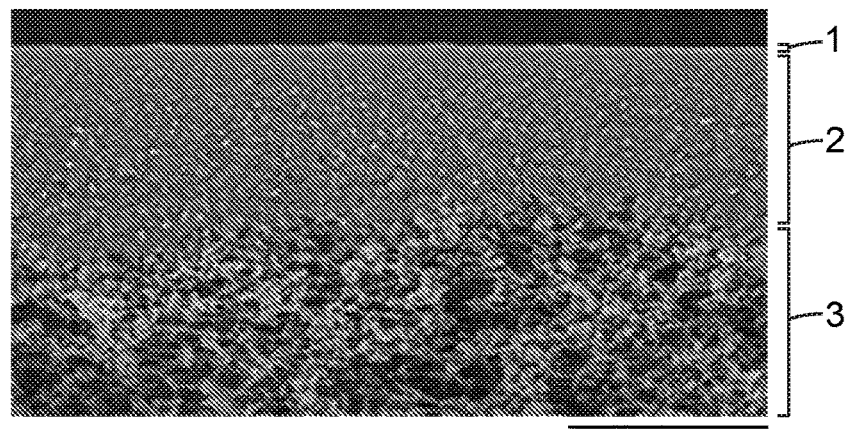
FIG. 11 is an SEM cross-section image of a composite membrane prepared according to Example 51. Sample was freeze fractured in liquid nitrogen and imaged using Hitachi S4500 FESEM scanning electron microscope (SEM).

A hybrid composite membrane was prepared as in Example 47 except that the coating solution contained 1.0 wt-% 3M PFSA-1000EW, 19.9 wt-% SR344, and 0.05 wt-% Photo1173 relative to SR344, and the UV curing speed was set at 18.2 m/min. The membrane was tested by pervaporation with gasoline as in Method 1 and the results showed in Table 9. The fractured cross-section of the hybrid membrane (FIG. 11) was imaged by a SEM. Two distinct two coating layers were observed with a thicker pore-filling layer (2) about 2 μm thick, which is likely formed by the UV cured acrylate, and a thinner top layer (1) about 0.2 μm, which is likely formed both PFSA-1000EW and the UV cured acrylate, deposited on a porous substrate (3).

Example 52

A hybrid composite membrane was prepared as in Example 47 except that the coating solution contained 1.0 wt-% 3M PFSA-1000EW, 40.0 wt-% SR344, and 0.06 wt-% Photo 1173 relative to SR344, and the UV curing speed was set at 18.2 m/min. The membrane was tested by pervaporation with gasoline as in Method 1 with the results shown in Table 9.

Example 53

A hybrid composite membrane was prepared as in Example 47 except that the coating solution contained 1.0 wt-% 3M PFSA-1000EW, 20.0 wt-% SR610 (polyethyleneglycol 600 diacrylate) and 0.05 wt-% Photo1173 relative to SR610, and the UV curing speed was set at 18.2 m/min. The membrane was tested by pervaporation with gasoline as in Method 1 with the results shown in Table 9.

Example 54

A hybrid composite membrane was prepared as in Example 47 except that the coating solution contained 1.0 wt-% 3M PFSA-1000EW, 20.2 wt-% SR603OP (polyethylene glycol 400 dimethacrylate) and 0.05 wt-% Photo 1173 relative to SR603OP, and the UV curing speed was set at 18.2 m/min. The membrane was tested by pervaporation with gasoline as in Method 1 with the results shown in Table 9.

Example 55 Illustrates an Overcoating Method to Prepare a Hybrid Membrane

Example 55

A solution was prepared by mixing 2.04 grams (g) SR610, 0.25 g polyacrylic acid (50% aqueous solution, MW 5000), 0.12 g photoinitiator Photo 1173, and 17.66 g solvent mixture (EtOH/$H_2O$, 75/25 mass ratio). The solution which did not contain any ionomer was applied to the top of the membrane in Example 45 using Mayer rod #6. The solvent was evaporated at room temperature before UV curing. The curing was conducted in a Fusion UV system equipped with H bulb and aluminum reflector under nitrogen inert environment and the line speed was set at 6.02 meter/min. The membrane was tested by pervaporation with gasoline as in Method 1 and the results showed in Table 9. As can be seen, this hybrid membrane showed 37% higher ethanol flux than the ionomer membrane in Example 45.

Examples 56-60 Illustrates Hybrid Membranes Prepared from Ionomers and Epoxy

Example 56

3M PFSA Ionomer EW825 was disspersed in EtOH/$H_2O$ (75/25 mass ratio) to prepare a 30 wt-% PFSA-825EW stock solution. JEFFAMINE D400 and epoxy EX614B (sorbitol polyglycidyl ether) were dissolved in MEK to prepare a 20 wt-% amine and epoxy stock solution, respectively.

The stock solutions above ware mixed with EtOH to get a final coating solution containing 9 wt-% 3M PFSA-825EW, 1 wt % EX614B and 0.62 wt-% JEFFAMINE D400. The coating solution was applied to the nanoporous side of PA350 using a Mayer rod with the target dry coating thickness of 4 μm. The coated membrane was dried and heat treated in a convection oven at 80° C. for 1 hour before evaluation in Method 4. The testing results are shown in Table 9.

Example 57

A membrane was prepared as in Example 56 except that the coating solution contained 4wt-% 3M PFSA-825EW and the target dry coating thickness was 5 μm. The testing results are shown in Table 9.

Example 58

A membrane was prepared as in Example 56 except that the coating solution contained 2.33 wt-% 3M PFSA-825EW, 1 wt-% EX512 (polyglycerol polyglycidyl ether) and 0.62 wt-% JEFFAMINE D400. The target dry coating thickness was 5 μm. The testing results are shown in Table 9.

Example 59

A membrane was prepared as in Example 56 except that the coating solution contained 9 wt-% 3M PFSA-825EW, 1 wt-% EX521 (polyglycerol polyglycidyl ether) and 0.59 wt-% JEFFAMINE D400. The target dry coating thickness was 4 μm. The testing results are shown in Table 9.

Example 60

A membrane was prepared as in Example 56 except that the coating solution contained only 9 wt-% 3M PFSA-825EW and had no epoxy/amine component. The target dry coating thickness was 2 μm. The testing results are shown in Table 9.

Cracking resistance of Examples 56-60 was evaluated by folding the coating side facing inside and observing if any crack formed along the folding line. A severe crack was observed with the membrane in Example 60, no crack was observed for membranes in Examples 57 and 58, and a small crack was for membranes in Examples 56 and 59.

Examples 61-71 Illustrate Membranes Prepared from PFSA//RTIL (Room Temperature Ionic Liquid)

Example 61

A coating solution was prepared by mixing 1.25 wt-% 3M PFSA-1000EW, 1.25 wt-% EMIM-Tf2N (1-ethyl-3-methylimidazolium bis(trifluoromethylsulfonyl)imide RTIL) in a solvent mixture (75 wt-% EtOH and 25 wt-% deionized water). The coating solution was applied to PA350 at the nanoporous side using a Mayer rod #6 and the solvent was allowed to evaporate at room temperature for at least 2 hours and then further dried at 80° C. under 8.0 kPa vacuum. The membrane was tested by pervaporation in Method 1 above with the results shown in Table 9.

Example 62

A membrane was prepared as in Example 61 except that the coating solution contained 2.5 wt-% 3M PFSA-1000EW only without any RTIL additive. The membrane was tested by pervaporation in Method 1 above with the results shown in Table 9.

Example 63

A membrane was prepared as in Example 61 except that the coating solution contained 2.5 wt-%3M PFSA-1000EW and 2.5 wt-% EMIM-Tf$_2$N. The membrane was tested by pervaporation in Method 1 above with the results shown in Table 9.

Example 64

A membrane was prepared as in Example 61 except the coating solution was prepared by mixing 1.25 wt-% 3M PFSA-EW725, 1.25 wt-% EMIM-Tf$_2$N, and the solvent mixture (ethanol/water, 75/25 mass ratio). The membrane was tested by pervaporation in Method 1 above with the results shown in Table 9.

Example 65

A membrane was prepared as in Example 61 except the coating solution was prepared by mixing 1.25 wt-% NAFION 2020, 0.50 wt-% 1-ethyl-3-methylimidazolium tetrafluoroborate (EMIM-BF4), in a solvent mixture of 75 wt-% ethanol 25 wt-%. The molar ratio of EMIM-BF4 to NAFION 2020 sulfonic acid was 2.0. The membrane was tested by pervaporation in Method 1 above with the results shown in Table 9.

Example 66

A membrane was prepared as Example 61 except the coating solution was prepared by mixing 1.25 wt-% NAFION 2020, 0.50 wt-% 1-ethyl-3-methylimidazolium trifluoromethanesulfonate (EMIM-TFSA), in a solvent mixture of 75 wt-% ethanol and 25 wt-% water. The molar ratio of EMIM-TFSA to NAFION 2020 sulfonic acid was 2.0. The membrane was tested by pervaporation in Method 1 above with the results shown in Table 9.

Example 67

A membrane was prepared as Example 61 except the coating solution was prepared by mixing 1.25 wt-% NAFION 2020, 0.71 wt-% 1-Hexyl-3-methylimidazolium tetracyanoborate (HMIM-B(CN)$_4$), and the solvent mixture of 75 wt-% ethanol and 25 wt-% water. The molar ratio of EMIM-TFSA to NAFION 2020 sulfonic acid was 2.0. The membrane was tested by pervaporation in Method 1 above with the results shown in Table 9.

Example 68

A membrane was prepared as in Example 61 except that the coating solution was prepared by mixing 1.5 wt-% 3M PFSA-825EW, 3.5 wt-% EMIM-Tf$_2$N and a solvent mixture of of 75 wt-% ethanol and 25 wt-% water. The total solid content in the coating solution was 5 wt-% and the molar ratio of RTIL to PFSA-825EW functionality was 4.92. The membranes were tested by pervaporation in Method 1 and Method 2 with the results shown in the Table 9 and 10, respectively.

Example 69

A membrane was prepared as in Example 61 except that the coating solution was prepared by mixing 2.0 wt-% 3M PFSA-825EW, 3.0 wt-% EMIM-Tf$_2$N and a solvent mixture of 75 wt-% ethanol and 25 wt-% water. The total solid content in the coating solution remained 5 wt-% and the molar ratio of RTIL to PFSA-825EW functionality was 3.16. The membranes were tested by pervaporation in Method 1 and Method 2 with the results shown in the Table 9 and 10, respectively.

Example 70

A membrane was prepared as in Example 61 except that the coating solution was prepared by mixing 2.5 wt-% 3M PFSA-825EW, 2.5 wt-% EMIM-Tf$_2$N and a solvent mixture of 75 wt-% ethanol and 25 wt-% water. The total solid content in the coating solution remained 5 wt-% and the molar ratio of RTIL to PFSA-825EW functionality was 2.11. The membrane was tested by pervaporation in Method 2 with the results shown in the Table 10.

Example 71

A membrane was prepared as in Example 61 except that the coating solution was prepared by mixing 3.5 wt-% 3M PFSA-825EW, 1.5 wt-% EMIM-Tf$_2$N and a solvent mixture of 75 wt-% ethanol and 25 wt-% water. The total solid content in the coating solution remained 5 wt-% and the molar ratio of RTIL to PFSA-825EW functionality was 0.90. The membrane was tested by pervaporation in Method 2 with the results shown in the Table 10.

Example 72

A coating solution was prepared by mixing 6.00 wt-% 3M PFSA-1000EW, 3.12 wt-% EMIM-TFSA, and a solvent mixture of 60 wt-% ethanol and 40 wt-% deionized water. The solution had EMIM-TFSA/PFSA-1000EW molar ratio of 2.0. The coating solution was applied to a PA350 substrate using a slot die in a pilot line. The line speed was set at 6.0 meter/min and this coating conditions targeted at 0.2 μm thickness of dry thin film coating. The coated membrane was dried by passing through a 7.6 meter long oven with the temperature 25-40° C. in different zones. The dried composite membrane was tested by pervaporation in Method 1 and Method 2 with the results shown in the Table 9 and 10, respectively.

Example 73

A membrane was prepared as in Example 72 except that the coating solution was made by mixing 1.00 wt-% PFSA-1000EW, 0.52 wt-% EMIM-TFSA, and a solvent mixture of 60 wt-% ethanol and 40 wt-% deionized water. Target thickness was 0.1 μm. The dried composite membrane was tested by pervaporation in Method 1 with the results shown in the Table 9.

Examples 74-77 Illustrates a PFSA Membrane with a $2^{nd}$ Amorphous Perfluoropolymer Top Coating Layer Example 74

The membrane in Example 73 was coated with 0.5 wt-% TEFLON AF2400 in 3M Novec solvent HFE7200 using a Mayer rod #5. The dry AF2400 second layer coating thickness target was 0.034 μm. The solvent was evaporated at ambient conditions for at least two hours. The dual layer coated membrane was tested by pervaporation in Method 1 above with the results shown in Table 9.

Both membranes in Examples 73 and 74 were tested four times as in Method 1 to evaluate membrane performance stability with the results shown in Table 13. The membrane without a $2n^d$ layer coating showed a steep decline in ethanol selectivity over repeating testing, while AF2400 coated membrane in Example 74 gave consistent ethanol selectivity in this performance durability testing.

A spiral-wound module was prepared from the membrane of Example 74 using the following procedure and materials. Polyphenlyene sulfide extruded mesh available under the product number N01328_6OPPS-NAT (or PPS P861) (from Delstar Technologies Inc., Middleton, Del.) was used as the feed spacer. One sheet of polyester woven mesh available under the trade name WS0300 (from Industrial Netting, Minneapolis, MN) and one sheet of polybutylene terephthalate asymmetrical extruded mesh available under the product number N02413/19_45PBTNAT (or PBT P864) (from Delstar Technologies Inc., Middleton, Del.) were stacked over each other and used as the permeate spacer. Seven membrane sheets (Example 74) (540 mm long) were pre-cut (25.4 cm width) and folded nonwoven side out about 255 mm from one end so that one end over hung the other by about 15 mm. Each membrane folder was inserted with the feed spacer. Pore sealant was mixed from difunctional bisphenol A epoxy resin available under the trade name EPON 828 (from Momentive Company, Columbus), triethylenetetraamine (Alfa Aesar, Heysham, England), and epoxy adhesive available under the trade name SCOTCH-WELD-DP760 (from 3M France, Bd de Poise, Cergy Pontoise Cedex, France) at a 21:3:8 weight ratio. The pore sealant was applied by a brush to the nonwoven side of the membrane to a width of 20 mm on the overhanging end and 30 mm wide to the edges. The membrane folders with the feed spacers were then stacked with the folded edge toward the permeate collection tube and the permeate spacer slightly overhanging toward the permeate collection tube. DP760 epoxy adhesive was applied to seal the permeate spacers between each membrane folders such that the permeate spacers remained open to the permeate collection tube. The stack of membrane folders and permeate spacers were wound around a stainless steel permeate collection tube (dimensions of 13 mm outside diameter and 51 cm in length) to form a module. The collection tube had approximately 50-75% open area/perforations (15.24 cm in length). The module was then cured at 80° C. for 2 hours in an oven. The module was then trimmed at two ends to expose the feed spacers before commencing the integrity testing. The module showed the vacuum integrity (<1.3 kPa), which indicates it was well sealed. The module had an active membrane area 0.70 m$^2$ and a total volume 0.76 liter. It was housed in a stainless steel canister for performance evaluation under conditions (fuel temperature 70° C. and flow rate of 2 liter/min, and 2.67 kPa vacuum pressure on the permeate), the module gave an average ethanol flux 0.82 kg/hr and 67.2% average permeate ethanol selectivity Example 75

A dual layer coated membrane was prepared as in Example 74 except the membrane in Example 45 was coated with AF2400. The membrane was tested by pervaporation in Method 1 above with the results shown in Table 9.

Example 76

A dual layer coated membrane was prepared as in Example 74 except a 0.1 wt-% AF2400 solution was used for the second layer coating and its coating thickness was 0.011 μm. The membrane was tested by pervaporation in Method 1 above with the results shown in Table 9.

Example 77

A dual layer coated membrane was prepared as in Example 74 except a 0.5 wt-% AF2400 solution was used for the second layer coating and its target coating thickness was 0.057 μm. The membrane was tested by pervaporation in Method 1 above with the results shown in Table 9.

TABLE 9

| Example | Total Permeate Flux (kg/m² · h) | Feed EtOH (wt-%) | Permeate EtOH (wt-%) | EtOH Flux (kg/m² · h) |
|---|---|---|---|---|
| 41 | 4.00 | 8.6% | 76.6% | 3.06 |
| 42 | 4.71 | 8.9% | 71.0% | 3.35 |
| 43 | 0.96 | 9.3% | 87.9% | 0.85 |
| 44 | 3.43 | 8.8% | 77.3% | 2.64 |
| 45 | 2.71 | 8.3% | 95.4% | 2.59 |
| 46 | 6.00 | 8.9% | 60.5% | 3.63 |
| 47 | 4.86 | 8.7% | 70.0% | 3.40 |
| 48 | 5.00 | 9.2% | 70.0% | 3.50 |
| 49 | 5.29 | 8.7% | 71.4% | 3.77 |
| 50 | 5.29 | 8.7% | 68.3% | 3.61 |
| 51 | 5.71 | 8.6% | 63.4% | 3.62 |
| 52 | 4.00 | 9.0% | 69.1% | 2.76 |
| 53 | 6.29 | 8.8% | 60.1% | 3.78 |
| 54 | 7.00 | 8.7% | 61.4% | 4.30 |
| 55 | 5.14 | 8.8% | 68.9% | 3.55 |
| 56 | — | — | 82.3% | 1.85 |
| 57 | — | — | 79.3% | 1.13 |
| 58 | — | — | 84.9% | 0.93 |
| 59 | — | — | 77.9% | 1.76 |
| 60 | — | — | 67.0% | 1.99 |
| 61 | 5.00 | 8.8% | 68.7% | 3.43 |
| 62 | 3.57 | 8.4% | 81.8% | 2.92 |
| 63 | 4.43 | 8.7% | 76.1% | 3.37 |
| 64 | 4.14 | 8.6% | 78.3% | 3.24 |
| 65 | 5.57 | 8.4% | 67.4% | 3.76 |
| 66 | 4.86 | 8.8% | 70.4% | 3.42 |
| 67 | 5.76 | 8.8% | 61.5% | 3.54 |
| 68 | 5.86 | 7.7% | 64.4% | 3.77 |
| 69 | 5.14 | 8.5% | 68.7% | 3.53 |
| 70 | — | — | — | — |
| 71 | — | — | — | — |
| 72 | 4.71 | 8.0% | 80.5% | 3.79 |
| 73 | 5.00 | 8.9% | 71.1% | 3.55 |
| 74 | 6.00 | 8.6% | 67.3% | 4.03 |
| 75 | 4.57 | 8.9% | 77.8% | 3.55 |
| 76 | 5.14 | 9.0% | 68.0% | 3.50 |
| 77 | 6.00 | 8.6% | 64.5% | 3.86 |

TABLE 10

| Example | Permeate EtOH (wt-%) | EtOH Flux (kg/m² · h) |
|---|---|---|
| 68 | 51.6% | 1.95 |
| 69 | 49.3% | 1.64 |
| 70 | 75.0% | 1.61 |
| 71 | 80.2% | 1.54 |
| 72 | 82.9% | 1.72 |

Example 78

A membrane roll was prepared as in Example 73 except that the temperatures were 40° C., 50° C., 60° C., and 70° C. in a four zoned oven. The membrane roll was plasma treated according to US2003/0134515 with $C_6F_{14}$, $C_6F_{14}/O_2$ and $C_3F_8$ as a fluorine gas source. The amorphous fluorocarbon film was only deposited at the PFSA coated side of the membrane. The process conditions was shown in Table 11 and the membranes were tested by pervaporation in Method 1 with the results shown in Table 12.

The plasma fluorocarbon film coating form $C_6F_{14}$ did not change the performance. The film from $C_6F_{14}/O_2$ and $C_3F_8$ did decrease ethanol selectivity to various degrees. Under plasma deposition conditions such as 1000 watts and 0.76 meter/min using $C_6F_{14}/O_2$ or $C_3F_8$ as source gases, the PFSA coating layer of the base membrane was likely etched out which caused excessive total permeate flux and no ethanol selectivity.

The membrane in Example 78-17 was evaluated with four consecutive tests in Method 1 to evaluate membrane performance stability with the results shown in Table 13. Similar to Example 74, the plasma fluorocarbon film deposited membrane did not show a decline in ethanol selectivity.

Some plasma fluorocarbon film deposited membranes were also evaluated in Method 5 for long term performance stability with the results shown in Table 14. Most of membranes had significant ethanol selectivity change after their 140 hours hot gasoline exposure. However the membrane in Example 78-2 gave less than 15% change in permeate ethanol, the most stable performance.

TABLE 11

| Example | Gas 1 | Gas 2 | Gas 1 sccm | Gas 2 sccm | Power (watts) | Line Speed (meter/min) | Pressure (Pa) |
|---|---|---|---|---|---|---|---|
| 78-1 | — | — | — | — | — | — | — |
| 78-2 | $C_6F_{14}$ | — | 600 | — | 1000 | 0.76 | 0.55 |
| 78-3 | $C_6F_{14}$ | — | 600 | — | 500 | 0.76 | 0.55 |
| 78-4 | $C_6F_{14}$ | — | 600 | — | 200 | 0.76 | 0.55 |
| 78-5 | $C_6F_{14}$ | — | 600 | — | 1000 | 3.05 | 0.93 |
| 78-6 | $C_6F_{14}$ | — | 600 | — | 500 | 3.05 | 0.93 |
| 78-7 | $C_6F_{14}$ | — | 600 | — | 200 | 3.05 | 0.93 |
| 78-8 | $C_6F_{14}$ | — | 600 | — | 1000 | 9.14 | 1.67 |
| 78-9 | $C_6F_{14}$ | — | 600 | — | 500 | 9.14 | 1.67 |
| 78-10 | $C_6F_{14}$ | — | 600 | — | 200 | 9.14 | 1.67 |
| 78-11 | $C_6F_{14}$ | $O_2$ | 600 | 300 | 1000 | 0.76 | 0.64 |
| 78-12 | $C_6F_{14}$ | $O_2$ | 600 | 300 | 500 | 0.76 | 0.64 |
| 78-13 | $C_6F_{14}$ | $O_2$ | 600 | 300 | 200 | 0.76 | 0.64 |
| 78-14 | $C_6F_{14}$ | $O_2$ | 600 | 300 | 1000 | 3.05 | 0.99 |
| 78-15 | $C_6F_{14}$ | $O_2$ | 600 | 300 | 500 | 3.05 | 0.99 |
| 78-16 | $C_6F_{14}$ | $O_2$ | 600 | 300 | 200 | 3.05 | 0.99 |
| 78-17 | $C_6F_{14}$ | $O_2$ | 600 | 300 | 1000 | 9.14 | 1.60 |
| 78-18 | $C_6F_{14}$ | $O_2$ | 600 | 300 | 500 | 9.14 | 1.60 |
| 78-19 | $C_6F_{14}$ | $O_2$ | 600 | 300 | 200 | 9.14 | 1.60 |
| 78-20 | $C_3F_8$ | — | 600 | — | 1000 | 0.76 | 0.84 |
| 78-21 | $C_3F_8$ | — | 600 | — | 500 | 0.76 | 0.84 |
| 78-22 | $C_3F_8$ | — | 600 | — | 200 | 0.76 | 0.84 |
| 78-23 | $C_3F_8$ | — | 600 | — | 1000 | 3.05 | 1.13 |
| 78-24 | $C_3F_8$ | — | 600 | — | 500 | 3.05 | 1.13 |
| 78-25 | $C_3F_8$ | — | 600 | — | 200 | 3.05 | 1.13 |
| 78-26 | $C_3F_8$ | — | 600 | — | 1000 | 9.14 | 1.84 |
| 78-27 | $C_3F_8$ | — | 600 | — | 500 | 9.14 | 1.84 |
| 78-28 | $C_3F_8$ | — | 600 | — | 200 | 9.14 | 1.84 |

TABLE 12

| Example | Total Permeate Flux (kg/m2 · h) | Feed EtOH (wt-%) | Permeate EtOH (wt-%) | EtOH Flux (kg/m2 · h) |
|---|---|---|---|---|
| 78-1 | 5.00 | 8.2% | 82.8% | 4.13 |
| 78-2 | 5.29 | 8.7% | 82.3% | 4.35 |
| 78-3 | 4.57 | 7.8% | 86.4% | 3.95 |
| 78-4 | 5.00 | 8.4% | 83.5% | 4.17 |
| 78-5 | 4.86 | 9.0% | 86.3% | 4.19 |
| 78-6 | 4.86 | 8.5% | 84.0% | 4.08 |
| 78-7 | 5.43 | 8.4% | 81.5% | 4.42 |
| 78-8 | 5.36 | 8.5% | 82.3% | 4.41 |
| 78-9 | 5.43 | 8.9% | 80.4% | 4.36 |
| 78-10 | 5.71 | 8.1% | 80.1% | 4.58 |
| 78-11 | >100 | — | — | — |
| 78-12 | 5.71 | 8.4% | 72.8% | 4.16 |
| 78-13 | 5.86 | 8.7% | 77.5% | 4.54 |
| 78-14 | 5.57 | 8.5% | 81.6% | 4.54 |
| 78-15 | 5.71 | 8.5% | 79.0% | 4.51 |
| 78-16 | 5.86 | 8.7% | 77.3% | 4.53 |
| 78-17 | 5.86 | 8.4% | 80.1% | 4.69 |
| 78-18 | 5.86 | 8.7% | 77.3% | 4.53 |
| 78-19 | 6.00 | 8.1% | 80.0% | 4.79 |
| 78-20 | >100 | — | — | — |
| 78-21 | 6.00 | 8.5% | 75.0% | 4.50 |
| 78-22 | 2.57 | 3.5% | 74.8% | 1.93 |
| 78-23 | 6.29 | 7.9% | 73.4% | 4.61 |
| 78-24 | 5.86 | 8.6% | 75.1% | 4.40 |

TABLE 12-continued

| Example | Total Permeate Flux (kg/m2 · h) | Feed EtOH (wt-%) | Permeate EtOH (wt-%) | EtOH Flux (kg/m2 · h) |
|---|---|---|---|---|
| 78-25 | 6.29 | 8.5% | 73.6% | 4.62 |
| 78-26 | 5.57 | 8.5% | 76.2% | 4.24 |
| 78-27 | 5.86 | 8.3% | 78.9% | 4.62 |
| 78-28 | 5.71 | 8.5% | 76.2% | 4.36 |

TABLE 13

| Example | Durability test | Total Permeate Flux (kg/m² · h) | Feed EtOH (wt-%) | Permeate EtOH (wt-%) | EtOH Flux (kg/m² · h) |
|---|---|---|---|---|---|
| 73 | Test 1 | 5.00 | 8.9% | 71.1% | 3.55 |
|  | Test 2 | 6.00 | 9.1% | 59.8% | 3.59 |
|  | Test 3 | 7.43 | 9.2% | 47.5% | 3.53 |
|  | Test 4 | 12.00 | 9.4% | 31.8% | 3.82 |
| 74 | Test 1 | 5.57 | 8.8% | 65.0% | 3.61 |
|  | Test 2 | 5.43 | 8.7% | 65.8% | 3.57 |
|  | Test 3 | 5.57 | 9.0% | 63.0% | 3.51 |
|  | Test 4 | 5.71 | 8.8% | 61.4% | 3.51 |
| 78-17 | Test 1 | 5.57 | 8.4% | 80.6% | 4.49 |
|  | Test 2 | 5.43 | 8.5% | 82.3% | 4.47 |
|  | Test 3 | 5.29 | 8.5% | 81.9% | 4.33 |
|  | Test 4 | 5.29 | 8.7% | 82.5% | 4.36 |

TABLE 14

| Example | 140 hrs hot gasoline exposure | Total Permeate Flux (kg/m² · h) | Feed EtOH (wt-%) | Permeate EtOH (wt-%) | EtOH Flux (kg/m² · h) |
|---|---|---|---|---|---|
| 78-2 | Before | 5.29 | 8.7% | 82.3% | 4.35 |
|  | After | 5.71 | 8.9% | 72.7% | 4.15 |
| 78-3 | Before | 4.57 | 7.8% | 86.4% | 3.95 |
|  | After | 6.71 | 8.5% | 64.3% | 4.31 |
| 78-4 | Before | 5.00 | 8.4% | 83.5% | 4.17 |
|  | After | 7.43 | 8.7% | 43.5% | 3.18 |
| 78-8 | Before | 5.36 | 8.5% | 82.3% | 4.39 |
|  | After | 8.43 | — | 53.8% | 4.53 |
| 78-17 | Before | 6.29 | 8.4% | 78.6% | 4.94 |
|  | After | 10.43 | 8.5% | 46.6% | 4.85 |
| 78-25 | Before | 6.29 | 8.5% | 73.6% | 4.62 |
|  | After | 9.71 | — | 52.6% | 5.11 |

The complete disclosures of the patents, patent documents, and publications cited herein are incorporated by reference in their entirety as if each were individually incorporated. Various modifications and alterations to this disclosure will become apparent to those skilled in the art without departing from the scope and spirit of this disclosure. It should be understood that this disclosure is not intended to be unduly limited by the illustrative embodiments and examples set forth herein and that such examples and embodiments are presented by way of example only with the scope of the disclosure intended to be limited only by the claims set forth herein as follows.

What is claimed is:

1. A method of providing a fuel to an internal combustion engine, said method comprising:
   selectively pervaporating an alcohol from a fuel feed mixture comprising the alcohol and a gasoline by contacting the fuel feed mixture with a separation membrane comprising a polymeric ionomer, wherein the polymeric ionomer has a highly fluorinated backbone and recurring pendant groups according to the following formula (Formula I):

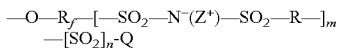

wherein:
   $R_f$ is a perfluorinated organic linking group, excluding —$CF_2$—[$C(CF_3)F$—O—$CF_2$—$CF_2$]—;
   R is an organic linking group;
   $Z^+$ is $H^+$, a monovalent cation, or a multivalent cation;
   Q is H, F, —$NH_2$, —$O^-Y^+$, or —$C_xF_{2x+1}$;
   $Y^+$ is $H^+$, a monovalent cation, or a multivalent cation;
   x=1 to 4;
   m=0 to 6; and
   n=0 or 1;
   with the proviso that at least one of m or n must be non-zero;
   wherein the polymeric ionomer is more permeable to the alcohol than to the gasoline;
   with the proviso that when m=0, Q is —$O^-Y^+$, and when Q is —$O^-Y^+$, m=0.

2. A cartridge suitable for use in a flex-fuel supply system of an internal combustion engine, said cartridge comprising a canister operatively adapted for connecting to the flex-fuel supply system, and the canister containing a pervaporation membrane for selectively separating an alcohol from a fuel feed mixture comprising the alcohol and a gasoline, with the membrane comprising a polymeric ionomer, wherein the polymeric ionomer has a highly fluorinated backbone and recurring pendant groups according to the following formula (Formula I):

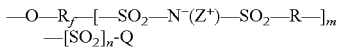

wherein:
   $R_f$ is a perfluorinated organic linking group, excluding —$CF_2$—[$C(CF_3)F$—O—$CF_2$—$CF_2$]—;
   R is an organic linking group;
   $Z^+$ is $H^+$, a monovalent cation, or a multivalent cation;
   Q is H, F, —$NH_2$, —$O^-Y^+$, or —$C_xF_{2x+1}$;
   $Y^+$ is $H^+$, a monovalent cation, or a multivalent cation;
   x=1 to 4;
   m=0 to 6; and
   n=0 or 1;
   with the proviso that at least one of m or n must be non-zero;
   wherein the polymeric ionomer is more permeable to the alcohol than to the gasoline;
   with the proviso that when m=0, Q is —$O^-Y^+$, and when Q is —$O^-Y^+$, m=0.

3. The method according to claim 1 wherein the separation membrane further comprises:
   a porous substrate on which the polymeric ionomer is disposed, with the porous substrate comprising opposite first and second major surfaces, and a plurality of pores,
   wherein the polymeric ionomer forms a layer having a thickness in and/or on the porous substrate.

4. A flex-fuel supply system for an internal combustion engine, said supply system comprising a separation membrane for selectively pervaporating an alcohol from a fuel feed mixture comprising the alcohol and a gasoline, the composite membrane comprising:
   a porous substrate comprising opposite first and second major surfaces, and a plurality of pores; and a polymeric ionomer that forms a layer having a thickness in and/or on the porous substrate;

wherein the polymeric ionomer has a highly fluorinated backbone and recurring pendant groups according to the following formula (Formula I):

—O—$R_f$—[—$SO_2$—$N^-(Z^+)$—$SO_2$—R—]$_m$
—[$SO_2$]$_n$-Q wherein:

$R_f$ is a perfluorinated organic linking group, excluding —$CF_2$—[$C(CF_3)F$—O—$CF_2$—$CF_2$]—;

R is an organic linking group;

$Z^+$ is $H^+$, a monovalent cation, or a multivalent cation;

Q is H, F, —$NH_2$, —$O^-Y^+$, or —$C_xF_{2x+1}$;

$Y^+$ is $H^+$, a monovalent cation, or a multivalent cation;

x=1 to 4;

m=0 to 6; and n=0 or 1;

with the proviso that at least one of m or n must be non-zero;

wherein the polymeric ionomer is more permeable to the alcohol than to the gasoline;

with the proviso that when m=0, Q is —$O^-Y^+$, and when Q is —$O^-Y^+$, m=0.

5. The method according to claim 3 wherein the porous substrate comprises a microporous layer.

6. The method according to claim 5 wherein the porous substrate comprises a macroporous layer.

7. The method according to claim 3 wherein the porous substrate has a thickness measured from one to the other of the opposite major surfaces in the range of from 5 μm up to and including 500 μm.

8. The method according to claim 3 wherein the porous substrate comprises pores having an average size in the range of from 0.5 nanometers (nm) up to and including 1000 82 m.

9. The method according to claim 1 further comprising a (meth)acryl-containing polymer.

10. The method according to claim 9 wherein the (meth)acryl-containing polymer is mixed with the polymeric ionomer.

11. The method according to claim 9 wherein the (meth)acryl containing polymer and polymeric ionomer are in separate layers.

12. The method according to claim 1 further comprising an epoxy polymer.

13. The method according to claim 12 wherein the epoxy polymer is mixed with the polymeric ionomer.

14. The method according to claim 12 wherein the epoxy polymer and polymeric ionomer are in separate layers.

15. The method according to claim 1 further comprising at least one of:

(a) an ionic liquid mixed with the polymeric ionomer; or (b) an amorphous fluorochemical film disposed on separation membrane.

16. The method according to claim 15 wherein the amorphous fluorochemical film is a plasma-deposited fluorochemical film.

17. The method according to claim 15 wherein the amorphous fluorochemical film comprises an amorphous glassy perfluoropolymer having a Tg of at least 100° C.

18. The method according to claim 1 wherein $R_f$ is —$(CF_2)_t$—wherein t is 1 to 6.

19. The cartridge according to claim 2 wherein $R_f$ is —$(CF_2)_t$—wherein t is 1 to 6.

20. The flex-fuel supply system according to claim 4 wherein $R_f$ is —$(CF_2)_t$—wherein t is 1 to 6.

* * * * *

UNITED STATES PATENT AND TRADEMARK OFFICE
CERTIFICATE OF CORRECTION

PATENT NO. : 10,618,008 B2
APPLICATION NO. : 15/737955
DATED : April 14, 2020
INVENTOR(S) : Michael Yandrasits et al.

It is certified that error appears in the above-identified patent and that said Letters Patent is hereby corrected as shown below:

On the Title Page

Page 2, Column 1 (item (57) Abstract)
Line 2, delete "(Z+)" and insert -- ($Z^+$) --, therefor.
Line 5, delete "—$NH_2$, —$NH_2$," and insert -- —$NH_2$, --, therefor.
Line 7, delete "morn" and insert -- m or n --, therefor.

Page 4, Column 1 (item (56) Other Publications)
Line 26, delete "Polyacrylontrile" and insert -- Polyacrylonitrile --, therefor.

In the Specification

Column 4
Line 61, delete "nanopororous" and insert -- nanoporous --, therefor.

Column 7
Line 61, delete "Z." and insert -- $Z^+$. --, therefor.

Column 10
Line 1, delete "co- 1-" and insert -- co-1- --, therefor.

Column 13
Line 60, delete "methylpropanefulfonic" and insert -- methylpropanesulfonic --, therefor.

Column 14
Lines 13-14 (approx.), delete "cros slinking" and insert -- crosslinking --, therefor.

Column 15
Line 28, delete "pyridinium,piperidinium" and insert -- pyridinium, piperidinium --, therefor.
Line 32, delete "I ," and insert -- I-, --, therefor.

Signed and Sealed this
Twenty-second Day of September, 2020

Andrei Iancu
*Director of the United States Patent and Trademark Office*

Column 16
Line 56, delete "pentafluorotolenene." and insert -- pentafluorotoluene. --, therefor.

Column 17
Line 48, delete "sebecate," and insert -- sebacate, --, therefor.
Line 67, delete "sebecate," and insert -- sebacate, --, therefor.

Column 19
Line 20, delete "Ton" and insert -- Torr --, therefor.
Line 57, delete "E 10" and insert -- E10 --, therefor.

Column 25
Line 59, delete "methylpropanefulfonic" and insert -- methylpropanesulfonic --, therefor.

Column 27
Line 2, delete "FeSO$_4$H$_2$O," and insert -- FeSO$_4$.H$_2$O, --, therefor.
Line 23, delete "Damstadt," and insert -- Darmstadt --, therefor.
Line 26, delete "B F4," and insert -- BF$_4$, --, therefor.

Column 28
Line 26 (approx.), delete "120min.The" and insert -- 120min. The --, therefor.

Column 30
Line 5 (approx.), delete "Fform" and insert -- Form --, therefor.
Line 27 (approx.), delete "1for" and insert -- 1 for --, therefor.
Line 52, delete "1for" and insert -- 1 for --, therefor.
Line 67, delete "1for" and insert -- 1 for --, therefor.

Column 32
Line 66, delete "PFSA1000" and insert -- PFSA 1000 --, therefor.

Column 40
Line 48 (approx.), delete "disspersed" and insert -- dispersed --, therefor.

Column 43
Line 57, delete "2n$^d$" and insert -- 2$^{nd}$ --, therefor.
Line 63, delete "Polyphenlyene" and insert -- Polyphenylene --, therefor.

Column 44
Line 42 (approx.), after "selectivity" insert -- . --.

In the Claims

Column 50
Line 4, in Claim 8, delete "82 m." and insert -- µm. --, therefor.